(12) United States Patent
Tajima

(10) Patent No.: US 11,916,184 B2
(45) Date of Patent: *Feb. 27, 2024

(54) SECONDARY BATTERY AND ELECTRONIC DEVICE

(71) Applicant: SEMICONDUCTOR ENERGY LABORATORY CO., LTD., Atsugi (JP)

(72) Inventor: Ryota Tajima, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 18 days.

This patent is subject to a terminal disclaimer.

(21) Appl. No.: 17/000,941

(22) Filed: Aug. 24, 2020

(65) Prior Publication Data

US 2021/0005853 A1 Jan. 7, 2021

Related U.S. Application Data

(63) Continuation of application No. 15/145,007, filed on May 3, 2016, now Pat. No. 10,756,311.

(30) Foreign Application Priority Data

May 6, 2015 (JP) ................................. 2015-094530

(51) Int. Cl.
```
H01M 10/04      (2006.01)
H01M 50/124     (2021.01)
H01M 50/129     (2021.01)
H01M 50/117     (2021.01)
H01M 50/121     (2021.01)
H01M 50/133     (2021.01)
```

(52) U.S. Cl.
CPC ..... *H01M 10/0436* (2013.01); *H01M 50/117* (2021.01); *H01M 50/121* (2021.01); *H01M 50/124* (2021.01); *H01M 50/129* (2021.01); *H01M 50/133* (2021.01); *H01M 2220/20* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 3,956,755 A * | 5/1976 | Takahasi | G03G 5/02 347/123 |
| 6,235,418 B1 * | 5/2001 | Pedicni | H01M 12/06 429/407 |
| 8,470,477 B2 | 6/2013 | Miwa et al. | |
| 8,663,841 B2 | 3/2014 | Tajima et al. | |
| 8,685,569 B2 | 4/2014 | Oguni et al. | |
| 8,685,570 B2 | 4/2014 | Miwa et al. | |
| 8,709,654 B2 | 4/2014 | Takeuchi et al. | |
| 8,814,956 B2 | 8/2014 | Yamazaki | |
| 8,822,088 B2 | 9/2014 | Tajima et al. | |
| 8,847,074 B2 | 9/2014 | Mann et al. | |
| 8,883,351 B2 | 11/2014 | Todoriki et al. | |
| 8,945,772 B2 | 2/2015 | Kawakami et al. | |
| 8,993,156 B2 | 3/2015 | Inoue et al. | |
| 9,044,793 B2 | 6/2015 | Toriumi et al. | |
| 9,059,478 B2 | 6/2015 | Yamazaki et al. | |
| 9,196,906 B2 | 11/2015 | Kuriki et al. | |
| 9,198,232 B2 | 11/2015 | Lashmore et al. | |
| 9,218,916 B2 | 12/2015 | Hirohashi et al. | |
| 9,225,003 B2 | 12/2015 | Yukawa | |
| 9,252,419 B2 | 2/2016 | Miwa et al. | |
| 9,292,041 B2 * | 3/2016 | Tokuno | G06F 3/0445 |
| 9,293,770 B2 | 3/2016 | Todoriki et al. | |
| 9,373,834 B2 | 6/2016 | Yamakaji et al. | |
| 9,385,366 B2 | 7/2016 | Yamakaji et al. | |
| 9,396,829 B2 | 7/2016 | Mann et al. | |
| 10,756,311 B2 * | 8/2020 | Tajima | H01M 50/124 |
| 2002/0005846 A1 * | 1/2002 | Hiroki | G09G 3/3614 345/204 |

(Continued)

FOREIGN PATENT DOCUMENTS

| CN | 103687721 A | 3/2014 |
|---|---|---|
| EP | 2735441 A | 5/2014 |

(Continued)

OTHER PUBLICATIONS

Lonomer, Wikipedia page, available online at https://en.wikipedia.org/wiki/Ionomer, date unknown.*
Machine translation of WO 2015/050352, published on Apr. 9, 2015 (Year: 2015).*
Reduced Graphene Oxide, Sigma-Aldrich, available at https://www.sigmaaldrich.com/US/en/product/aldrich/777684, date unkown.*
Gao, Y., Muller-Plathe, F.—Increasing the Thermal Conductivity of Graphene-Polyamide-6,6 Nanocomposites by Surface-Grafted Polymer Chains: Calculation with Molecular Dynamics and Effective-Medium Approximation, The Journal of Physical Chemistry B, pp. 1336-1346, published on Jan. 22, 2016 (Year: 2016).*

(Continued)

*Primary Examiner* — Anca Eoff
(74) *Attorney, Agent, or Firm* — NIXON PEABODY LLP; Jeffrey L. Costellia

(57) ABSTRACT

A secondary battery with high capacity per unit volume can be provided. A flexible secondary battery with a novel structure can be provided. A secondary battery that can be bent repeatedly can be provided. A highly reliable secondary battery can be provided. A long-life secondary battery can be provided. A secondary battery comprises an inner structure and an exterior body that surrounds the inner structure. The inner structure comprises a positive electrode and a negative electrode. The exterior body comprises a first exterior film and a second exterior film. A region comprising reduced graphene oxide lies between the first exterior film and the second exterior film. The graphene oxide preferably comprises a region where the concentration of oxygen is higher than or equal to 2 atomic percent and lower than or equal to 20 atomic percent.

15 Claims, 32 Drawing Sheets

(56) References Cited

U.S. PATENT DOCUMENTS

| | | |
|---|---|---|
| 2003/0118900 A1 | 6/2003 | Otohata |
| 2005/0251239 A1* | 11/2005 | Wallace ............... A61N 1/057 600/375 |
| 2007/0284557 A1* | 12/2007 | Gruner ................ B82Y 40/00 252/500 |
| 2008/0241990 A1* | 10/2008 | Kim .................. H01L 51/0002 257/E51.006 |
| 2010/0176337 A1 | 7/2010 | Zhamu et al. |
| 2012/0045692 A1 | 2/2012 | Takemura et al. |
| 2012/0088151 A1 | 4/2012 | Yamazaki et al. |
| 2012/0088156 A1 | 4/2012 | Nomoto et al. |
| 2012/0177926 A1 | 7/2012 | Mann et al. |
| 2012/0308884 A1 | 12/2012 | Oguni et al. |
| 2012/0308891 A1 | 12/2012 | Todoriki et al. |
| 2012/0315539 A1 | 12/2012 | Lashmore et al. |
| 2012/0328953 A1 | 12/2012 | Hirohashi et al. |
| 2012/0328956 A1 | 12/2012 | Oguni et al. |
| 2013/0045156 A1 | 2/2013 | Nomoto et al. |
| 2013/0045418 A1 | 2/2013 | Oguni et al. |
| 2013/0052528 A1 | 2/2013 | Kuriki et al. |
| 2013/0052547 A1 | 2/2013 | Ogino et al. |
| 2013/0084384 A1 | 4/2013 | Yamakaji |
| 2013/0084495 A1 | 4/2013 | Tajima et al. |
| 2013/0084496 A1 | 4/2013 | Osada et al. |
| 2013/0134051 A1 | 5/2013 | Takahashi et al. |
| 2013/0149605 A1 | 6/2013 | Kakehata et al. |
| 2013/0164612 A1 | 6/2013 | Tanemura et al. |
| 2013/0164619 A1 | 6/2013 | Yamakaji et al. |
| 2013/0183226 A1 | 7/2013 | Todoriki et al. |
| 2013/0189565 A1 | 7/2013 | Lashmore et al. |
| 2013/0209868 A1 | 8/2013 | Suzuta et al. |
| 2013/0212879 A1 | 8/2013 | Ogino |
| 2013/0224562 A1 | 8/2013 | Momo |
| 2013/0224581 A1 | 8/2013 | Saito et al. |
| 2014/0004412 A1 | 1/2014 | Ogino |
| 2014/0023920 A1 | 1/2014 | Yamazaki et al. |
| 2014/0087214 A1 | 3/2014 | Amatucci et al. |
| 2014/0127568 A1 | 5/2014 | Kawakami et al. |
| 2014/0166946 A1 | 6/2014 | Miwa et al. |
| 2014/0170500 A1 | 6/2014 | Oguni et al. |
| 2014/0234689 A1 | 8/2014 | Kim et al. |
| 2014/0234700 A1 | 8/2014 | Moriwaka et al. |
| 2014/0370184 A1 | 12/2014 | Takemura et al. |
| 2014/0370269 A1 | 12/2014 | Kinloch et al. |
| 2015/0017541 A1 | 1/2015 | Tajima et al. |
| 2015/0044560 A1 | 2/2015 | Ogino |
| 2015/0064565 A1 | 3/2015 | Todoriki et al. |
| 2015/0068978 A1* | 3/2015 | Lando .................. B01D 71/12 210/636 |
| 2015/0123050 A1 | 5/2015 | Yamazaki et al. |
| 2015/0140429 A1 | 5/2015 | Kawakami et al. |
| 2015/0155077 A1 | 6/2015 | Yamazaki et al. |
| 2015/0166348 A1 | 6/2015 | Ikenuma et al. |
| 2015/0200419 A1 | 7/2015 | Inoue et al. |
| 2015/0263343 A1 | 9/2015 | Yamazaki et al. |
| 2015/0325821 A1 | 11/2015 | Bradwell et al. |
| 2015/0349345 A1 | 12/2015 | Ikenuma |
| 2016/0020035 A1 | 1/2016 | Inoue et al. |
| 2016/0043406 A1 | 2/2016 | Kuriki et al. |
| 2016/0047060 A1 | 2/2016 | Miwa et al. |
| 2016/0064154 A1 | 3/2016 | Saito et al. |
| 2016/0064726 A1 | 3/2016 | Ikenuma et al. |
| 2016/0079600 A1 | 3/2016 | Miwa et al. |
| 2016/0104885 A1 | 4/2016 | Hirohashi et al. |
| 2016/0104892 A1 | 4/2016 | Yukawa |
| 2016/0149279 A1 | 5/2016 | Ogino et al. |

FOREIGN PATENT DOCUMENTS

| | | |
|---|---|---|
| EP | 2916352 A2 * | 9/2015 |
| JP | 2003-187762 A | 7/2003 |
| JP | 2013-093216 A | 5/2013 |
| JP | 2013-208881 A | 10/2013 |
| JP | 2013-211262 A | 10/2013 |
| JP | 2014-506209 | 3/2014 |
| JP | 2014-527687 | 10/2014 |
| JP | 2015-534209 | 11/2015 |
| KR | 2013-0011977 A | 1/2013 |
| KR | 2013-0106933 A | 10/2013 |
| WO | WO-2009/137722 | 11/2009 |
| WO | WO-2009/137725 | 11/2009 |
| WO | WO-2010/036405 | 4/2010 |
| WO | WO-2012/096482 | 7/2012 |
| WO | WO-2013/012291 | 1/2013 |
| WO | WO-2013/158174 | 10/2013 |
| WO | WO-2014/031440 | 2/2014 |
| WO | WO 2015/050352 * | 4/2015 |
| WO | WO 2015/160822 * | 10/2015 |

OTHER PUBLICATIONS

International Search Report (Application No. PCT/IB2016/052346) dated Aug. 2, 2016.

Written Opinion (Application No. PCT/IB2016/052346) dated Aug. 2, 2016.

http://www.digitaltrends.com/cool-tech/what-is-graphene-and-how-will-it-shape-the-future-of-tech/.

'Super-Strong Graphene Has an Achilles' Heel, http://www.livescience.com/45216-graphene-weak-link-discovered.html.

Geim.A et al., "The rise of graphene", Nature Materials, Mar. 1, 2007, vol. 6, No. 3, pp. 183-191.

Wang.W et al., "Measurement of the cleavage energy of graphite", Nature Communications, Aug. 28, 2015, vol. 6, pp. 7853-1-7853-7.

Shahil.K et al., "Graphene-Multilayer Graphene Nanocomposites as Highly Efficient Thermal Interface Materials", Nano Letters, Jan. 3, 2012, vol. 12, No. 2, pp. 861-867.

* cited by examiner

FIG. 13A
FIG. 13B
FIG. 13C
FIG. 13D
FIG. 13E
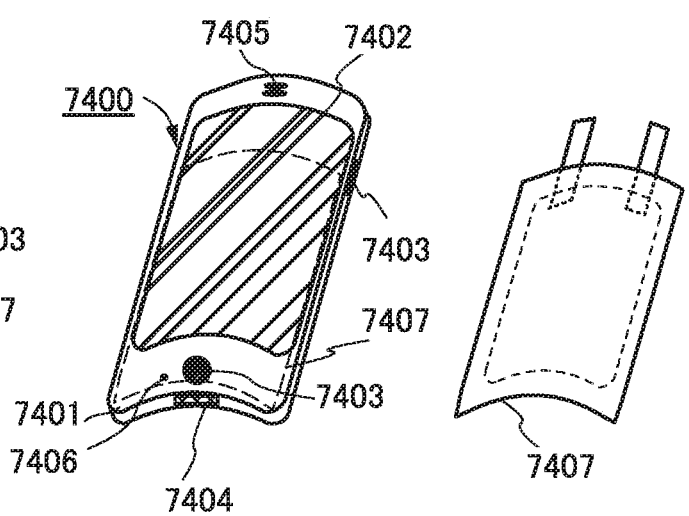
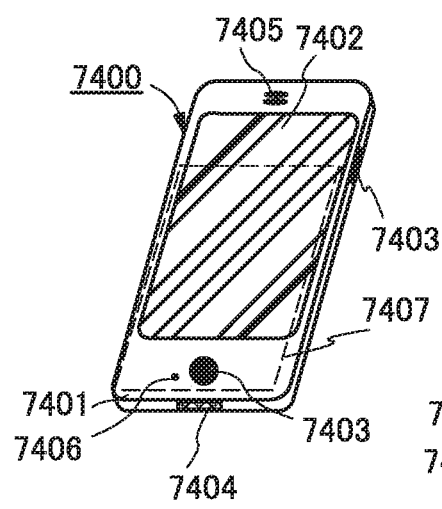
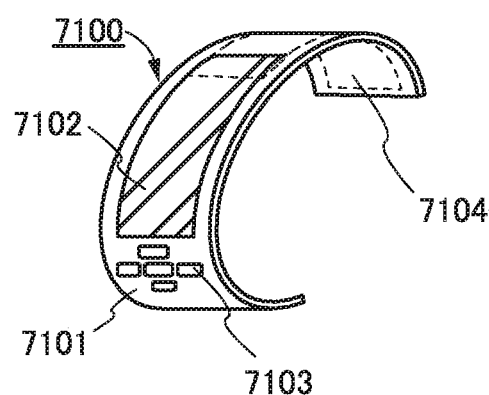
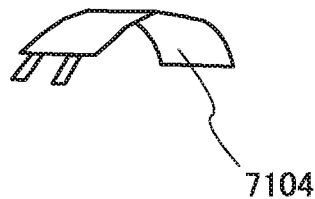

SECONDARY BATTERY AND ELECTRONIC DEVICE

CROSS-REFERENCE TO RELATED APPLICATION

This Application is Continuation of application Ser. No. 15/145,007 filed on May 3, 2016, now U.S. Pat. No. 10,756,311, issued Aug. 25, 2020, which further claims benefit to the Japanese Patent Application No. 2015-094530 filed on May 6, 2015, the contents of which are incorporated herein in their entireties by reference.

TECHNICAL FIELD

The present invention relates to an object, a method, or a manufacturing method. In addition, the present invention relates to a process, a machine, manufacture, or a composition of matter. In particular, one embodiment of the present invention relates to a semiconductor device, a display device, a light-emitting device, a power storage device, an imaging device, a driving method thereof, or a manufacturing method thereof. In particular, one embodiment of the present invention relates to a secondary battery and a method for manufacturing the secondary battery.

BACKGROUND ART

In recent years, wearable devices have been under active development. Since wearable devices are worn on one's body, it is preferable that they have shapes curved along a curved surface of the body or they are curved according to the movement of the body. Therefore, it is preferable that a secondary battery used in a wearable device have flexibility like those for displays and other housings.

Furthermore, the hermeticity of an exterior body of a secondary battery should be high. For example, Patent Document 1 discloses an example of a secondary battery having a laminate exterior body with high hermeticity.

REFERENCE

Patent Document

[Patent Document 1] Japanese Published Patent Application No. 2003-187762

DISCLOSURE OF INVENTION

An object of one embodiment of the present invention is to provide a secondary battery with high capacity per unit volume. Another object of one embodiment of the present invention is to provide a flexible secondary battery with a novel structure. Another object of one embodiment of the present invention is to provide a secondary battery that can be bent repeatedly. Another object of one embodiment of the present invention is to provide a highly reliable secondary battery. Another object of one embodiment of the present invention is to provide a long-life secondary battery.

Note that the descriptions of these objects do not disturb the existence of other objects. In one embodiment of the present invention, there is no need to achieve all the objects. Other objects will be apparent from and can be derived from the description of the specification, the drawings, the claims, and the like.

In the case of manufacturing a flexible secondary battery or a bent secondary battery, a film in an exterior body (hereinafter referred to as an exterior film) close to a center of curvature and an exterior film far from the center of curvature are bent with different radii of curvature. By the difference in radii of curvature, tensile stress is applied to the exterior film far from the center of curvature, and compressive stress is applied to the exterior film close to the center of curvature.

In particular, an exterior film of a secondary battery that has flexibility and is intended for use with repeated bending is subjected to repeated stress, leading to a fatigue destruction in some cases.

The exterior film of the secondary battery needs to block moisture or a gas such as oxygen from the outside. A laminate film including metal foil is used as the exterior film in some cases, in which case, a crack might occur due to metal fatigue caused by repeated bending. In the case where the caused crack pierces a metal layer, gas barrier performance is damaged, leading to deterioration of the performance of the battery.

One embodiment of the present invention is a secondary battery including an inner structure and an exterior body that surrounds the inner structure. The inner structure comprises a positive electrode and a negative electrode. The exterior body includes a first exterior film and a second exterior film. A region comprising reduced graphene oxide lies between the first exterior film and the second exterior film.

In one embodiment of the present invention, because a barrier layer is formed by a stack of graphene flakes or graphene oxide flakes in the exterior body of the secondary battery, the graphene flakes or graphene oxide flakes slide on each other when an exterior film is changed in shape and thus barrier properties can be kept.

Another embodiment of the present invention is a secondary battery in which the reduced graphene oxide includes a region where a concentration of oxygen is higher than or equal to 2 atomic % and lower than or equal to 20 atomic %.

Another embodiment of the present invention is a secondary battery in which the reduced graphene oxide includes a region where an interlayer distance is greater than or equal to 0.335 nm and less than or equal to 0.380 nm.

Another embodiment of the present invention is a secondary battery in which the first exterior film or the second exterior film contains an organic material.

Another embodiment of the present invention is a secondary battery including any one of the above secondary batteries, a display, and an operation button.

According to one embodiment of the present invention, a secondary battery with high capacity per unit volume can be provided. According to one embodiment of the present invention, a flexible secondary battery with a novel structure can be provided. According to one embodiment of the present invention, a secondary battery that can be bent repeatedly can be provided. According to one embodiment of the present invention, a highly reliable secondary battery can be provided. According to one embodiment of the present invention, a long-life secondary battery can be provided.

Note that the description of these effects does not disturb the existence of other effects. One embodiment of the present invention does not necessarily have all the effects described above. Other effects will be apparent from and can be derived from the description of the specification, the drawings, the claims, and the like.

BRIEF DESCRIPTION OF DRAWINGS

FIGS. 13A to 13E illustrate examples of a storage battery and an electronic device.
FIGS. 16A, 16B, 16C1, 16C2, and 16D are a perspective view, a top view, and cross-sectional views illustrating a structure of a storage battery.

BEST MODE FOR CARRYING OUT THE INVENTION

Figure 1A:
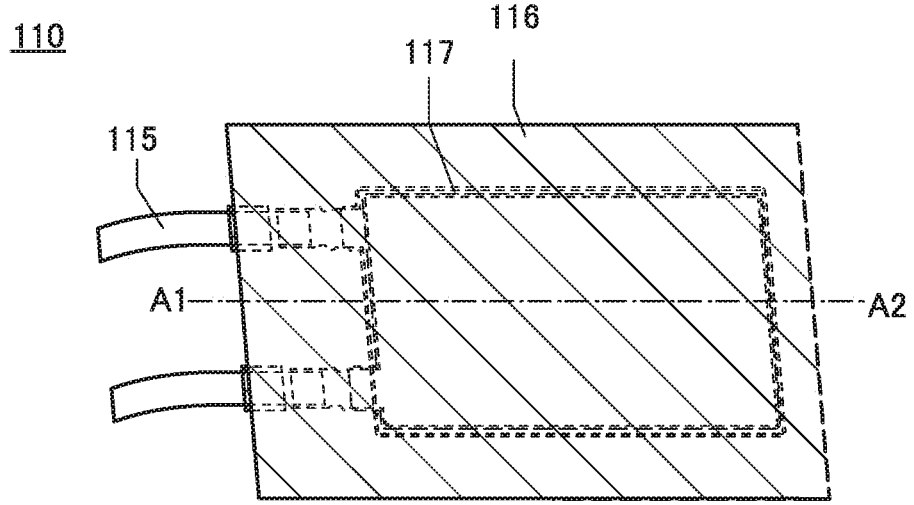
FIGS. 1A to 1C illustrate a secondary battery.

Embodiments of the present invention will be described below in detail with reference to the drawings. However, the present invention is not limited to the description below, and it is easily understood by those skilled in the art that modes and details disclosed herein can be modified in various ways. Furthermore, the present invention is not construed as being limited to description of the embodiments.

The position, size, range, or the like of each component illustrated in drawings and the like is not accurately represented in some cases for easy understanding. Therefore, the disclosed invention is not necessarily limited to the position, size, range, or the like disclosed in the drawings and the like.

The term "electrically connected" includes the case where components are connected through an "object having any electric function". There is no particular limitation on the "object having any electric function" as long as electric signals can be transmitted and received between the components connected through the object.

Note that the terms "film" and "layer" can be interchanged with each other depending on the case or circumstances. For example, the term "conductive layer" can be changed into the term "conductive film" in some cases. Also, the term "insulating film" can be changed into the term "insulating layer" in some cases.

Note that in the structures of the present invention described in this specification and the like, the same portions or portions having similar functions in different drawings are denoted by the same reference numerals, and description of such portions is not repeated. Further, the same hatching pattern is applied to portions having similar functions, and the portions are not especially denoted by reference numerals in some cases.

Ordinal numbers such as "first", "second", and "third" are used for convenience and do not denote the order of steps or the stacking order of layers. Therefore, for example, description can be made even when "first" is replaced with "second" or "third", as appropriate. In addition, the ordinal numbers in this specification and the like are not necessarily the same as those which specify one embodiment of the present invention.

In this specification, flexibility refers to a property of an object being flexible and bendable. In other words, it is a property of an object being deformable in response to an external force applied to the object, and elasticity or restorability to the former shape is not taken into consideration. A secondary battery having flexibility, i.e. a flexible secondary battery can be changed in shape in response to an external force. A flexible secondary battery can be used with its shape fixed in a state of being changed in shape, can be used while repeatedly changed in shape, and can be used in a state of not changed in shape. In this specification and the like, the inside of an exterior body refers to a region surrounded by (or covered with) the exterior body of the secondary battery, in which a structure such as a positive electrode, a negative electrode, an active material layer, and a separator, and an electrolytic solution are included.

In this specification and the like, a secondary battery may be replaced with a storage battery or a power storage device.

The descriptions in embodiments for the present invention can be combined with each other as appropriate.

Embodiment 1

In this embodiment, a secondary battery 110 of one embodiment of the present invention and a manufacturing method thereof are described.

Figure 1B:
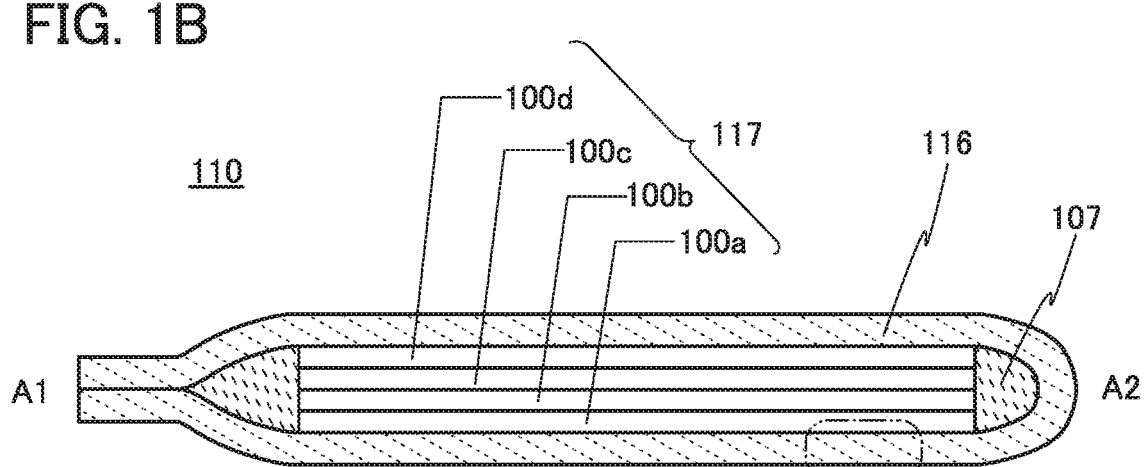
Figure 1C:
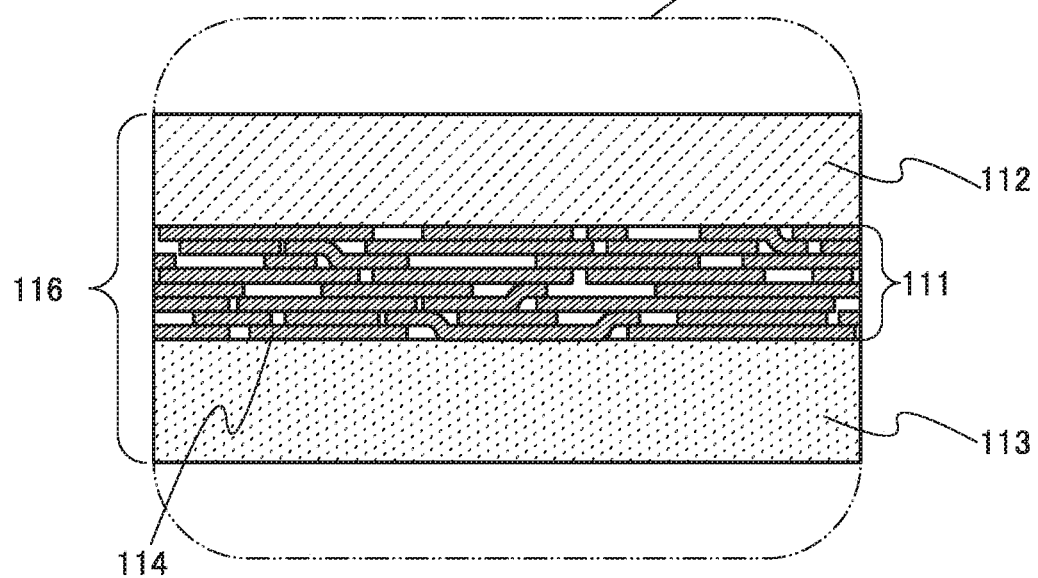

FIGS. 1A to 1C illustrate the secondary battery 110. The secondary battery 110 in FIG. 1A includes an inner structure 117 surrounded by an exterior body 116. The inner structure 117 includes an electrode and a separator, and the electrode is electrically connected to a lead electrode 115.

FIG. 1B is a cross-sectional view taken along line A1-A2 in FIG. 1A. FIG. 1C is an enlarged view of the exterior body 116.

As shown in FIG. 1B, the secondary battery 110 has a structure in which the inner structure 117 and an electrolytic solution 107 are surrounded by the exterior body 116. The inner structure 117 includes a first stack 100a, a second stack 100b, a third stack 100c, and a fourth stack 100d. The number of stacks included in the secondary battery 110 of this embodiment is mainly four; however, it is not limited to this.

As shown in FIG. 1C, the exterior body 116 includes exterior films 112 and 113 and a region 111 therebetween. In the region 111, a plurality of thin flakes 114 including graphene or graphene oxide is stacked.

Note that graphene in this specification includes single-layer graphene and multilayer graphene including two or more and a hundred or less layers. Single-layer graphene refers to a one-atom-thick sheet of carbon molecules having π bonds. Graphene oxide refers to a compound formed by oxidation of such graphene. When graphene oxide is reduced to give graphene, oxygen contained in the graphene oxide is not entirely released and part of the oxygen may remain in graphene.

In the case where the graphene obtained by reducing the graphene oxide contains oxygen, the graphene includes a region where the concentration of oxygen is higher than or equal to 2 atomic % and lower than or equal to 20 atomic %. The concentration of oxygen may be evaluated by measurement using X-ray photoelectron spectroscopy (XPS).

The graphene obtained by reducing the graphene oxide includes a region where an interlayer distance is greater than or equal to 0.335 nm and less than or equal to 0.700 nm, preferably greater than or equal to 0.335 nm and less than or equal to 0.500 nm, more preferably greater than or equal to 0.335 nm and less than or equal to 0.380 nm. The interlayer distance is preferably small, because in which case the region 111 hardly transmits an impurity such as water.

In this specification and the like, graphene obtained by reducing graphene oxide (abbreviated to GO) is referred to as reduced graphene oxide (RGO) in some cases.

The thin flakes 114 containing reduced graphene oxide has high flexibility and high mechanical strength. Thus, the exterior body 116 including the thin flakes 114 containing reduced graphene oxide has high flexibility and high mechanical strength. In addition, the thin flakes 114 containing reduced graphene oxide has excellent slidability.

Note that in this specification, "slidability" means smoothness, or states where a surface of a component is smooth, mutual friction between components is small, and contact parts/moving parts smoothly move.

As shown in FIG. 1C, the thin flakes 114 containing reduced graphene oxide are dispersed substantially uniformly in the region 111. The thin flakes 114 containing reduced graphene oxide are schematically illustrated as rectangles but are actually thin films each having a thickness corresponding to the thickness of a single layer or a multilayer of carbon molecules.

Adjacent graphenes may be bonded to each other to form net-like graphene (hereinafter referred to as a graphene net).

The exterior film 112 or the exterior film 113 preferably contains an organic material. Accordingly, a flexible secondary battery is easily manufactured.

Figure 2A:
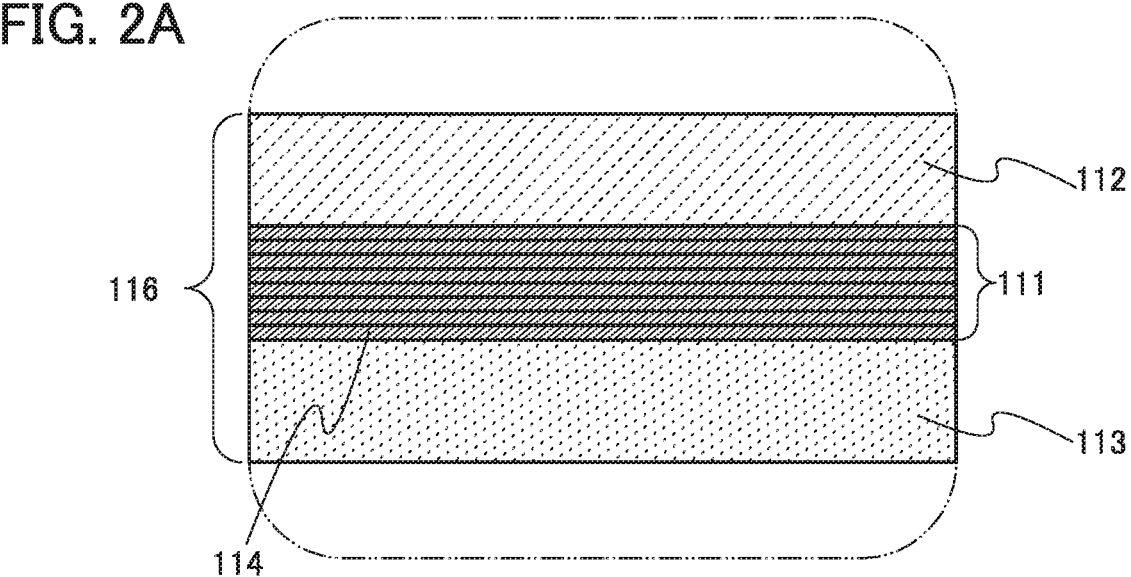
FIGS. 2A and 2B each illustrate a secondary battery.
Figure 2B:
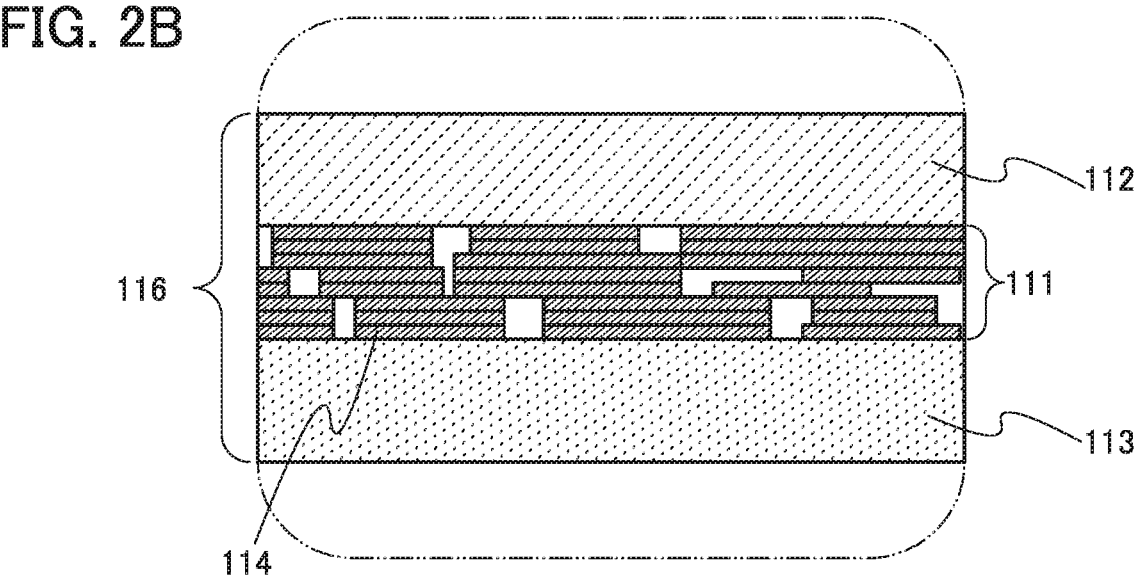

The thin flakes 114 containing reduced graphene oxide in the region 111 is not limited to the mode shown in FIG. 1C. For example, as shown in FIG. 2A, the region 111 may be formed by stacking the thin flakes 114 including sheets of reduced graphene oxide. Alternatively, as shown in FIG. 2B, the region 111 may be formed in such a manner that a plurality of thin flakes 114 containing reduced graphene oxide are stacked and folded. As described above, in the region 111, the thin flakes 114 containing reduced graphene oxide may have various shape and distribution.

Figure 3A:
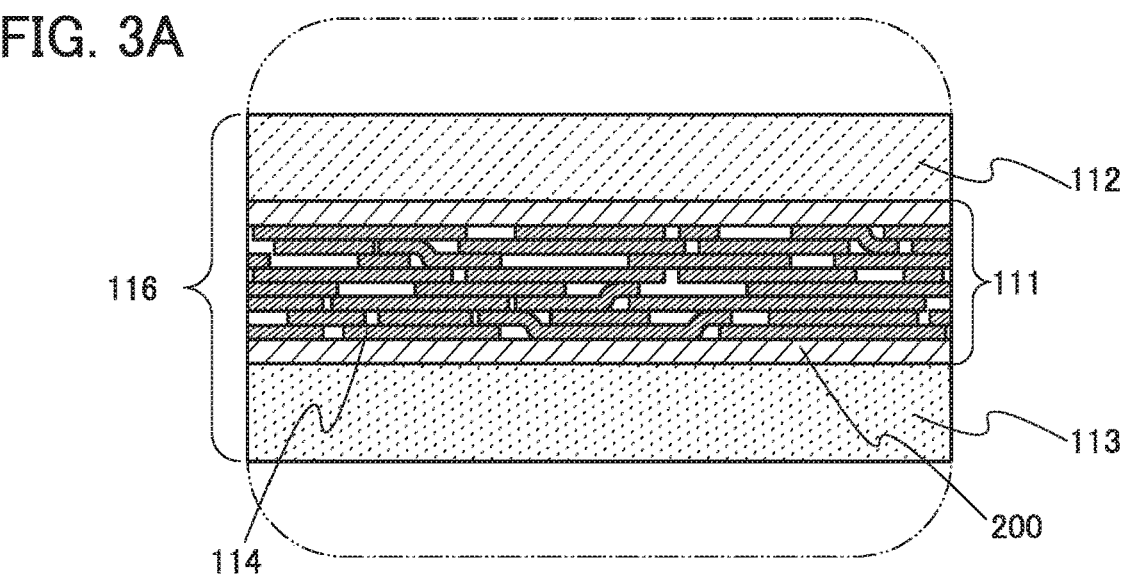
FIGS. 3A to 3C each illustrate a secondary battery.
Figure 3B:
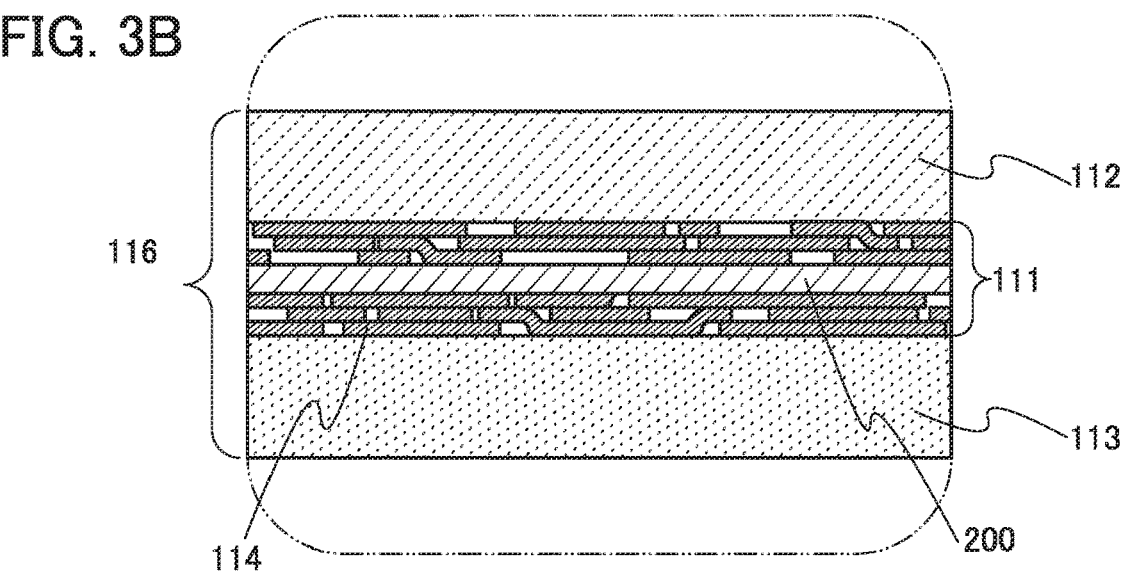
Figure 3C:
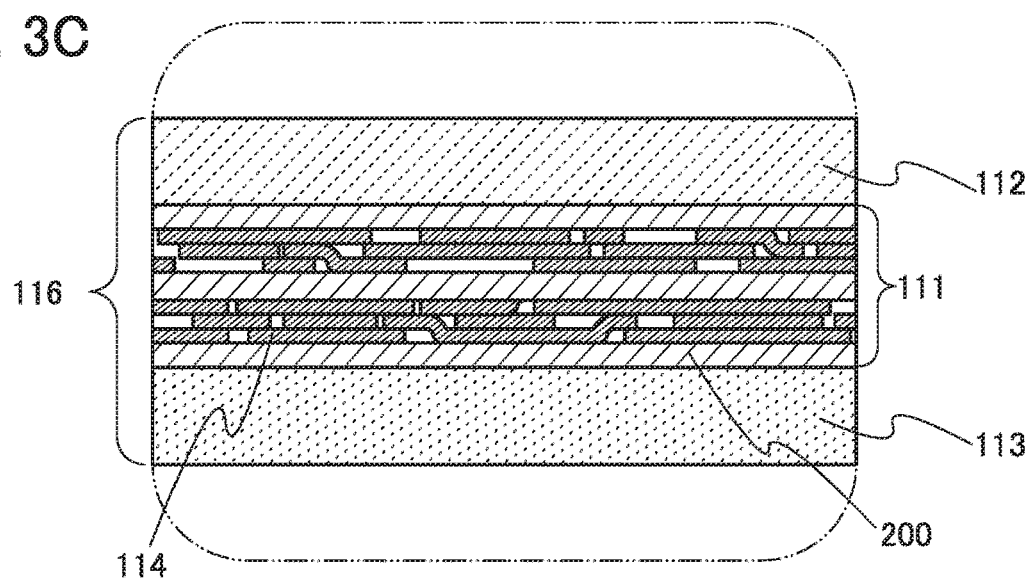

Furthermore, as shown in FIGS. 3A to 3C, a highly flexible thin metal film 200 of aluminum, stainless steel, copper, nickel, or the like may be provided in the region 111. FIG. 3A shows a structure in which a layer including the thin flakes 114 containing reduced graphene oxide is sandwiched between parts of the metal film 200 in the region 111. FIG. 3B shows a structure in which the thin metal film 200 is provided between layers including the thin flakes 114 containing reduced graphene oxide in the region 111. As shown in FIG. 3C, the structure of the region 111 in FIG. 3A and that in FIG. 3B may be combined. Further alternatively, the number of stacks of the thin metal film 200 and the layer including the thin flakes 114 containing reduced graphene oxide may be increased.

Figure 4A:
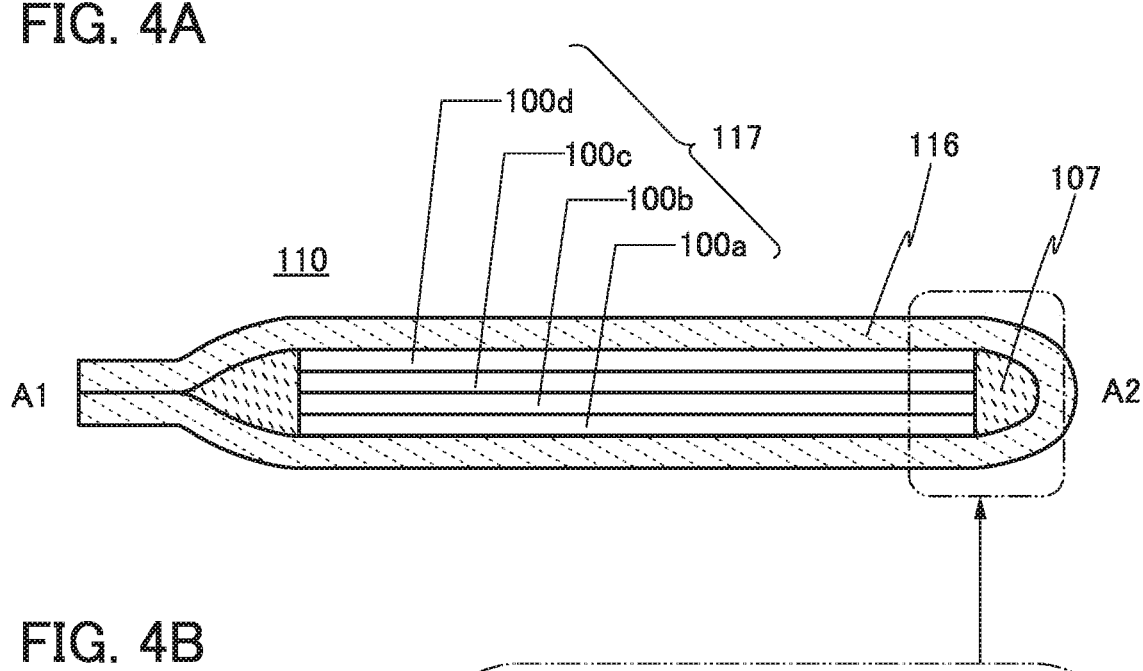
FIGS. 4A and 4B illustrate a secondary battery.
Figure 4B:
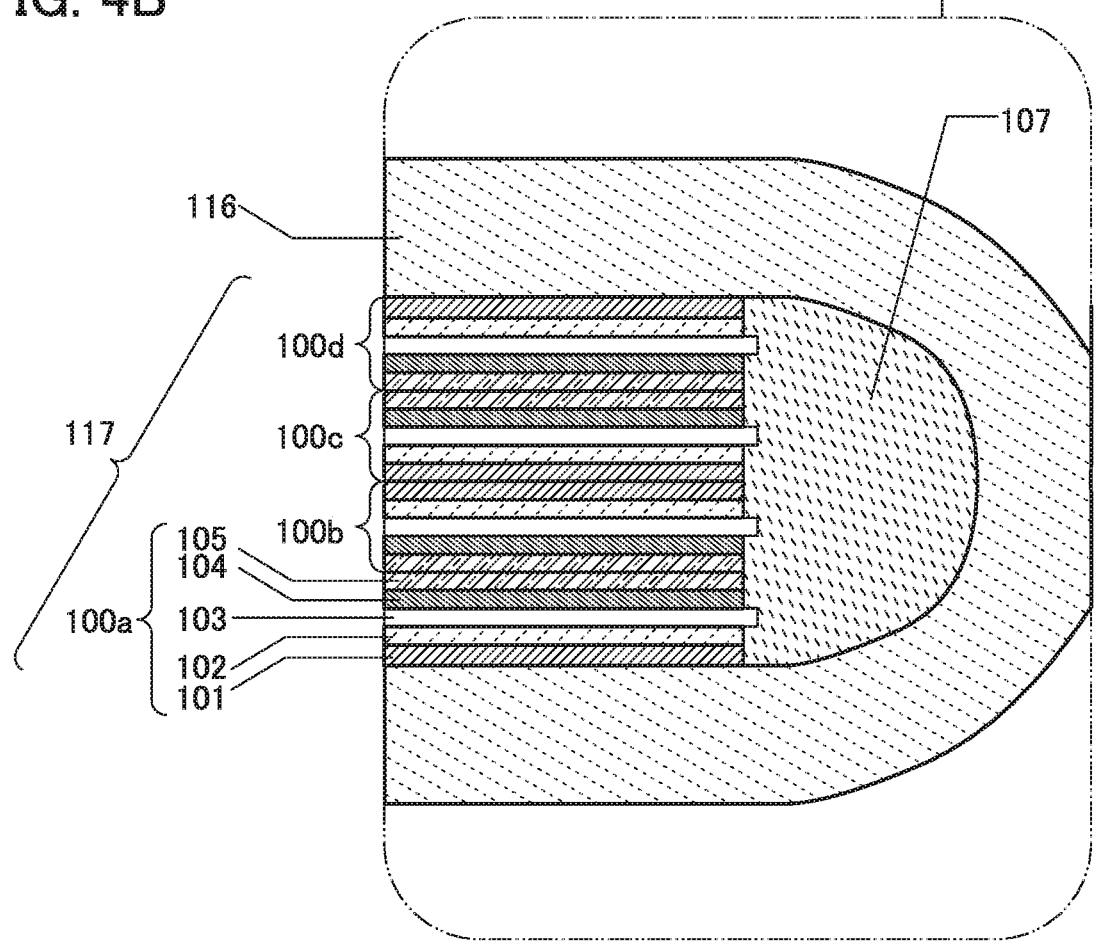

FIG. 4A shows a cross-sectional view taken along line A1-A2 in FIG. IA, and FIG. 4B shows an enlarged view of an end portion of the inner structure 117. As shown in FIG. 4B, each stack in the inner structure 117 includes a negative electrode current collector 101, a negative electrode active material layer 102, a separator 103, a positive electrode active material layer 104, and a positive electrode current collector 105.

As shown in FIG. 4B, in the secondary battery 110, the same layers are stacked in the first to fourth stacks 100a to 100d; however, the stacking order of layers are reversed in relative position between adjacent stacks. Note that, all the stack does not necessarily have the same structure.

In the secondary battery 110, a surface of the positive electrode current collector 105 of the first stack 100a on which the positive electrode active material layer 104 is not provided is in contact with a surface of the positive electrode current collector 105 of the second stack 100b on which the positive electrode active material layer 104 is not provided; a surface of the negative electrode current collector 101 of the second stack 100b on which the negative electrode active material layer 102 is not provided is in contact with a surface of the negative electrode current collector 101 of the third stack 100c on which the negative electrode active material layer 102 is not provided; a surface of the positive electrode current collector 105 of the third stack 100c on which the positive electrode active material layer 104 is not provided is in contact with a surface of the positive electrode current collector 105 of the fourth stack 100d on which the positive electrode active material layer 104 is not provided. However, in the secondary battery 110 of one embodiment of the present invention, not all the stacks are necessarily configured so that the same current collectors are in contact with each other. Further alternatively, an active material layer may be provided on surfaces of the negative electrode current collector and the positive electrode current collector.

Figure 5A:
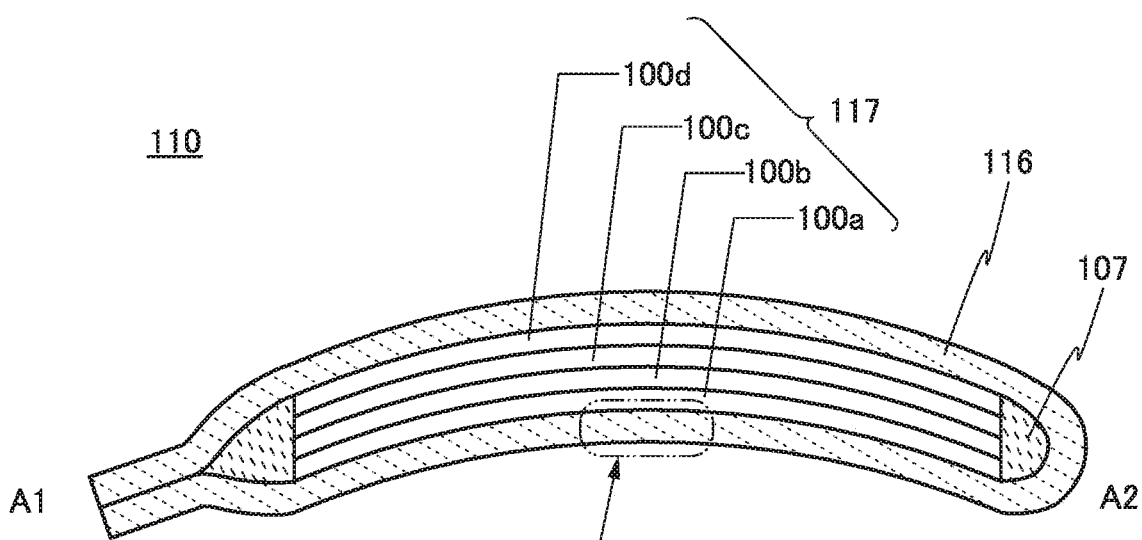
FIGS. 5A and 5B illustrate a secondary battery.
Figure 5B:
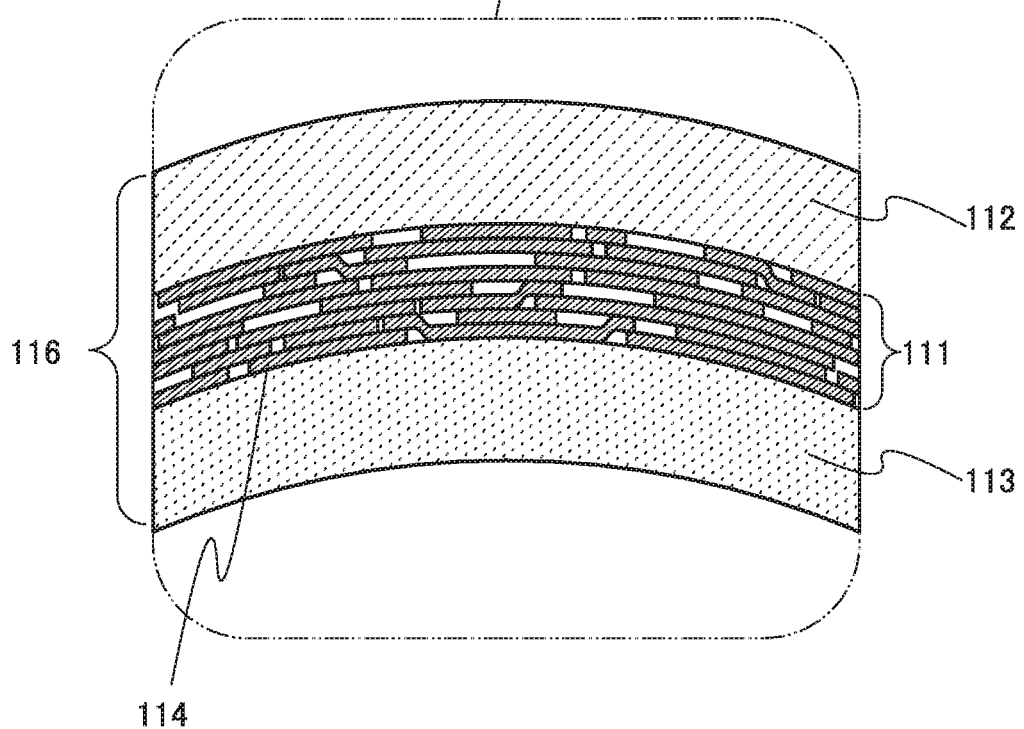

The secondary battery 110 of one embodiment of the present invention is flexible and can be changed into various shapes. For example, as shown in FIG. 5A, the secondary battery 110 can be bent. In that case, as shown in the enlarged view of the exterior body 116 in FIG. 5B, the thin flakes 114 in the region 111 can slide and shift their positions. Thus, when the secondary battery 110 is repeatedly bent, the concentration of local stress can be suppressed, so that breakage of the exterior body 116 can be prevented.

Since the thin flakes 114 contain reduced graphene oxide with excellent slidability, the exterior body 116 that is less likely to be broken not only when being bent but also being changed in shape due to expansion and contraction can be provided.

Figure 6A:
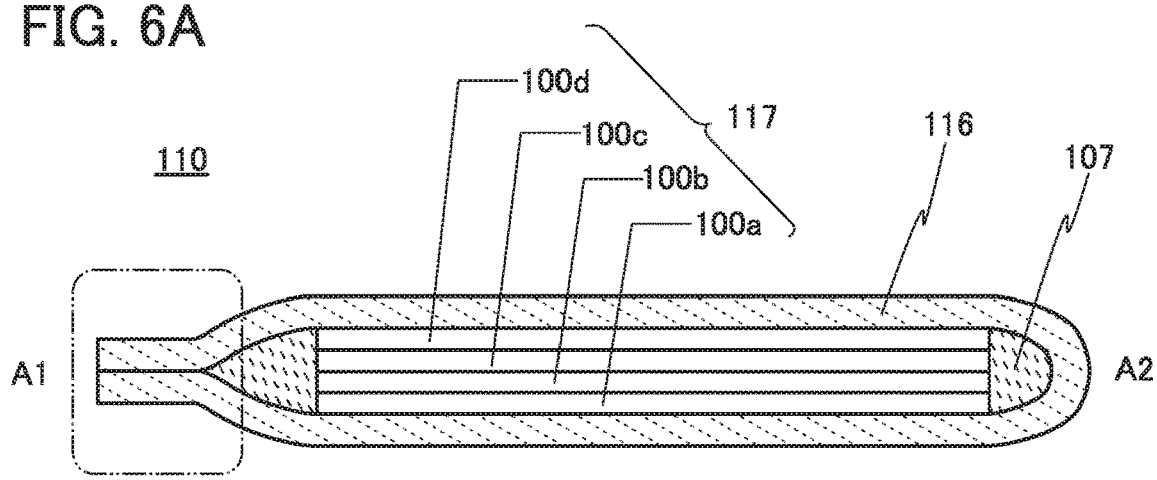
FIGS. 6A to 6C illustrate a secondary battery.
Figure 6B:
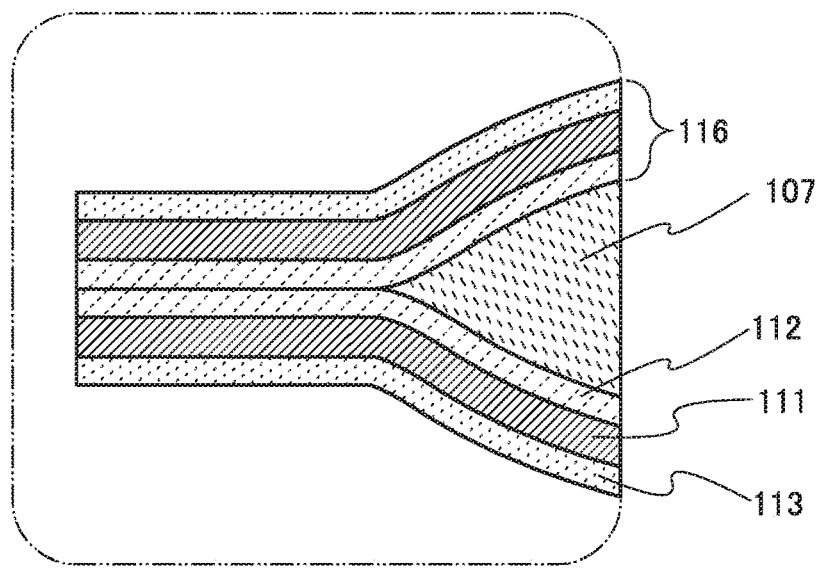
Figure 6C:
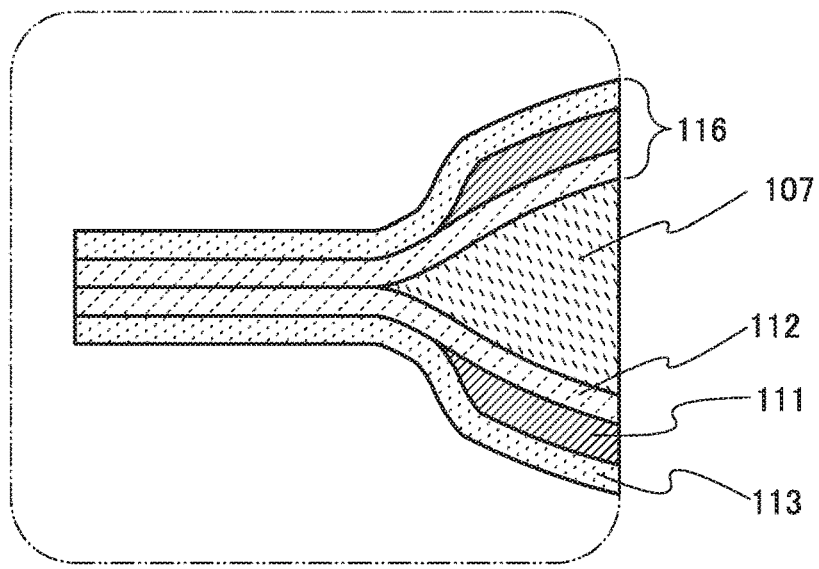

FIGS. 6B and 6C each show an enlarged view of a portion surrounded by a dashed-two dotted line where parts of the exterior body 116 are in contact with each other in the secondary battery 110 in FIG. 6A.

As shown in FIG. 6B, a structure may be employed in which the region 111 is formed in the entire exterior body 116. Alternatively, as shown in FIG. 6C, a structure may be employed in which the region 111 is not formed in part of the exterior body 116.

Next, a secondary battery of one embodiment of the present invention will be described.

<Structure of Positive Electrode>

First, a positive electrode is described. The positive electrode includes the positive electrode active material layer 104 and the positive electrode current collector 105.

As a material for a positive electrode active material used for the positive electrode active material layer 104, a material into and from which carrier ions such as lithium ions can be inserted and extracted can be used. Examples of the material are a lithium-containing material with an olivine crystal structure, a layered rock-salt crystal structure, and a spinel crystal structure.

Typical examples of the lithium-containing material with an olivine crystal structure ($LiMPO_4$ (general formula) (M is Fe(II), Mn(II), Co(II), or Ni(II))) are $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

For example, lithium iron phosphate ($LiFePO_4$) is preferable because it properly has properties necessary for the positive electrode active material, such as safety, stability, high capacity density, high potential, and the existence of lithium ions which can be extracted in initial oxidation (charge).

Examples of the lithium-containing material with a layered rock-salt crystal structure include lithium cobalt oxide ($LiCoO_2$), $LiNiO_2$, $LiMnO_2$, $Li_2MnO_3$, a NiCo-based material (general formula: $LiNi_xCo_{1-x}O_2$ (0<x<1)) such as $LiNi_{0.8}Co_{0.2}O_2$, a NiMn-based material (general formula: $LiNi_xMn_{1-x}O_2$ (0<x<1)) such as $LiNi_{0.5}Mn_{0.5}O_2$, and a NiMnCo-based material (also referred to as NMC) (general formula: $LiNi_xMn_yCo_{1-x-y}O_2$ (x>0, y>0, x+y<1)) such as $LiNi_{1/3}Mn_{1/3}Co_{1/3}O_2$, $Li(Ni_{0.8}Co_{0.15}Al_{0.05})O_2$, $Li_2MnO_3$—$LiMO_2$ (M=Co, Ni, or Mn).

In particular, $LiCoO_2$ is preferable because it has advantages such as high capacity, higher stability in the air than that of $LiNiO_2$, and higher thermal stability than that of $LiNiO_2$.

Examples of the lithium-containing material with a spinel crystal structure are $LiMn_2O_4$, $Li_{1-x}Mn_{2-x}O_4$ (0<x<2), $LiMn_{2-x}Al_xO_4$ (0<x<2), and $LiMn_{1.5}Ni_{0.5}O_4$.

It is preferred that a small amount of lithium nickel oxide ($LiNiO_2$ or $LiNi_{1-x}M_xO_2$ (M=Co, Al, or the like), (0<x<1)) be added to the lithium-containing material with a spinel crystal structure that contains manganese, such as $LiMn_2O_4$, in which case the dissolution of manganese and the decomposition of an electrolytic solution can be suppressed, for example.

Alternatively, a composite oxide expressed by $Li_{(2-j)}MSiO_4$ (general formula) (M is Fe(II), Mn(II), Co(II), or Ni(II); 0≤j≤2) may be used as the positive electrode active material. Typical examples of the general formula $Li_{(2-j)}MSiO_4$ are $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, for example, a compound expressed by $Li_2MPO_4F$, $Li_2AlP_2O_7$, or $Li_5MO_4$ (general formula) (M=Fe or Mn), a perovskite fluoride such as $NaF_3$ and $FeF_3$, a metal chalcogenide (a sulfide, a selenide, or a telluride) such as $TiS_2$ and $MoS_2$, a lithium-containing material with an inverse spinel structure such as $LiMVO_4$, a vanadium oxide ($V_2O_5$, $V_6O_{13}$, $LiV_3O_8$, or the like), a manganese oxide, or an organic sulfur compound can be used as the positive electrode active material.

In the case where carrier ions are alkali metal ions other than lithium ions, or alkaline-earth metal ions, a material containing an alkali metal (e.g., sodium and potassium) or an alkaline-earth metal (e.g., calcium, strontium, barium, beryllium, and magnesium) instead of lithium in any of the above compounds and oxides may be used as the positive electrode active material. For example, the positive electrode active material may be a sodium-containing layered oxide such as $NaFeO_2$ or $Na_{2/3}[Fe_{1/2}Mn_{1/2}]O_2$.

Further alternatively, any of the aforementioned materials may be combined to be used as the positive electrode active material. For example, a solid solution obtained by combining two or more of the above materials can be used as the positive electrode active material. For example, a solid solution of $LiCo_{1/3}Mn_{1/3}Ni_{1/3}O_2$ and $Li_2MnO_3$ can be used as the positive electrode active material.

The average diameter of primary particles of the positive electrode active material is preferably greater than or equal to 50 nm and less than or equal to 100 μm.

The positive electrode active material and a negative electrode active material have a main role in battery reactions of a secondary battery, and occlude and release carrier ions. To increase the lifetime of the secondary battery, a material that has a small amount of capacity relating to irreversible battery reactions and has high charge and discharge efficiency is preferably used for the active materials.

The active material is in contact with an electrolytic solution. When the active material reacts with the electrolytic solution and the active material is lost and deteriorates by the reaction, the capacity of the storage battery is decreased. Thus, in order to obtain the secondary battery with less deterioration, it is desirable that such a reaction not be caused in the secondary battery.

Examples of the conductive additive of the electrode include acetylene black (AB), graphite (black lead) particles, carbon nanotubes, graphene, graphene oxide, and fullerene.

A network for electrical conduction can be formed in the electrode by the conductive additive. The conductive additive also allows the maintenance of a path for electric conduction between the positive electrode active material particles. The addition of the conductive additive to the positive electrode active material layer increases the electrical conductivity of the positive electrode active material layer 104.

As the binder, polyvinylidene fluoride (PVDF) as a typical example, polyimide, polytetrafluoroethylene, polyvinyl chloride, ethylene-propylene-diene polymer, fluorine rubber, polymethyl methacrylate, polyethylene, nitrocellulose, or the like can be used.

The binder content in the positive electrode active material layer 104 is preferably greater than or equal to 1 wt % and less than or equal to 10 wt %, more preferably greater than or equal to 2 wt % and less than or equal to 8 wt %, still more preferably greater than or equal to 3 wt % and less than or equal to 5 wt %. The conductive additive content in the positive electrode active material layer 104 is preferably greater than or equal to 1 wt % and less than or equal to 10 wt %, more preferably greater than or equal to 1 wt % and less than or equal to 5 wt %.

In the case where the positive electrode active material layer 104 is formed by a coating method, the positive electrode active material, the binder, the conductive additive, and a dispersion medium are mixed to form an electrode slurry, and the electrode slurry is applied to the positive electrode current collector 105 and dried.

The positive electrode current collector 105 can be formed using a material which has high conductivity and is not alloyed with a carrier ion of lithium or the like, such as stainless steel, gold, platinum, aluminum, and titanium, an alloy thereof, and the like. Alternatively, an aluminum alloy to which an element that improves heat resistance, such as silicon, titanium, neodymium, scandium, and molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 105 can have a foil-like shape, a plate-like shape (sheet-like shape), a net-like shape, a punching-metal shape, an expanded-metal shape, or the like as appropriate. The positive electrode current collector 105 preferably has a thickness of greater than or equal to 5 μm and less than or equal to 30 μm. A part of the surface of the electrode current collector may be provided with an undercoat layer using graphite, graphene, graphene oxide, or the like.

Note that a structure in which the positive electrode active material layer 104 is provided for one surface of the positive electrode current collector 105 and not provided for the other surface thereof can be employed. In the structure, the surface of the positive electrode current collector 105 on which the positive electrode active material layer 104 is not provided is flat, and has low coefficient of friction. Thus, when a surface of another positive electrode current collector 105 on which the positive electrode active material layer 104 is not provided is in contact with that surface, the current collectors can mutually slide in response to the stress.

In the above manner, the positive electrode of the secondary battery can be manufactured.

<Structure of Negative Electrode>

Next, a negative electrode is described. The negative electrode includes the negative electrode active material layer 102 and the negative electrode current collector 101. Steps of forming the negative electrode are described below.

Examples of the carbon-based material as a negative electrode active material used for the negative electrode active material layer 102 include graphite, graphitizing carbon (soft carbon), non-graphitizing carbon (hard carbon), a carbon nanotube, graphene, carbon black, and the like. Examples of the graphite include artificial graphite such as meso-carbon microbeads (MCMB), coke-based artificial graphite, or pitch-based artificial graphite and natural graphite such as spherical natural graphite. In addition, examples of the shape of the graphite include a flaky shape and a spherical shape.

Other than the carbon-based material, a material that enables charge-discharge reactions by an alloying reaction and a dealloying reaction with lithium can be used for the negative electrode active material. A material containing at least one of Ga, Si, Al, Ge, Sn, Pb, Sb, Bi, Ag, Zn, Cd, In, and the like can be used, for example. Such elements have a higher capacity than carbon. In particular, silicon has a high theoretical capacity of 4200 mAh/g. Examples of the alloy-based material using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, for the negative electrode active material, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

When a nitride containing lithium and a transition metal is used, lithium ions are contained in the negative electrode active material and thus the negative electrode active material can be used in combination with a material for a positive electrode active material that does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material that causes a conversion reaction can be used for the negative electrode active material: for example, a transition metal oxide that does not cause an alloy reaction with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

The particle diameter of the negative electrode active material is preferably greater than or equal to 50 nm and less than or equal to 100 μm, for example.

Note that a plurality of materials for an active material can be combined at a given proportion both for the positive electrode active material layer 104 and the negative electrode active material layer 102. The use of a plurality of materials for the active material layer makes it possible to select the property of the active material layer in more detail.

Examples of the conductive additive in the electrode include acetylene black (AB), graphite (black lead) particles, carbon nanotubes, graphene, graphene oxide, and fullerene.

A network for electric conduction can be formed in the electrode by the conductive additive. The conductive additive also allows maintaining of a path for electric conduction between the negative electrode active material particles. The addition of the conductive additive to the negative electrode active material layer increases the electric conductivity of the negative electrode active material layer 102.

A typical example of the binder is polyvinylidene fluoride (PVDF), and other examples of the binder include polyimide, polyvinyl chloride, ethylene-propylene-diene polymer, styrene-butadiene rubber, acrylonitrile-butadiene rubber, fluorine rubber, polyvinyl acetate, polymethyl methacrylate, polyethylene, and nitrocellulose.

The content of the binder in the negative electrode active material layer 102 is preferably greater than or equal to 1 wt % and less than or equal to 10 wt %, more preferably greater than or equal to 2 wt % and less than or equal to 8 wt %, still more preferably greater than or equal to 3 wt % and less than or equal to 5 wt %. The content of the conductive additive in the negative electrode active material layer 102 is preferably greater than or equal to 1 wt % and less than or equal to 10 wt %, more preferably greater than or equal to 1 wt % and less than or equal to 5 wt %.

In the case where the negative electrode active material layer 102 is formed by a coating method, the negative electrode active material, the binder, the conductive additive, and a dispersion medium are mixed to form a slurry, and the slurry is applied to the negative electrode current collector 101 and dried. If necessary, pressing may be performed after the drying.

The negative electrode current collector 101 can be formed using a highly conductive material that is not alloyed with a carrier ion of, for example, lithium, such as a metal typified by stainless steel, gold, platinum, iron, copper, titanium, and tantalum or an alloy thereof. Alternatively, a metal element that forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The negative electrode current collector 101 can have a foil-like shape, a plate-like shape (sheet-like shape), a net-like shape, a cylindrical shape, a coil shape, a punching-metal shape, an expanded-metal shape, or the like as appropriate. The negative electrode current collector 101 preferably has a thickness of greater than or equal to 5 μm and less than or equal to 30 μm. A part of a surface of the electrode current collector may be provided with an undercoat layer using graphite, graphene, graphene oxide, or the like.

Note that a structure in which the negative electrode active material layer 102 is provided for one surface of the negative electrode current collector 101 and the negative electrode active material layer 102 is not provided for the other surface thereof can be employed. In that case, the surface of the negative electrode current collector 101 on which the negative electrode active material layer 102 is not provided is flat, and has low coefficient of friction. Thus, when a surface of another negative electrode current collector on which the negative electrode active material layer 102 is not provided is in contact with that surface, the current collectors can mutually slide in response to the stress.

In the above manner, the negative electrode of the secondary battery can be formed.

<Structure of Separator>

The separator 103 may be formed using a material such as paper, nonwoven fabric, fiberglass, synthetic fiber such as nylon (polyamide), vinylon (polyvinyl alcohol based fiber), polyester, acrylic, polyolefin, or polyurethane. However, a material that does not dissolve in an electrolytic solution described later needs to be selected.

More specifically, as a material for the separator 103, any of polymer compounds based on a fluorine-based polymer, polyethers such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, nonwoven fabric, and fiberglass can be used either alone or in combination.

The separator 103 needs to have an insulating property of inhibiting the contact between the positive electrode and the negative electrode, a property of holding the electrolytic solution, and ionic conductivity. As a method for forming a film having a function as a separator, a method for forming a film by stretching is given. Examples of the method include a stretching aperture method in which a melted polymer material is spread, heat is released from the material, and pores are formed by stretching the resulting film in the directions of two axes parallel to the film.

Through the above steps, the separator can be incorporated in the secondary battery.

<Components of Electrolytic Solution>

The electrolytic solution 107 used in the secondary battery of one embodiment of the present invention is preferably a nonaqueous solution (solvent) containing an electrolyte (solute).

For a solvent of the electrolytic solution 107, a material in which carrier ions can transfer is used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as the solvent for the electrolytic solution 107, safety against liquid leakage and the like is improved. Furthermore, a secondary battery can be thinner and more lightweight. Typical examples of the gelled high-molecular material include a silicone gel, an acrylic gel, an acrylonitrile gel, a poly(ethylene oxide)-based gel, a poly(propylene oxide)-based gel, a gel of a fluorine-based polymer, and the like.

Alternatively, the use of one or more of ionic liquids (room temperature molten salts) that have non-flammability and non-volatility as the solvent for the electrolytic solution can prevent a secondary battery from exploding or catching fire even when the secondary battery internally shorts out or the internal temperature increases due to overcharging or the like. Thus, the secondary battery has improved safety.

The electrolytic solution used for the secondary battery preferably contains a small amount of dust particles and elements other than the constituent elements of the electrolytic solution (hereinafter, also simply referred to as impurities) so as to be highly purified. Specifically, the mass ratio of impurities to the electrolytic solution is less than or equal to 1%, preferably less than or equal to 0.1%, and more preferably less than or equal to 0.01%. An additive agent such as vinylene carbonate may be added to the electrolytic solution.

In the case of using lithium ions as carrier ions, as an electrolyte dissolved in the above-described solvent, one of lithium salts such as $LiPF_6$, $LiFlO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}C_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination at an appropriate ratio.

Although the case where carrier ions are lithium ions in the above electrolyte is described, carrier ions other than lithium ions can be used. When the carrier ions other than lithium ions are alkali metal ions or alkaline-earth metal ions, instead of lithium in the lithium salts, an alkali metal (e.g., sodium or potassium) or an alkaline-earth metal (e.g., calcium, strontium, barium, beryllium, or magnesium) may be used as the electrolyte.

Note that the electrolytic solution reacts with and corrodes the positive electrode current collector in some cases. In order to inhibit such corrosion, several weight percent of $LiPF_6$ is preferably added to the electrolytic solution, in which case a passivating film is formed on a surface of the positive electrode current collector and inhibits a reaction between the electrolytic solution and the positive electrode current collector. Note that for maintenance of the cycle life at high temperatures the concentration of $LiPF_6$ is less than or equal to 10 wt %, preferably less than or equal to 5 wt %, and more preferably less than or equal to 3 wt % in order that the positive electrode material layer is not dissolved.

<Structure of Exterior Body>

Next, the exterior body 116 is described. As the exterior body 116, for example, an exterior film having a three-layer structure can be employed in which a layer (or a region) containing reduced graphene oxide is provided over a film containing an organic material such as polyethylene, polypropylene, polycarbonate, ionomer, or polyamide, and a film containing an organic material such as an insulating synthetic resin, e.g. a silicone resin, a polyamide-based resin, or a polyester-based resin, is provided as an outer surface of the exterior body over the layer containing reduced graphene oxide. With such a three-layer structure, permeation of an electrolytic solution and a gas can be blocked and an insulating property and resistance to the electrolytic solution can be obtained. The exterior body is folded inside in two, or two exterior bodies are stacked with the inner surfaces facing each other, in which case application of heat melts the materials on the overlapping inner surfaces to cause fusion bonding between the two exterior bodies. In this manner, a sealing structure can be formed.

Although, in the above description, the exterior film having a three-layer structure is used as the exterior body, one embodiment of the present invention is not limited thereto. For example, a two-layer structure including the film containing an organic material and the layer containing reduced graphene oxide may be employed; alternatively, a structure of four or more layers may be employed.

Graphene oxide is a raw material of graphene. Graphene oxide can be formed by various synthesis methods such as a Hummers method, a modified Hummers method, and oxidation of graphite.

In the Hummers method, graphite such as flake graphite is oxidized to give graphite oxide. The obtained graphite oxide is graphite which is oxidized in places and thus to which a functional group such as a carbonyl group, a carboxyl group, or a hydroxyl group is bonded. In the graphite oxide, the crystallinity of the graphite is lost and the distance between layers is increased. Therefore, the layers can be easily separated by ultrasonic treatment or the like to obtain graphene oxide.

Note that the length of one side (also referred to as a flake size) of graphene oxide can be greater than or equal to 50 nm and less than or equal to 100 μm, preferably greater than or equal to 800 nm and less than or equal to 20 μm.

Graphene can be obtained in such a manner that graphene oxide and a reducing agent are added to a solvent to cause a chemical reaction, whereby chemical reduction of the graphene oxide is performed. The reduction treatment can be performed at a temperature in the range from room temperature to the boiling point of the solvent, for example, at a temperature in the range from room temperature to 150° C. Note that in the reduction treatment, it is possible that oxygen in the graphene oxide not be entirely extracted and partly remain.

Examples of the reducing agent include L-ascorbic acid, hydrazine, dimethyl hydrazine, hydroquinone, sodium tetrahydroborate ($NaBH_4$), lithium aluminum hydride ($LiAlH_4$), N,N-diethylhydroxylamine, and a derivative thereof. In particular, L-ascorbic acid and hydroquinone are preferable to hydrazine and $NaBH_4$ in that they are safe due to low reducing ability and utilized industrially with ease.

A polar solvent can be used as the solvent. Any material can be used for the polar solvent as long as it can dissolve the reducer. Examples of the material of the polar solvent include water, methanol, ethanol, acetone, tetrahydrofuran (THF), dimethylformamide (DMF), N-methylpyrrolidone (NMP), dimethyl sulfoxide (DMSO), and a mixed solution of any two or more of the above.

After the reduction treatment, drying is performed. The drying can be performed by ventilation drying, vacuum drying, or the like at room temperature or higher. For example, the drying can be performed using hot air at 50° C. or higher. Accordingly, the solvent used in the reduction treatment can be evaporated. There is no particular limitation on the atmosphere. Note that "vacuum" refers to the state of a space filled with a gas with a pressure lower than an atmospheric pressure.

Next, thermal reduction by heat treatment may be performed. The heat treatment (thermal reduction) can be performed at 100° C. or higher in vacuum, for example.

As described above, graphene can be formed.

Examples of methods for reducing graphene oxide include a method of causing reduction by releasing oxygen atoms in graphene oxide mainly as carbon dioxide by only thermal reduction and a method of causing a chemical reaction with the use of a reducing agent by only chemical reduction. Graphene of one embodiment of the present invention, which is obtained by performing chemical reduction and thermal reduction in this order, is different from graphene formed by only thermal reduction or chemical reduction in at least the following points. The graphene of one embodiment of the present invention contains a higher proportion of carbon atoms measured by XPS than graphene formed by only chemical reduction. Furthermore, the graphene of one embodiment of the present invention contains a higher proportion of $sp^2$-bonded carbon atoms than graphene formed by only thermal reduction. Furthermore, the graphene of one embodiment of the present invention has a lower resistivity than graphene formed by only thermal reduction or chemical reduction.

Note that one embodiment of the present invention is not limited thereto. For example, the order or the number of times of thermal reduction, chemical reduction, and/or the like can be changed depending on the case or according to the circumstance.

<Method for Forming Layer Containing Reduced Graphene Oxide>

As a method for forming the layer containing reduced graphene oxide, slurry containing graphene oxide is formed. The "slurry" refers to a suspension in which a material and a solvent are mixed.

Next, the layer containing graphene oxide is formed using the slurry. The layer containing graphene can be formed over any of an insulator, a semiconductor, and a conductor. In this embodiment, the layer containing graphene oxide is formed over a film containing an organic material such as polyethylene, polypropylene, polycarbonate, ionomer, or polyamide.

The layer containing graphene oxide can be formed by a coating method, a spin coating method, a dip coating method, a spray coating method, or the like. An example of the coating method includes a blade method. Alternatively, these methods may be combined as appropriate to be employed. For example, after the layer containing graphene oxide is formed by a dip coating method, the layer containing graphene oxide is rotated by a method similar to a spin coating method, so that the evenness of the thickness of the layer containing graphene oxide can be improved.

Next, the layer containing graphene oxide is dried. The drying of the layer containing graphene oxide can be performed by ventilation drying, vacuum drying, or the like at room temperature or higher. Accordingly, the solvent can be evaporated. There is no particular limitation on the atmosphere.

The layer containing graphene oxide is soaked in a solvent and a reducing agent is added to the solvent to cause a chemical reaction, whereby chemical reduction of the graphene oxide is performed. By this process, graphene or reduced graphene oxide is formed. The reduction treatment can be performed at a temperature in the range from room temperature to the boiling point of the solvent, for example, at a temperature in the range from room temperature to 150° C. Note that it is possible that oxygen in the graphene oxide not be entirely extracted and partly remain.

Next, drying is performed. The drying can be performed by ventilation drying, vacuum drying, or the like at room temperature or higher. For example, the drying can be performed using hot air at 50° C. or higher. By this treatment, a solvent can be evaporated. There is no particular limitation on the atmosphere.

Next, thermal reduction is performed by heat treatment. The heat treatment (thermal reduction) can be performed at 100° C. or higher in vacuum, for example.

Through the above steps, the layer containing reduced graphene oxide can be formed.

Next, the film containing an organic material such as an insulating synthetic resin, e.g. a silicone resin, a polyamide-based resin, or a polyester-based resin is formed as the outer surface of the exterior body over the layer containing reduced graphene oxide. With such a three-layer structure, the exterior body which blocks permeation of an electrolytic solution and a gas and which has an insulating property and resistance to the electrolytic solution can provided.

The exterior body preferably has a sealing structure by fusion bonding or the like. In a case where two exterior bodies are stacked, the sealing portion is formed along the entire circumference by heat fusion bonding or the like.

<Secondary Battery Having Flexibility>

When a flexible material is selected from materials of the members described in this embodiment and used, a flexible secondary battery can be manufactured. Deformable devices are currently under active research and development. For such devices, flexible secondary batteries are demanded.

Figure 7A:
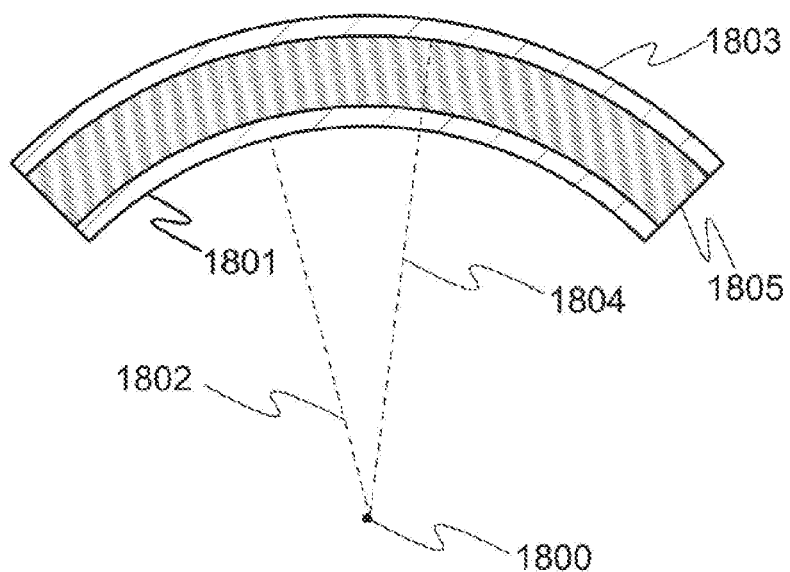
FIGS. 7A to 7D illustrate the radius of curvature.
Figure 7B:
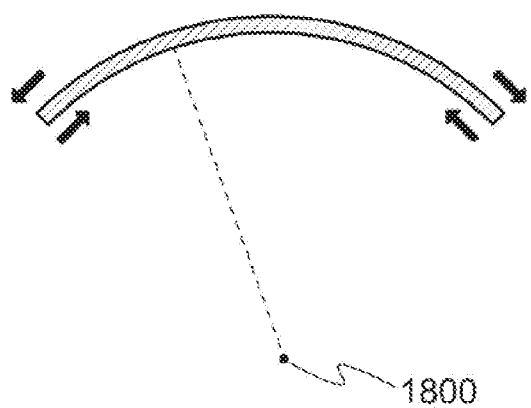

In the case of bending a secondary battery in which a component 1805 including electrodes and an electrolytic solution is sandwiched between two exterior films as exterior bodies, a radius of curvature 1802 of an exterior film 1801 close to a center of curvature 1800 of the secondary battery is smaller than a radius of curvature 1804 of an exterior film 1803 far from the center of curvature 1800 (see FIG. 7A). When the secondary battery is curved and has an arc-shaped cross section, compressive stress is applied to a surface of the exterior film on the side closer to the center of curvature 1800 and tensile stress is applied to a surface of the exterior film on the side farther from the center of curvature 1800 (see FIG. 7B).

Figure 8A:
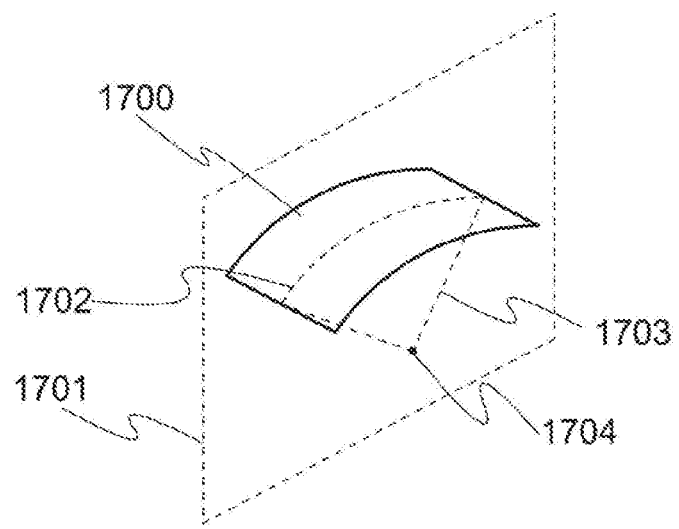
FIGS. 8A to 8C illustrate the radius of curvature.
Figure 8B:
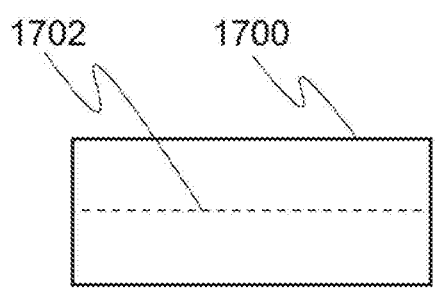
Figure 8C:
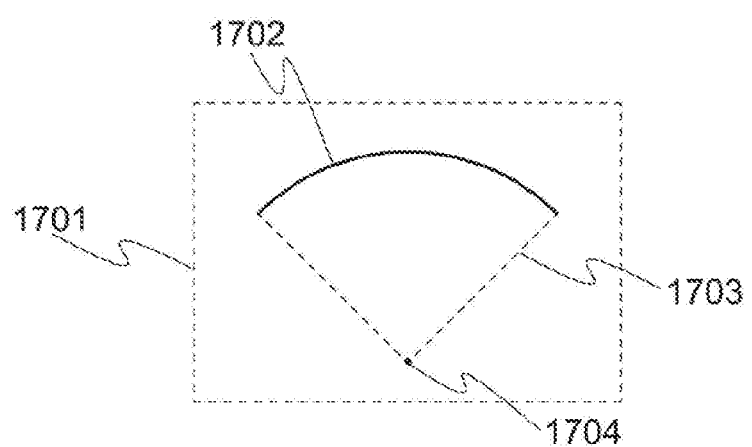

When the flexible secondary battery is changed in shape, strong stress is applied to the exterior bodies. However, even with the compressive stress and tensile stress due to the change in shape of the secondary battery, the influence of a strain can be reduced by forming a pattern including projections or depressions on surfaces of the exterior bodies. For this reason, the secondary battery can change its shape such that the exterior body on the side closer to the center of curvature has a curvature radius greater than or equal to 50 mm, preferably greater than or equal to 20 mm Description is given of the radius of curvature of a surface with reference to FIGS. 8A to 8C. In FIG. 8A, on a plane 1701 along which a curved surface 1700 is cut, part of a curve 1702 of the curved surface 1700 is approximate to an arc of a circle, and the radius of the circle is referred to as a radius 1703 of curvature and the center of the circle is referred to as a center 1704 of curvature. FIG. 8B is a top view of the curved surface 1700. FIG. 8C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

Figure 7C:
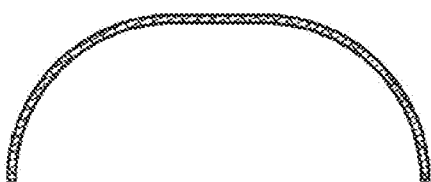
Figure 7D:

Note that the cross-sectional shape of the secondary battery is not limited to a simple arc shape, and the cross section can be partly arc-shaped; for example, a shape illustrated in FIG. 7C, a wavy shape illustrated in FIG. 7D, or an S shape can be used. When the curved surface of the secondary battery has a shape with a plurality of centers of curvature, the secondary battery can change its shape such that a curved surface with the smallest radius of curvature among radii of curvature with respect to the plurality of centers of curvature, which is a surface of the exterior body on the side closer to the center of curvature, has a curvature radius greater than or equal to 50 mm, preferably greater than or equal to 20 mm.

<Assembly of Secondary Battery and Aging>

Next, assembly of secondary battery and aging are described. The above components are combined and enclosed in the exterior body 116, so that the inner structure including a plurality of stacks including the positive electrode current collector 105, the positive electrode active material layer 104, the separator 103, the negative electrode active material layer 102, and the negative electrode current collector 101 is enclosed in the exterior body 116 together with the electrolytic solution 107 as illustrated in FIGS. 1A to 1C, FIGS. 2A and 2B, FIGS. 3A to 3C, and FIGS. 4A and 4B.

Then, an aging step is performed. First, environmental temperature is kept at about room temperature for example, and constant current charge is performed to a predetermined voltage at a low rate. Next, a gas generated in a region inside the exterior body by charging is released outside the exterior body, and then charge is performed at a rate higher than that of the initial charge After that, the secondary battery is kept at somewhat high temperatures for a long time. For example, the secondary battery is kept at higher than or equal to 40° C. for longer than or equal to 24 hours.

After the secondary battery is kept at somewhat high temperatures for a long time, gases generated in a region inside the exterior body is released again. Furthermore, the secondary battery is discharged at a rate of 0.2 C at room temperature, charged at the same rate, discharged at the same rate again, and further charged at the same rate. Then, discharge is performed at the same rate, which terminates the aging step.

In the aforementioned manner, the secondary battery of one embodiment of the present invention can be manufactured.

This embodiment can be implemented in appropriate combination with any of the structures described in the other embodiments.

Note that in the case where at least one specific example is described in a diagram or a text described in one embodiment in this specification and the like, it will be readily appreciated by those skilled in the art that a broader concept of the specific example can be derived. Therefore, in the diagram or the text described in one embodiment, in the case where at least one specific example is described, a broader concept of the specific example is disclosed as one embodiment of the invention, and one embodiment of the invention can be constituted. The embodiment of the present invention is clear.

Note that in this specification and the like, what is illustrated in at least a diagram (which may be part of the diagram) is disclosed as one embodiment of the invention, and one embodiment of the invention can be constituted. Therefore, when certain contents are described in a diagram, the contents are disclosed as one embodiment of the invention even when the contents are not described with text, and one embodiment of the invention can be constituted. In a similar manner, part of a diagram, which is taken out from the diagram, is disclosed as one embodiment of the invention, and one embodiment of the invention can be constituted. The embodiment of the present invention is clear.

In Embodiment 1, one embodiment of the present invention has been described. Other embodiments of the present invention are described in Embodiments 2 to 6. Note that one embodiment of the present invention is not limited thereto. In other words, various embodiments of the invention are described in this embodiment and the other embodiments, and one embodiment of the present invention is not limited to a particular embodiment. For example, although an example of use in a flexible lithium ion secondary battery is described in this embodiment, one embodiment of the present invention is not limited thereto. Depending on circumstances or conditions, one embodiment of the present invention can be applied to a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, and an air battery; a primary battery; a capacitor such as an electric double layer capacitor, an ultracapacitor, a supercapacitor, and a lithium ion capacitor; and the like. Furthermore, depending on circumstances or conditions, for example, one embodiment of the present invention is not necessarily applied to a lithium ion secondary battery. Although an example in which one embodiment of the present invention is applied to a curved power storage device, a flexible power storage device, or a power storage device that can change in shape is described, one embodiment of the present invention is not limited thereto. Depending on circumstances or conditions, one embodiment of the present invention may be applied to a power storage device that can have any of a variety of shapes or a power storage device that can have any level of hardness. Depending on circumstances or conditions, one embodiment of the present invention may be applied to a power storage device that is not curved and has a flat plate shape or a power storage device that has a cylindrical shape. Depending on circumstances or conditions, one embodiment of the present invention may be applied to a power storage device that does not have flexibility and cannot be changed in shape.

Embodiment 2

In this embodiment, structures of a storage battery of one embodiment of the present invention are described with reference to FIGS. 9A and 9B, FIG. 10, FIG. 11, FIGS. 12A to 12C, and FIGS. 13A to 13E.

<Laminated Storage Battery>

Next, an example of a laminated storage battery will be described with reference to FIG. 9A. When a flexible laminated storage battery is used in an electronic device at least part of which is flexible, the storage battery can be bent as the electronic device is bent.

Figure 9A:
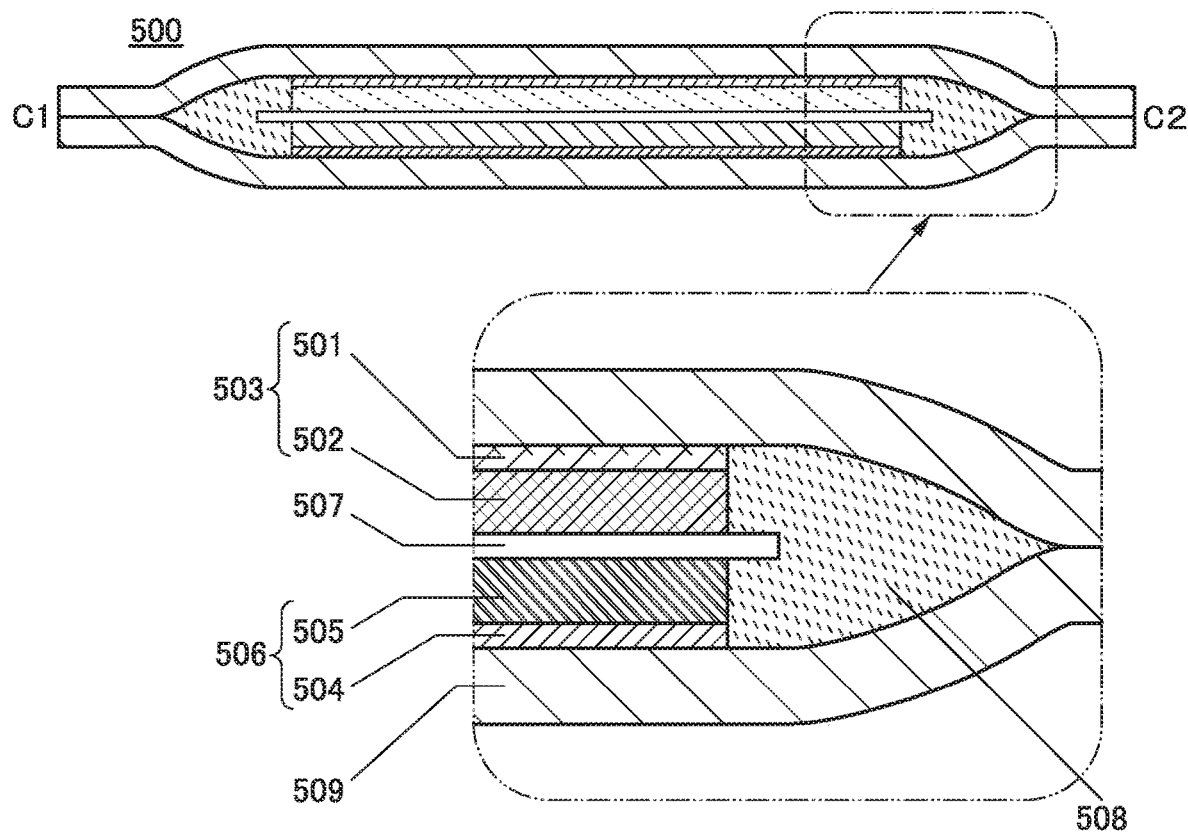
FIGS. 9A and 9B each illustrate a laminated storage battery.

A laminated storage battery 500 illustrated in FIG. 9A includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The exterior body 509 is filled with the electrolytic solution 508. The exterior body described in Embodiment 1 can be used as the exterior body 509.

In the laminated storage battery 500 illustrated in FIG. 9A, the positive electrode current collector 501 and the negative electrode current collector 504 also serve as terminals for an electrical contact with an external portion. For this reason, each of the positive electrode current collector 501 and the negative electrode current collector 504 may be arranged so that part of the positive electrode current collector 501 and part of the negative electrode current collector 504 are exposed to the outside of the exterior body 509. Alternatively, a tab electrode and the positive electrode current collector 501 or the negative electrode current collector 504 may be bonded to each other by ultrasonic welding, and instead of the positive electrode current collector 501 and the negative electrode current collector 504, the tab electrode may be exposed to the outside of the exterior body 509.

As the exterior body 509, for example, an exterior film having a three-layer structure can be used in which a layer (or a region) containing reduced graphene oxide is provided over a film containing an organic material such as polyethylene, polypropylene, polycarbonate, ionomer, or polyamide, and a film containing an organic material such as an insulating synthetic resin, e.g. a polyamide-based resin, or a polyester-based resin is provided as the outer surface of the exterior body over the layer containing reduced graphene oxide. With such a three-layer structure, permeation of an electrolytic solution and a gas can be blocked and an insulating property and resistance to the electrolytic solution can be obtained. By the application of heat, the materials on the overlapping inner surfaces melt to cause fusion bonding between the two exterior bodies. In this manner, a sealing structure can be formed.

Figure 9B:
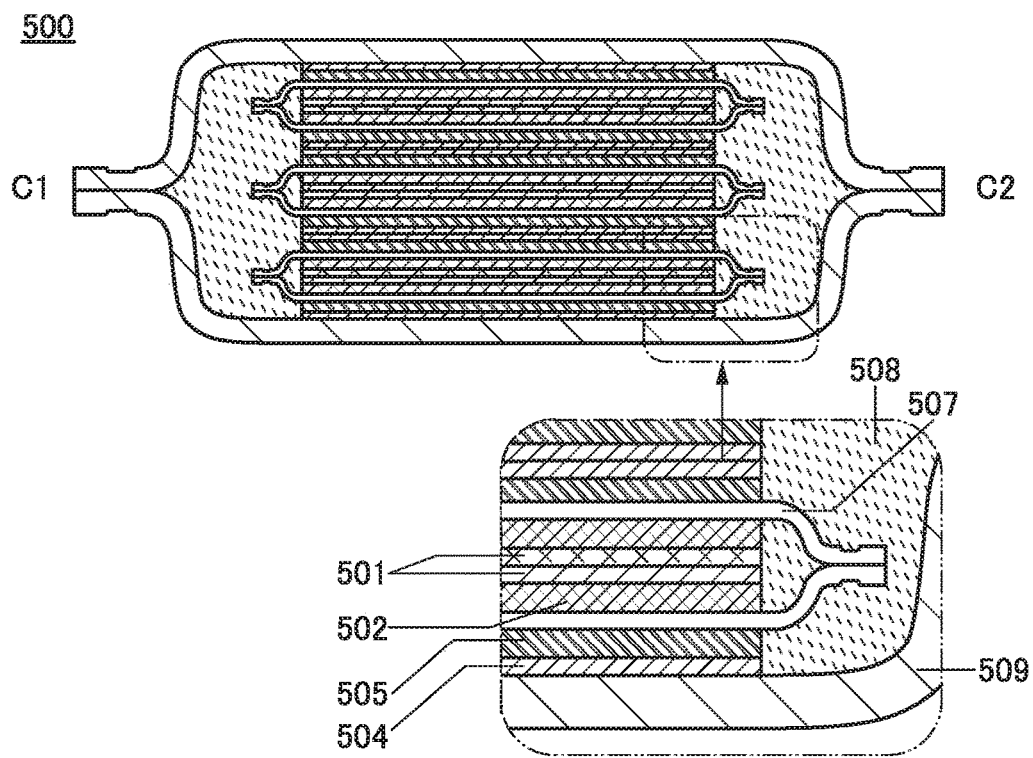

FIG. 9B illustrates an example of a cross-sectional structure of the laminated storage battery 500. Although FIG. 9A illustrates an example of a single-layer type including only two current collectors for simplicity, the actual battery is a laminated type including a plurality of electrode layers.

The example in FIG. 9B includes 12 electrode layers. The laminated storage battery 500 has flexibility even though including 12 electrode layers. FIG. 9B shows a structure including six layers of negative electrode current collectors 504 and six layers of positive electrode current collectors 501, i.e., 12 layers in total. It is needless to say that the number of electrode layers is not limited to 12, and may be more than 12 or less than 12. In the case of a large number of electrode layers, the storage battery can have high capacity. In contrast, in the case of a small number of electrode layers, the storage battery can have small thickness and high flexibility.

Figure 10:
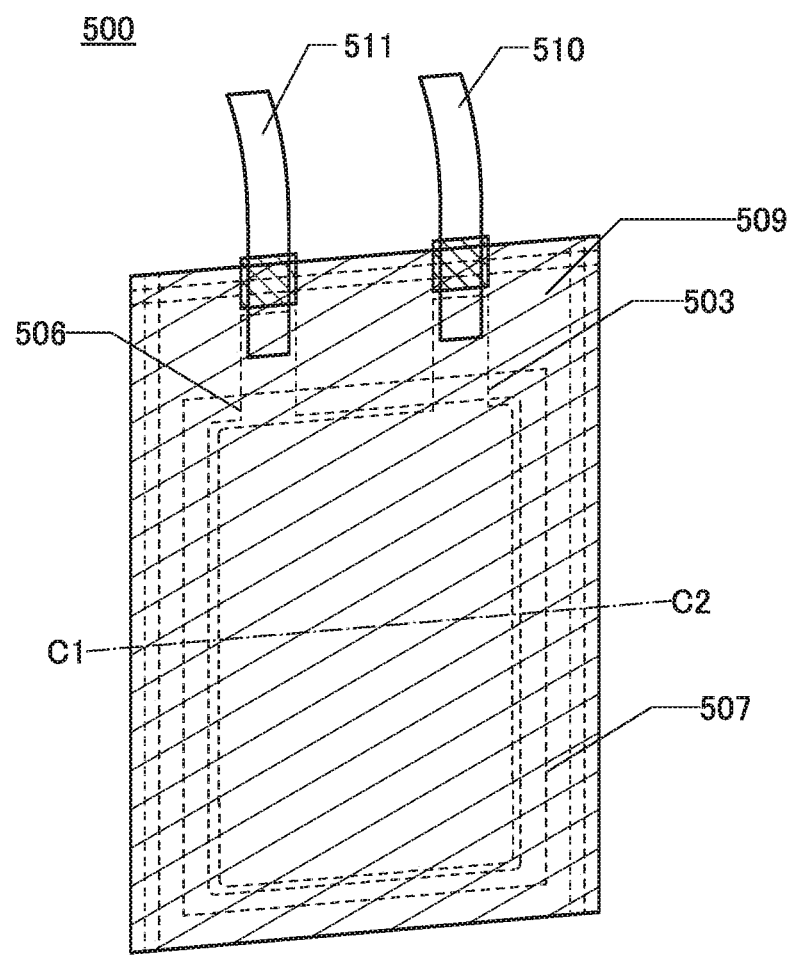
FIG. 10 is an external view of a storage battery.
Figure 11:
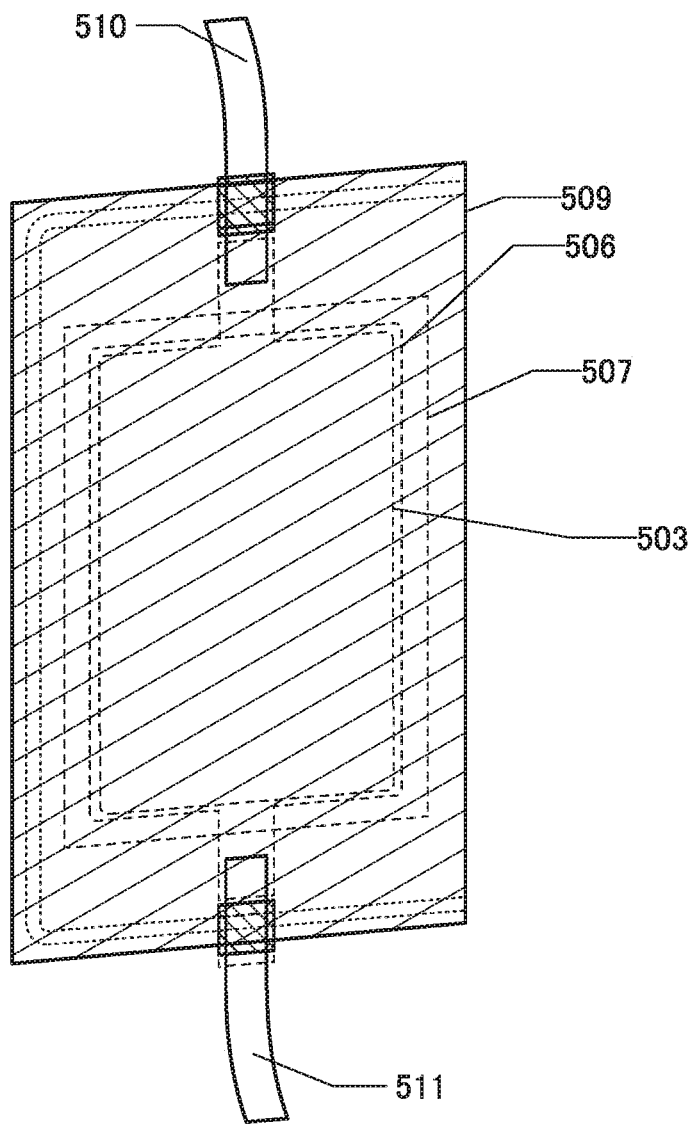
FIG. 11 is an external view of a storage battery.

FIGS. 10 and 11 each illustrate an example of the external view of the laminated storage battery 500. Note that FIGS. 9A and 9B each illustrate a cross-sectional view taken along dashed-dotted line C1-C2 of the laminated storage battery 500 in FIG. 10. In FIGS. 10 and 11, the positive electrode 503, the negative electrode 506, the separator 507, the exterior body 509, a positive electrode tab electrode 510, and a negative electrode tab electrode 511 are included.

Figure 12A:
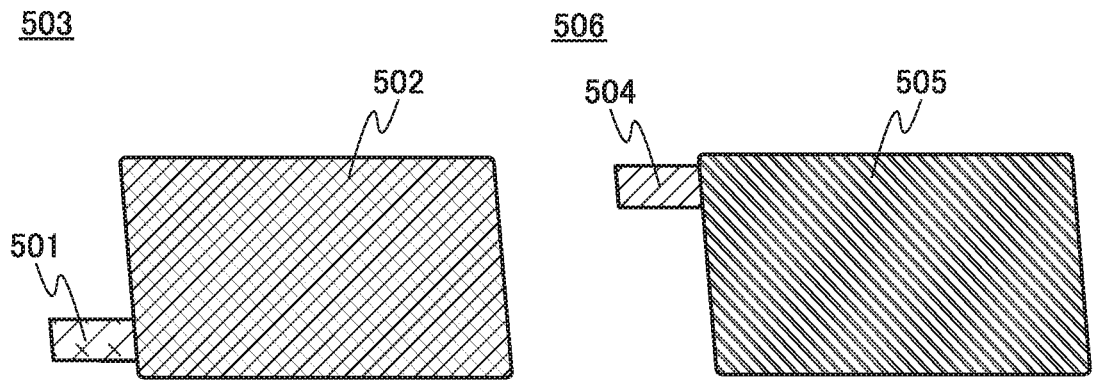
FIGS. 12A to 12C illustrate a flexible laminated storage battery.

FIG. 12A illustrates the external views of the positive electrode 503 and the negative electrode 506. The positive electrode 503 includes the positive electrode current collector 501, and the positive electrode active material layer 502 is formed on a surface of the positive electrode current collector 501. The positive electrode 503 also includes a region where the positive electrode current collector 501 is partly exposed (referred to as a tab region). The negative electrode 506 includes the negative electrode current collector 504, and the negative electrode active material layer 505 is formed on a surface of the negative electrode current collector 504. The negative electrode 506 also includes an exposed region of the negative electrode current collector 504, that is, a tab region. The areas and the shapes of the tab regions included in the positive electrode and the negative electrode are not limited to those illustrated in FIG. 12A.

<Method for Manufacturing Laminated Storage Battery>

Figure 12B:
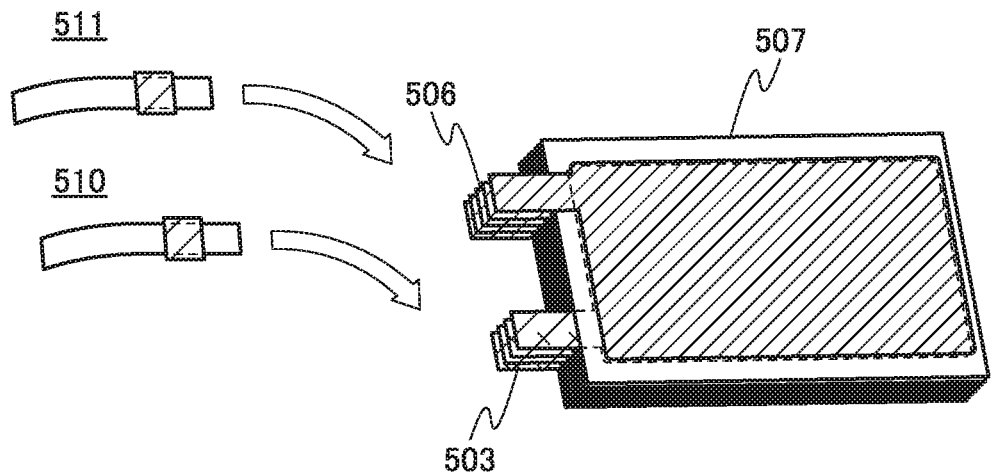

Here, an example of a method for manufacturing the laminated storage battery whose external view is illustrated in FIG. 10 will be described with reference to FIGS. 12B and 12C.

First, the negative electrode 506, the separator 507, and the positive electrode 503 are stacked. FIG. 12B illustrates a stack including the negative electrode 506, the separator 507, and the positive electrode 503. The battery described here as an example includes 5 negative electrodes and 4 positive electrodes. Next, the tab regions of the positive electrodes 503 are bonded to each other, and the tab region of the positive electrode of the outermost surface and the positive electrode tab electrode 510 are bonded to each other. The bonding can be performed by ultrasonic welding, for example. In a similar manner, the tab regions of the negative electrodes 506 are bonded to each other, and the tab region of the negative electrode of the outermost surface and the negative electrode tab electrode 511 are bonded to each other.

After that, the negative electrode 506, the separator 507, and the positive electrode 503 are placed over the exterior body 509.

Figure 12C:
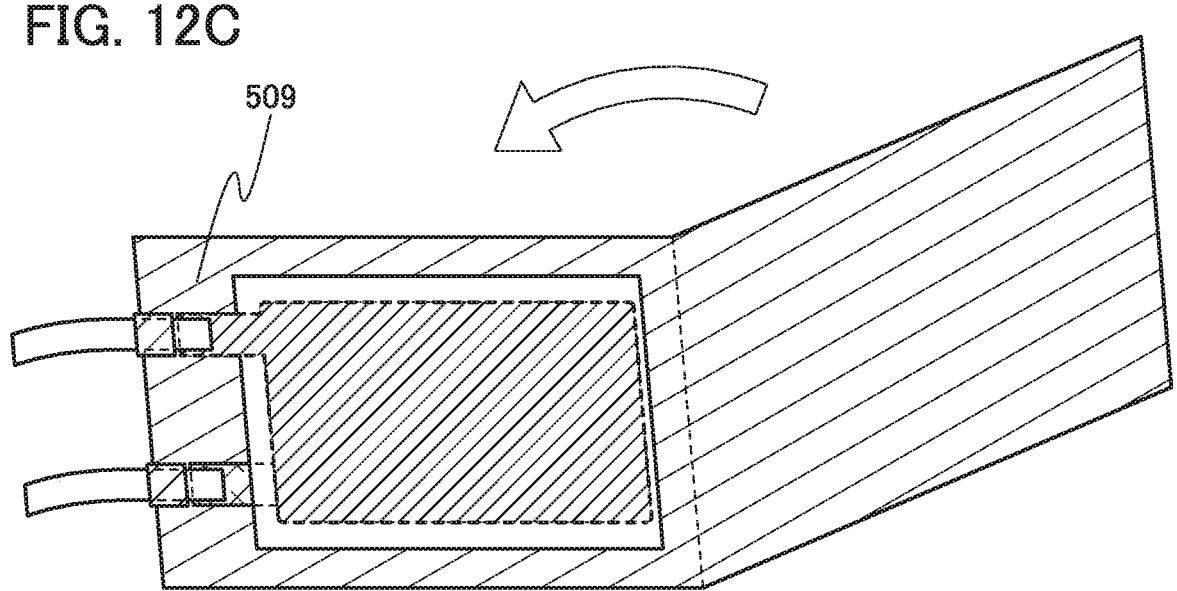

Subsequently, the exterior body 509 is folded along a dashed line as illustrated in FIG. 12C. Then, the outer edge of the exterior body 509 is bonded. The bonding can be performed by thermocompression, for example. At this time, a part (or one side) of the exterior body 509 is left unbonded (to provide an inlet) so that the electrolytic solution 508 can be introduced later.

Next, the electrolytic solution 508 is introduced into the exterior body 509 from the inlet of the exterior body 509. The electrolytic solution 508 is preferably introduced in a reduced pressure atmosphere or in an inert gas atmosphere. Lastly, the inlet is bonded. In the above manner, the laminated storage battery 500 can be formed.

Note that in this embodiment, the coin-type storage battery, the laminated storage battery, and the cylindrical storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed.

FIGS. 13A to 13E illustrate examples of electronic devices including flexible laminated storage batteries. Examples of electronic devices each including a flexible storage battery include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible storage battery can be incorporated along a curved inside/outside wall surface of a house or a building or a curved interior/exterior surface of a car.

FIG. 13A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a storage battery 7407.

FIG. 13B illustrates the mobile phone 7400 that is bent. When the whole mobile phone 7400 is bent by the external force, the storage battery 7407 included in the mobile phone 7400 is also bent. FIG. 13C illustrates the bent storage battery 7407. The storage battery 7407 is a laminated storage battery. As the storage battery 7407, the secondary battery including the exterior body described in Embodiment 1 is used.

FIG. 13D illustrates an example of a bangle display device. A portable display device 7100 includes a housing 7101, a display portion 7102, an operation button 7103, and a storage battery 7104. FIG. 13E illustrates the bent storage battery 7104.

Next, another example of a method for forming the stacks included in the storage battery is described with reference to FIGS. 14A to 14C, FIGS. 15A to 15D, FIGS. 16A to 16D, and FIGS. 17A to 17D.

Figure 14A:
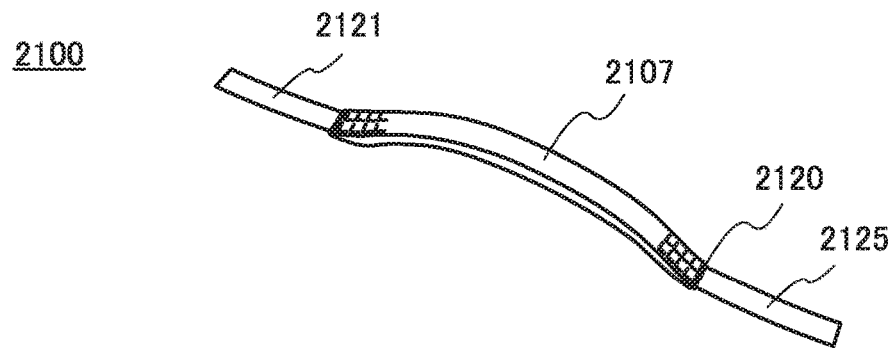
FIGS. 14A to 14C are a perspective view, a top view, and a cross-sectional view illustrating a structure example of a storage battery.
Figure 14B:
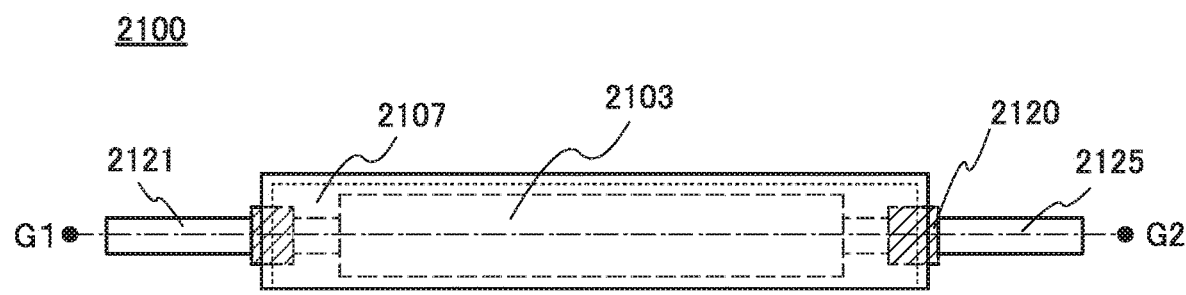
Figure 14C:
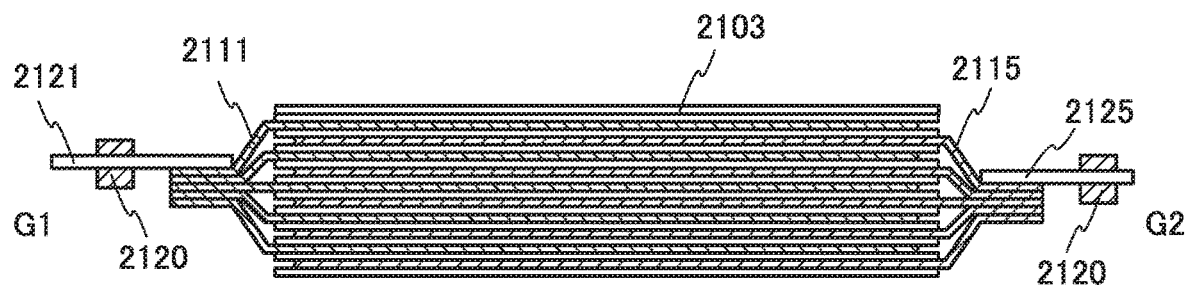

FIGS. 14A to 14C illustrate a storage battery 2100 of one embodiment of the present invention. FIG. 14A is a perspective view of the storage battery 2100, and FIG. 14B is a top view thereof. FIG. 14C is a cross-sectional view taken along dashed-dotted line G1-G2 in FIG. 14B. Three sides of the exterior body 2107 in the storage battery 2100 are sealed. Furthermore, the storage battery 2100 includes a positive electrode lead 2121, a negative electrode lead 2125, a positive electrode 2111, a negative electrode 2115, a sealing layer 2120, and a separator 2103.

Here, some steps in the method for manufacturing the storage battery 2100 illustrated in 14A to 14C will be described with reference to FIGS. 15A to 15D.

First, the negative electrode 2115 is positioned over the separator 2103 (FIG. 15A) such that a negative electrode active material layer in the negative electrode 2115 overlaps with the separator 2103.

Then, the separator 2103 is folded such that part of the separator 2103 is positioned over the negative electrode 2115. Next, the positive electrode 2111 is positioned over the separator 2103 (FIG. 15B) such that a positive electrode active material layer 2102 included in the positive electrode 2111 overlaps with the separator 2103 and a negative electrode active material layer 2106. In the case where an electrode in which an active material layer is formed on one surface of a current collector is used, the positive electrode active material layer 2102 of the positive electrode 2111 and the negative electrode active material layer 2106 of the negative electrode 2115 are positioned so as to face each other with the separator 2103 therebetween.

Figure 15A:
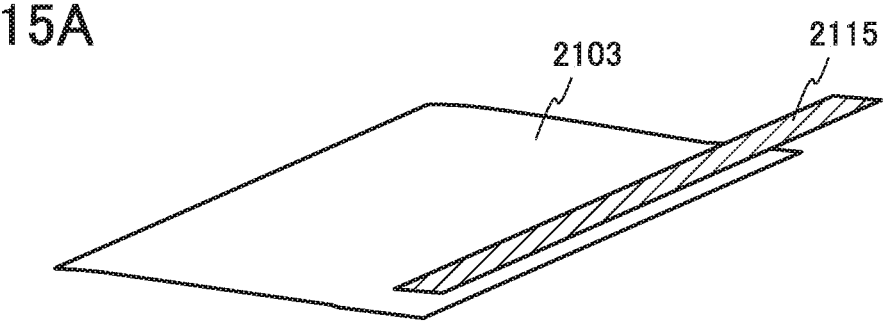
FIGS. 15A to 15D illustrate an example of a method for manufacturing a storage battery.
Figure 15B:
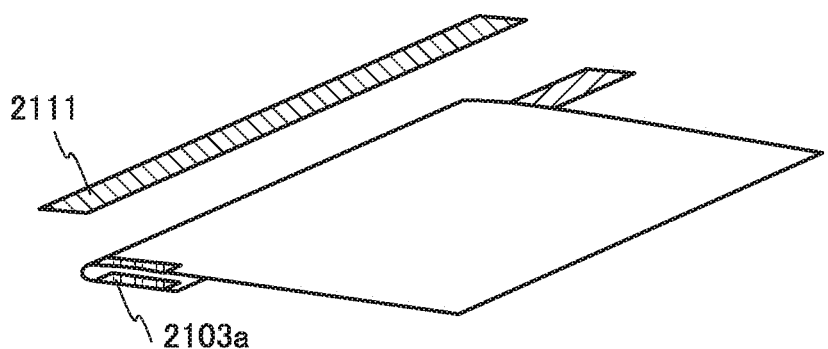

In the case where the separator 2103 is formed using a material that can be thermally welded, such as polypropylene, a region where the separator 2103 overlap with itself is thermally welded and then another electrode is positioned so as to overlap with the separator 2103, whereby the slippage of the electrode in the manufacturing process can be minimized. Specifically, a region which does not overlap with the negative electrode 2115 and the positive electrode 2111 and in which the separator 2103 overlaps with itself, e.g., a region 2103a in FIG. 15B, is preferably thermally welded.

Figure 15C:
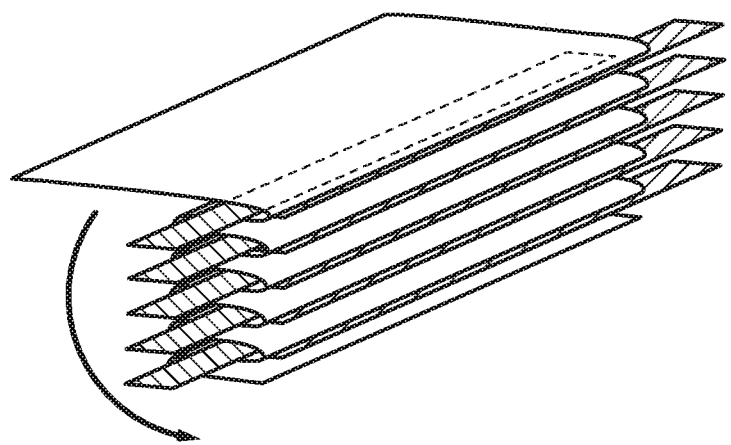

By repeating the above steps, the positive electrode 2111 and the negative electrode 2115 can overlap with each other with the separator 2103 therebetween as illustrated in FIG. 15C.

Note that a plurality of positive electrodes 2111 and a plurality of negative electrodes 2115 may be placed to be alternately sandwiched by the separator 2103 that is repeatedly folded in advance.

Next, as illustrated in FIG. 15C, the plurality of positive electrodes 2111 and the plurality of negative electrodes 2115 are covered with the separator 2103.

Figure 15D:
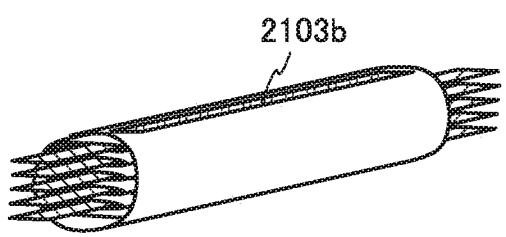

Then, as illustrated in FIG. 15D, a region where the separator 2103 overlaps with itself, e.g., a region 2103b in FIG. 15D, is thermally welded, and the plurality of positive electrodes 2111 and the plurality of negative electrodes 2115 are covered with the separator 2103 to be bound.

Note that the plurality of positive electrodes 2111, the plurality of negative electrodes 2115, and the separator 2103 may be bound with a binding material.

Since the positive electrodes 2111 and the negative electrodes 2115 are stacked through the above steps, one separator 2103 has a region sandwiched between the plurality of positive electrodes 2111 and the plurality of negative electrodes 2115 and a region positioned so as to cover the plurality of positive electrodes 2111 and the plurality of negative electrodes 2115.

In other words, the separator 2103 included in the storage battery 2100 in FIGS. 14A to 14C is a single separator which is partly folded. In the folded parts of the separator 2103, the positive electrodes 2111 and the negative electrodes 2115 are interposed.

The description in Embodiment 1 can be referred to for structures of the storage battery 2100 other than bonding regions of the exterior body 2107, the shapes of the positive electrodes 2111, the negative electrodes 2115, the separator 2103, and the exterior body 2107, and the positions and shapes of the positive electrode lead 2121 and the negative electrode lead 2125. The manufacturing method described in Embodiment 1 can be referred to for the steps other than the steps of stacking the positive electrodes 2111 and the negative electrodes 2115 in the manufacturing method of the storage battery 2100.

Figure 16A:
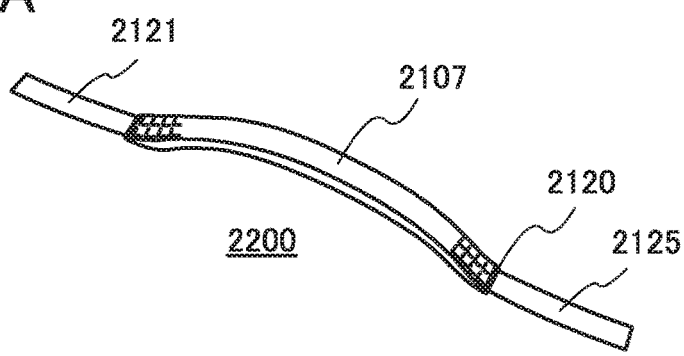
Figure 16B:
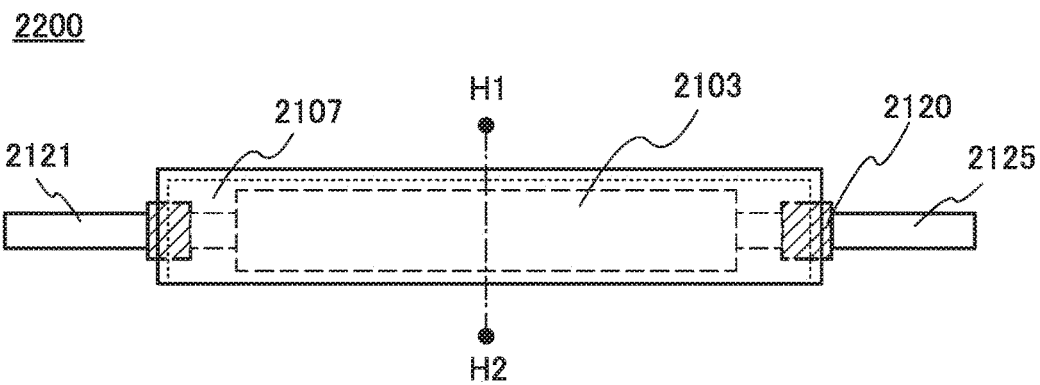
Figure 16B:
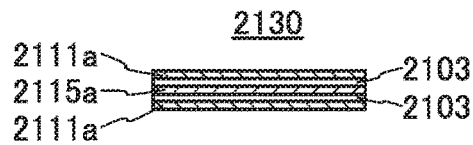
Figure 16B:
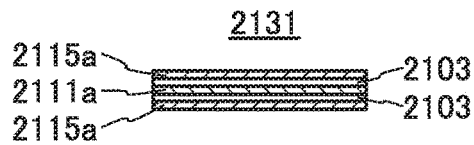
Figure 16D:
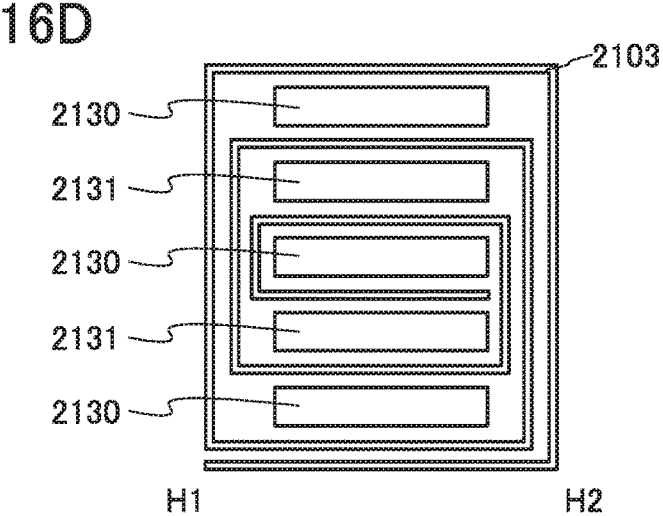

FIGS. 16A, 16B, 16C1, 16C2, and 16D illustrate a storage battery 2200, which is different from the storage battery illustrated in FIGS. 14A to 14C. FIG. 16A is a perspective view of the storage battery 2200, and FIG. 16B is a top view thereof. FIG. 16C1 is a cross-sectional view of a first electrode assembly 2130, and FIG. 16C2 is a cross-sectional view of a second electrode assembly 2131. FIG. 16D is a cross-sectional view taken along the dashed-dotted line H1-H2 in FIG. 16B. In FIG. 16D, the first electrode assembly 2130, the second electrode assembly 2131, and the separator 2103 are selectively illustrated for the sake of clarity.

The storage battery 2200 illustrated in FIGS. 16A, 16B, 16C1, 16C2, and 16D is different from that illustrated in FIGS. 14A to 14C in the positions of the positive electrodes 2111, the negative electrodes 2115, and the separator 2103.

As illustrated in FIG. 16D, the storage battery 2200 includes a plurality of first electrode assemblies 2130 and a plurality of second electrode assemblies 2131.

As illustrated in FIG. 16C1, in each of the first electrode assemblies 2130, a positive electrode 2111a including the positive electrode active material layers 2102 on both surfaces of a positive electrode current collector 2101, the separator 2103, a negative electrode 2115a including the negative electrode active material layers 2106 on both surfaces of a negative electrode current collector 2105, the separator 2103, and the positive electrode 2111a including the positive electrode active material layers 2102 on both surfaces of the positive electrode current collector 2101 are stacked in this order. As illustrated in FIG. 16C2, in each of the second electrode assemblies 2131, the negative electrode 2115a including the negative electrode active material layers 2106 on both surfaces of the negative electrode current collector 2105, the separator 2103, the positive electrode 2111a including the positive electrode active material layers 2102 on both surfaces of the positive electrode current collector 2101, the separator 2103, and the negative electrode 2115a including the negative electrode active material layers 2106 on both surfaces of the negative electrode current collector 2105 are stacked in this order.

As illustrated in FIG. 16D, the plurality of first electrode assemblies 2130 and the plurality of second electrode assemblies 2131 are covered with the wound separator 2103.

Here, some steps in the method for manufacturing the storage battery 2200 illustrated in 16A, 16B, 16C1, 16C2, and 16D will be described with reference to FIGS. 17A to 17D.

Figure 17A:
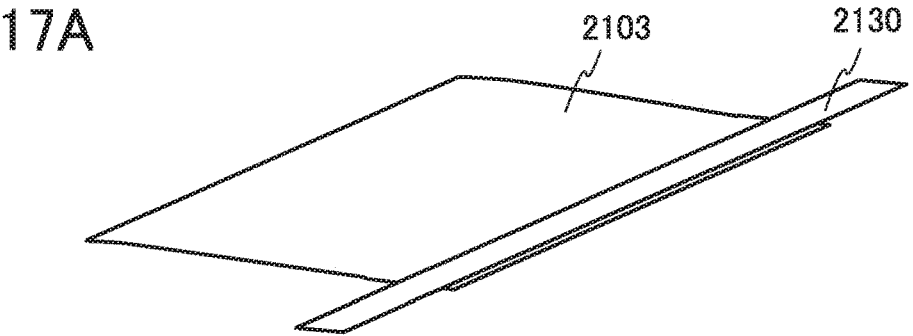
FIGS. 17A to 17D illustrate an example of a method for manufacturing a storage battery.

First, the first electrode assembly 2130 is positioned over the separator 2103 (FIG. 17A).

Figure 17B:
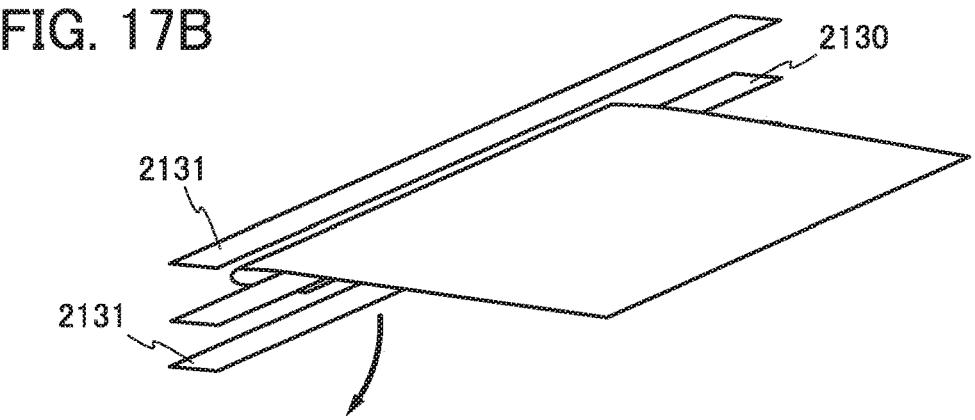

Then, the separator 2103 is folded such that part of the separator 2103 is positioned over the first electrode assembly 2130. Next, two second electrode assemblies 2131 are positioned over and under the first electrode assembly 2130 with the separator 2103 therebetween (FIG. 17B).

Figure 17C:
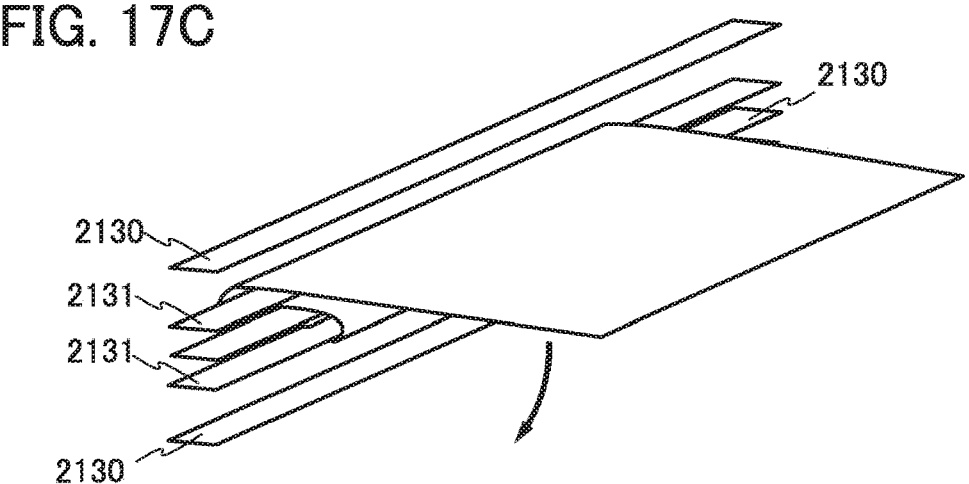

Then, the separator 2103 is wound so as to cover the two second electrode assemblies 2131. Next, two first electrode assemblies 2130 are positioned over and under the two second electrode assemblies 2131 with the separator 2103 therebetween (FIG. 17C).

Figure 17D:
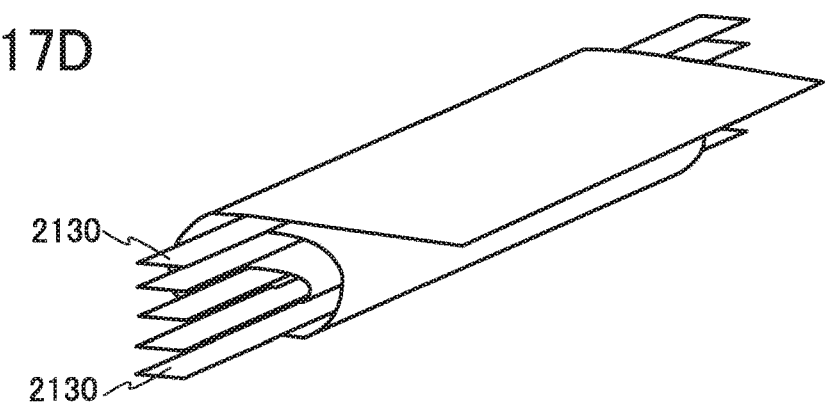

Then, the separator 2103 is wound so as to cover the two first electrode assemblies 2130 (FIG. 17D).

Since the plurality of first electrode assemblies 2130 and the plurality of second electrode assemblies 2131 are stacked through the above steps, the electrode assemblies are positioned between the separator 2103 that is spirally wound.

It is preferable that the positive electrode 2111a of the first electrode assembly 2130 that is positioned on the outermost side not include the positive electrode active material layer 2102 on the outer side.

In the example illustrated in FIGS. 16C1 and 16C2, the electrode assembly includes three electrodes and two separators; however, one embodiment of the present invention is not limited to this example. The electrode assembly may include four or more electrodes and three or more separators. As the number of electrodes is increased, the capacity of the storage battery 2200 can be further improved. Note that the electrode assembly may include two electrodes and one separator. In the case where the number of electrodes is small, the storage battery 2200 can have higher resistance to bending. In the example illustrated in FIG. 16D, the storage battery 2200 includes three first electrode assemblies 2130 and two second electrode assemblies 2131; however, one embodiment of the present invention is not limited to this example. The storage battery 2200 may include more electrode assemblies. As the number of electrode assemblies is increased, the capacity of the storage battery 2200 can be further improved. Note that the storage battery 2200 may include a smaller number of electrode assemblies. In the case where the number of electrode assemblies is small, the storage battery 2200 can have higher resistance to bending.

The description of FIGS. 14A to 14C can be referred to for structures other than the positions of the positive electrodes 2111, the negative electrodes 2115, and the separator 2103 of the storage battery 2200.

This embodiment can be implemented in appropriate combination with any of the structures described in the other embodiments.

Embodiment 3

A battery management unit (BMU) that can be used in combination with secondary batteries each including the materials described in the above embodiment and transistors that are suitable for a circuit included in the battery management unit will be described with reference to FIG. 18, FIGS. 19A to 19C, FIG. 20, FIG. 21, FIGS. 22A to 22C, FIG. 23, and FIG. 24. In this embodiment, in particular, a battery management unit of a power storage device including battery cells connected in series will be described.

When a plurality of battery cells connected in series are charged and discharged repeatedly, each battery cell has different capacity (output voltage) from one another due to the variations in characteristics among the battery cells. A discharge capacity of all of the plurality of battery cells connected in series depends on a battery cell with small capacity. The variations in capacity among the battery cells reduces the capacity of the all the battery cells at the time of discharging. Charging based on a battery cell with small capacity may cause insufficient charging. Charging based on a battery cell with high capacity may cause overcharge.

Thus, the battery management unit of the power storage device including battery cells connected in series has a function of reducing variations in capacity among the battery cells which causes insufficient charging or overcharging. Although circuit structures for reducing variations in capacity among the battery cells include a resistive type, a capacitor type, and an inductor type, here, a circuit structure which can reduce variations in capacity among the battery cells using transistors with a low off-state current is explained as an example.

As an example of the transistor with a low off-state current, a transistor including an oxide semiconductor in its channel formation region (an OS transistor) is preferably used. When an OS transistor with a small off-state current is used in the circuit of the battery management unit of the power storage device, the amount of charge leaking from a battery can be reduced, and reduction in capacity with the lapse of time can be suppressed.

As the oxide semiconductor used in the channel formation region, an In-M-Zn oxide (M is Ga, Sn, Y, Zr, La, Ce, or Nd) is used. In the case where the atomic ratio of the metal elements of a target for forming an oxide semiconductor film is In:M:Zn=$x_1$:$y_1$:$z_1$, $x_1/y_1$ is preferably greater than or equal to ⅓ and less than or equal to 6, more preferably greater than or equal to 1 and less than or equal to 6, and $z_1/y_1$ is preferably greater than or equal to ⅓ and less than or equal to 6, more preferably greater than or equal to 1 and less than or equal to 6. Note that when $z_1/y_1$ is greater than or equal to 1 and less than or equal to 6, a CAAC-OS film as the oxide semiconductor film is easily formed.

Here, the details of the CAAC-OS film are described.

The CAAC-OS film is one of oxide semiconductor films having a plurality of c-axis aligned crystal parts.

In a combined analysis image (also referred to as a high-resolution TEM image) of a bright-field image and a diffraction pattern of a CAAC-OS film, which is obtained using a transmission electron microscope (TEM), a plurality of crystal parts can be observed. However, in the high-resolution TEM image, a boundary between crystal parts, that is, a grain boundary is not clearly observed. Thus, in the CAAC-OS film, a reduction in electron mobility due to the grain boundary is less likely to occur.

According to the high-resolution cross-sectional TEM image of the CAAC-OS film observed in the direction substantially parallel to a sample surface, metal atoms are arranged in a layered manner in the crystal parts. Each metal atom layer reflects unevenness of a surface over which the CAAC-OS film is formed (hereinafter, a surface over which the CAAC-OS film is formed is referred to as a formation surface) or the top surface of the CAAC-OS film, and is arranged parallel to the formation surface or the top surface of the CAAC-OS film.

On the other hand, according to the plan high-resolution TEM image of the CAAC-OS film observed in the direction substantially perpendicular to the sample surface, metal atoms are arranged in a triangular or hexagonal arrangement in the crystal parts. However, there is no regularity of arrangement of metal atoms between different crystal parts.

For example, when the structure of a CAAC-OS film including an InGaZnO$_4$ crystal is analyzed by an out-of-plane method using an X-ray diffraction (XCRD) apparatus, a peak may appear at a diffraction angle (2θ) of around 31°. This peak is derived from the (009) plane of the InGaZnO$_4$ crystal, which indicates that crystals in the CAAC-OS film have c-axis alignment, and that the c-axes are aligned in the direction substantially perpendicular to the formation surface or the top surface of the CAAC-OS film.

Note that in the analysis of the CAAC-OS film with an InGaZnO$_4$ crystal by an out-of-plane method, another peak may appear when 2θ is around 36°, in addition to the peak at 2θ of around 31°. The peak of 2θ at around 36° indicates that a crystal having no c-axis alignment is included in part of the CAAC-OS film. It is preferable that in the CAAC-OS film, a peak appear when 2θ is around 31° and that a peak not appear when 2θ is around 36°.

The CAAC-OS film is an oxide semiconductor film with low impurity concentration. The impurity is an element other than the main components of the oxide semiconductor film, such as hydrogen, carbon, silicon, or a transition metal element. In particular, an element (specifically, silicon or the like) having higher strength of bonding to oxygen than a metal element included in an oxide semiconductor film extracts oxygen from the oxide semiconductor film, which results in disorder of the atomic arrangement and reduced crystallinity of the oxide semiconductor film. Furthermore, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein, for example.

The state in which impurity concentration is low and density of defect states is low (the number of oxygen vacancies is small) is referred to as a "highly purified intrinsic" or "substantially highly purified intrinsic" state. A highly purified intrinsic or substantially highly purified intrinsic oxide semiconductor film has few carrier generation sources, and thus can have a low carrier density. Thus, a transistor including the oxide semiconductor film rarely has negative threshold voltage (is rarely normally on). The highly purified intrinsic or substantially highly purified intrinsic oxide semiconductor film has few carrier traps. Accordingly, the transistor including the oxide semiconductor film has little variations in electrical characteristics and high reliability. Charge trapped by the carrier traps in the oxide semiconductor film takes a long time to be released, and might behave like fixed charge. Thus, the transistor which includes the oxide semiconductor film having high impurity concentration and a high density of defect states has unstable electrical characteristics in some cases.

With the use of the CAAC-OS film in a transistor, variations in the electrical characteristics of the transistor due to irradiation with visible light or ultraviolet light is small.

Since the OS transistor has a wider band gap than a transistor including silicon in its channel formation region (a Si transistor), dielectric breakdown is unlikely to occur when a high voltage is applied. Although a voltage of several hundreds of volts is generated when battery cells are connected in series, the above-described OS transistor is suitable for a circuit of a battery management unit which is used for such battery cells in the power storage device.

Figure 18:
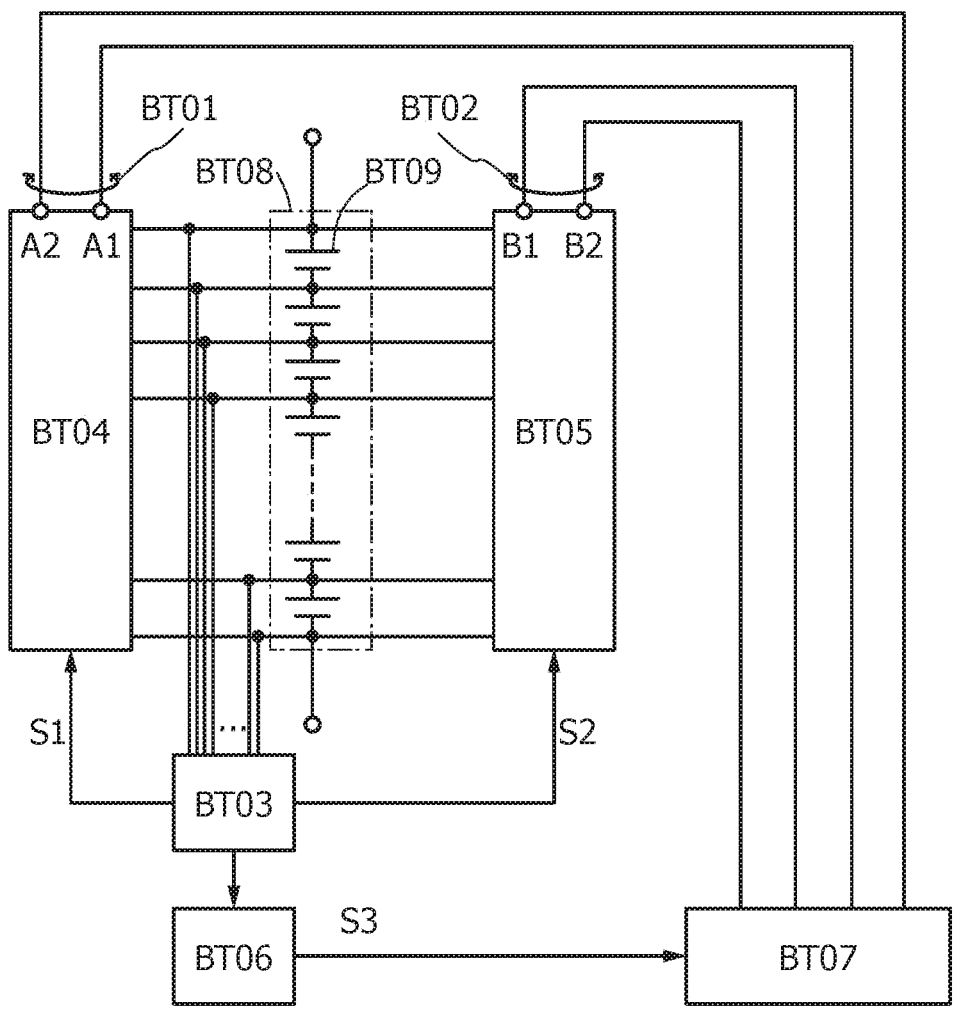
FIG. 18 is a block diagram illustrating a battery management unit of a power storage device.

FIG. 18 is an example of a block diagram of the power storage device. A power storage device BT00 illustrated in FIG. 18 includes a terminal pair BT01, a terminal pair BT02, a switching control circuit BT03, a switching circuit BT04, a switching circuit BT05, a voltage transformation control circuit BT06, a voltage transformer circuit BT07, and a battery portion BT08 including a plurality of battery cells BT09 connected in series.

In the power storage device BT00 illustrated in FIG. 18, a portion including the terminal pair BT01, the terminal pair BT02, the switching control circuit BT03, the switching circuit BT04, the switching circuit BT05, the voltage transformation control circuit BT06, and the voltage transformer circuit BT07 can be referred to as a battery management unit.

The switching control circuit BT03 controls operations of the switching circuits BT04 and BT05. Specifically, the switching control circuit BT03 selects battery cells to be discharged (a discharge battery cell group) and battery cells to be charged (a charge battery cell group) in accordance with voltage measured for every battery cell BT09.

Furthermore, the switching control circuit BT03 outputs a control signal S1 and a control signal S2 on the basis of the selected discharge battery cell group and the selected charge battery cell group. The control signal S1 is output to the switching circuit BT04. The control signal S1 controls the switching circuit BT04 so that the terminal pair BT01 and the discharge battery cell group are connected. In addition, the control signal S2 is output to the switching circuit BT05. The control signal S2 controls the switching circuit BT05 so that the terminal pair BT02 and the charge battery cell group are connected.

The switching control circuit BT03 generates the control signal S1 and the control signal S2 on the basis of the connection relation of the switching circuit BT04, the switching circuit BT05, and the voltage transformer circuit BT07 so that terminals having the same polarity of the terminal pair BT01 and the discharge battery cell group are connected with each other, or terminals having the same polarity of the terminal pair BT02 and the charge battery cell group are connected with each other.

The operations of the switching control circuit BT03 will be described in detail.

First, the switching control circuit BT03 measures the voltage of each of the plurality of battery cells BT09. Then, the switching control circuit BT03 determines that the battery cell BT09 having a voltage higher than a predetermined threshold value is a high-voltage battery cell (high-voltage cell) and that the battery cell BT09 having a voltage lower than the predetermined threshold value is a low-voltage battery cell (low-voltage cell), for example.

As a method to determine whether a battery cell is a high-voltage cell or a low-voltage cell, any of various methods can be employed. For example, the switching control circuit BT03 may determine whether each battery cell BT09 is a high-voltage cell or a low-voltage cell on the basis of the voltage of the battery cell BT09 having the highest voltage or the lowest voltage among the plurality of battery cells BT09. In this case, the switching control circuit BT03 can determine whether each battery cell BT09 is a high-voltage cell or a low-voltage cell by, for example, determining whether or not the ratio of the voltage of each battery cell BT09 to the reference voltage is the predetermined value or more. Then, the switching control circuit BT03 determines a charge battery cell group and a discharge battery cell group on the basis of the determination result.

Note that high-voltage cells and low-voltage cells are mixed in various states in the plurality of battery cells BT09. For example, the switching control circuit BT03 selects a portion having the largest number of high-voltage cells connected in series as the discharge battery cell group of mixed high-voltage cells and low-voltage cells. Furthermore, the switching control circuit BT03 selects a portion having the largest number of low-voltage cells connected in series as the charge battery cell group. In addition, the switching control circuit BT03 may preferentially select the battery cells BT09 which are almost overcharged or overdischarged as the discharge battery cell group or the charge battery cell group.

Figure 19A:
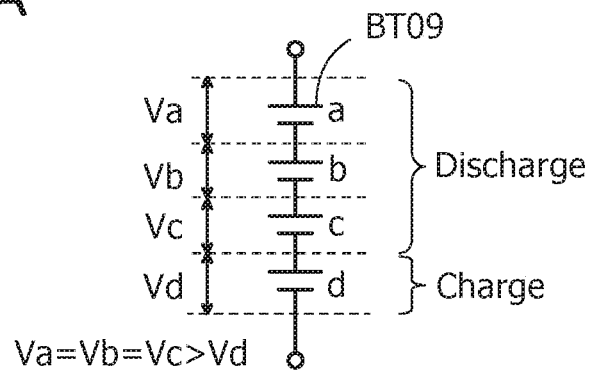
FIGS. 19A to 19C are conceptual diagrams each illustrating a battery control unit of a power storage device.
Figure 19B:
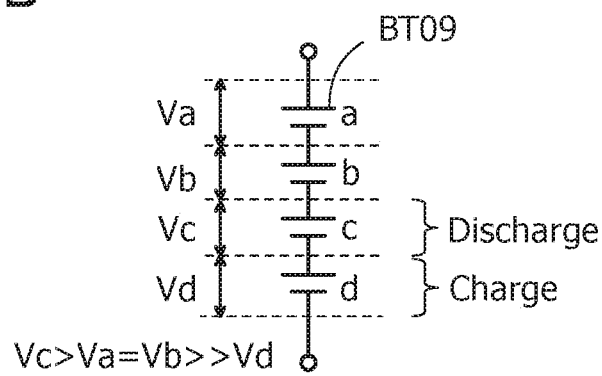
Figure 19C:
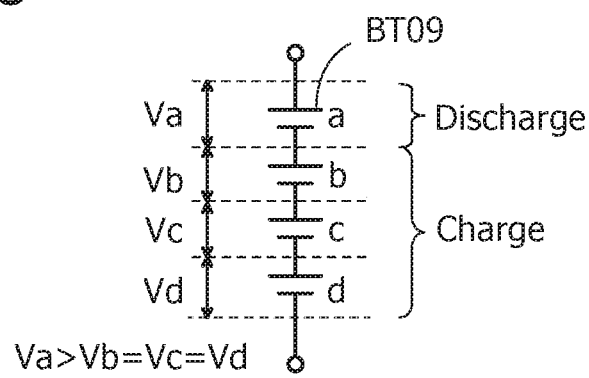

Here, operation examples of the switching control circuit BT03 in this embodiment will be described with reference to FIGS. 19A to 19C. FIGS. 19A to 19C illustrate the operation examples of the switching control circuit BT03. Note that FIGS. 19A to 19C each illustrate the case where four battery cells BT09 are connected in series as an example for convenience of explanation.

FIG. 19A shows the case where the relation of voltages Va, Vb, Vc, and Vd is Va=Vb=Vc>Vd where the voltages Va, Vb, Vc, and Vd are the voltages of a battery cell a, a battery cell b, a battery cell c, and a battery cell d, respectively. That is, a series of three high-voltage cells a to c and one low-voltage cell d are connected in series. In this case, the switching control circuit BT03 selects the series of three high-voltage cells a to c as the discharge battery cell group. In addition, the switching control circuit BT03 selects the low-voltage cell d as the charge battery cell group.

Next, FIG. 19B shows the case where the relation of the voltages is Vc>Va=Vb>>Vd. That is, a series of two low-voltage cells a and b, one high-voltage cell c, and one low-voltage cell d which is almost overdischarged are connected in series. In this case, the switching control circuit BT03 selects the high-voltage cell c as the discharge battery cell group. Since the low-voltage cell d is almost overdischarged, the switching control circuit BT03 preferentially selects the low-voltage cell d as the charge battery cell group instead of the series of two low-voltage cells a and b.

Lastly, FIG. 19C shows the case where the relation of the voltages is Va>Vb=Vc=Vd. That is, one high-voltage cell a and a series of three low-voltage cells b to d are connected in series. In this case, the switching control circuit BT03 selects the high-voltage cell a as the discharge battery cell group. In addition, the switching control circuit BT03 selects the series of three low-voltage cells b to d as the charge battery cell group.

On the basis of the determination result shown in the examples of FIGS. 19A to 19C, the switching control circuit BT03 outputs the control signal S1 and the control signal S2 to the switching circuit BT04 and the switching circuit BT05, respectively. Information showing the discharge battery cell group, which is the connection destination of the switching circuit BT04, is set in the control signal S1. Information showing the charge battery cell group, which is the connection destination of the switching circuit BT05, is set in the control signal S2.

The above is the detailed description of the operations of the switching control circuit BT03.

The switching circuit BT04 sets the discharge battery cell group selected by the switching control circuit BT03 as the connection destination of the terminal pair BT01 in response to the control signal S1 output from the switching control circuit BT03.

The terminal pair BT01 includes a pair of terminals A1 and A2. The switching circuit BT04 sets the connection destination of the terminal pair BT01 by connecting one of the pair of terminals A1 and A2 to a positive electrode terminal of the battery cell BT09 positioned on the most upstream side (on the high potential side) of the discharge battery cell group, and the other to a negative electrode terminal of the battery cell BT09 positioned on the most downstream side (on the low potential side) of the discharge battery cell group. Note that the switching circuit BT04 can recognize the position of the discharge battery cell group on the basis of the information set in the control signal S1.

The switching circuit BT05 sets the charge battery cell group selected by the switching control circuit BT03 as the connection destination of the terminal pair BT02 in response to the control signal S2 output from the switching control circuit BT03.

The terminal pair BT02 includes a pair of terminals B1 and B2. The switching circuit BT05 sets the connection destination of the terminal pair BT02 by connecting connects one of the pair of terminals B1 and B2 to a positive electrode terminal of the battery cell BT09 positioned on the most upstream side (on the high potential side) of the charge battery cell group, and the other to a negative electrode terminal of the battery cell BT09 positioned on the most downstream side (on the low potential side) of the charge battery cell group. Note that the switching circuit BT05 can recognize the position of the charge battery cell group on the basis of the information set in the control signal S2.

Figure 20:
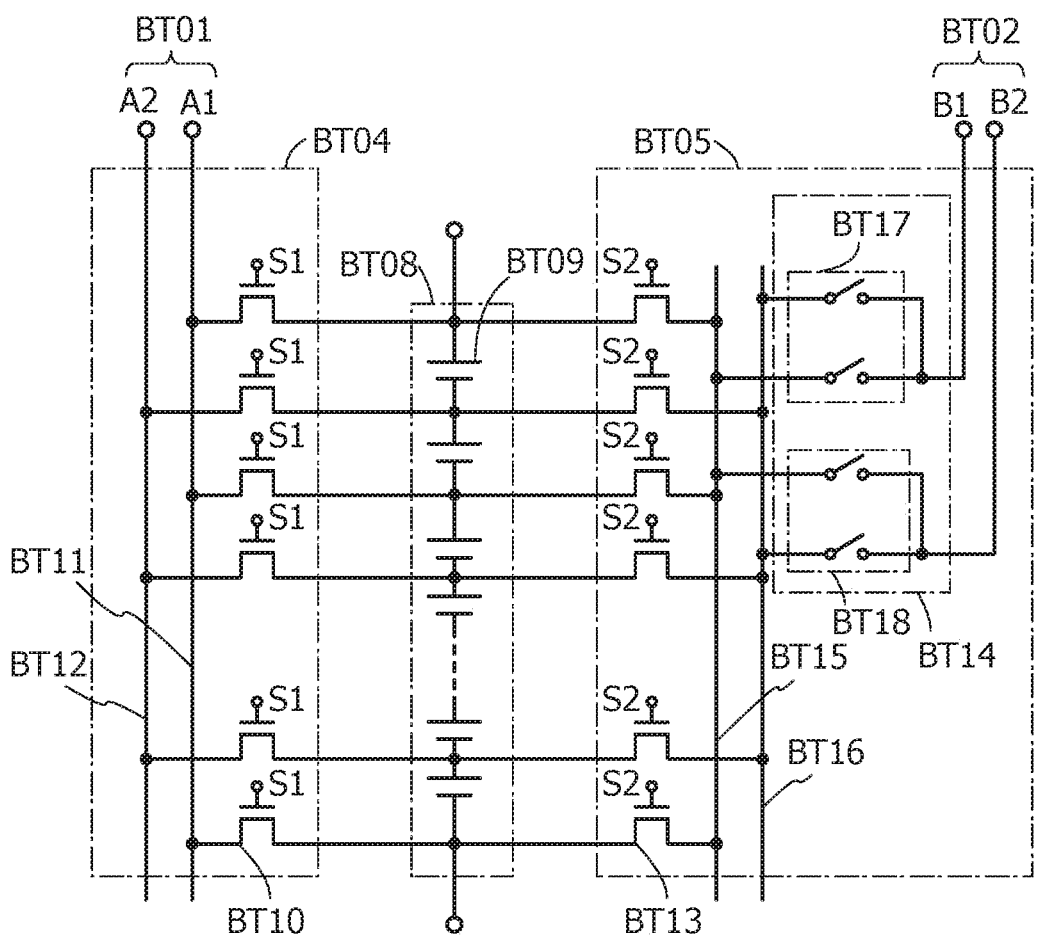
FIG. 20 is a circuit diagram illustrating a battery control unit of a power storage device.
Figure 21:
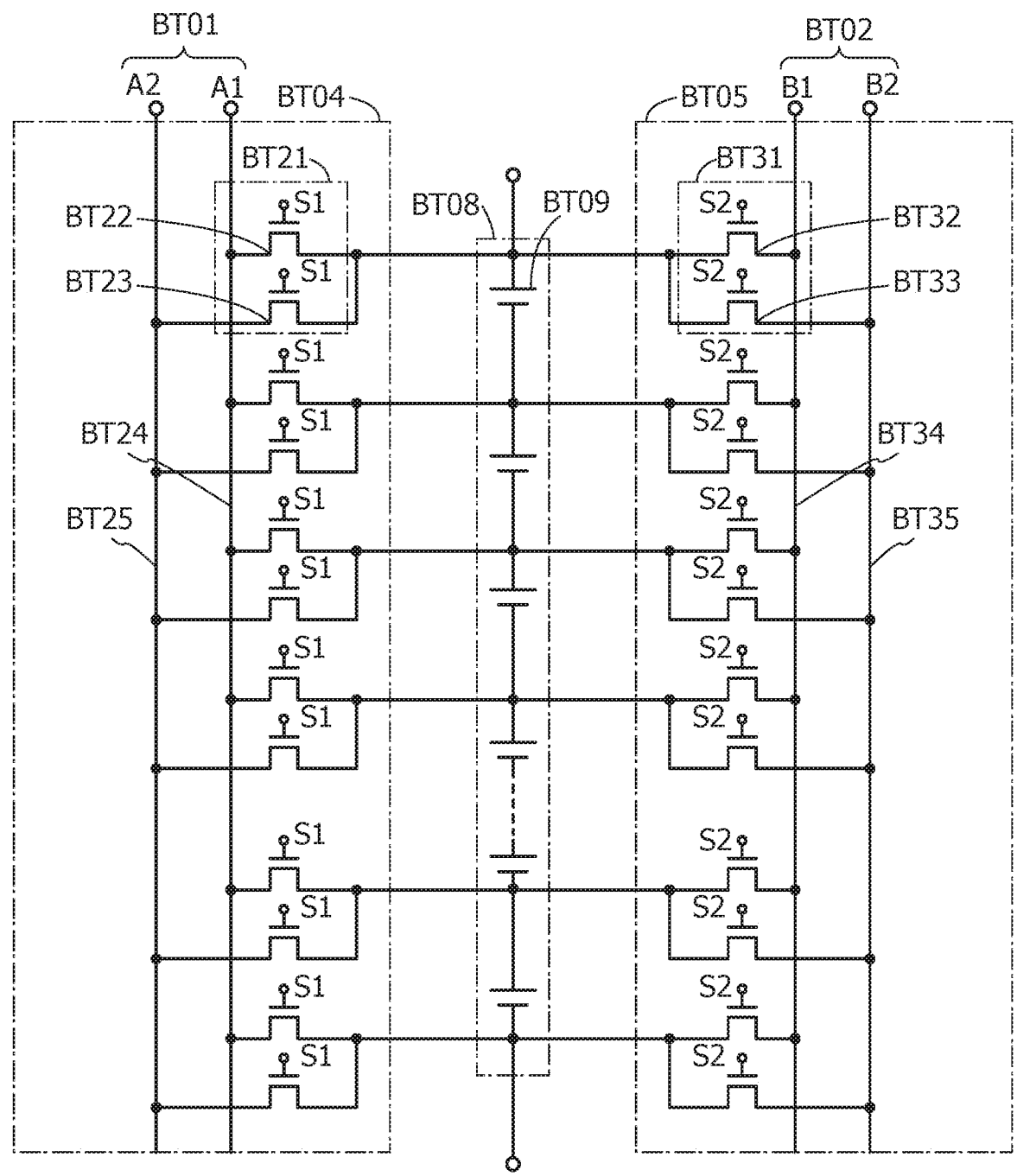
FIG. 21 is a circuit diagram illustrating a battery control unit of a power storage device.

FIG. 20 and FIG. 21 are circuit diagrams showing structure examples of the switching circuits BT04 and BT05.

In FIG. 20, the switching circuit BT04 includes a plurality of transistors BT10, a bus BT11, and a bus BT12. The bus BT11 is connected to the terminal A1. The bus BT12 is connected to the terminal A2. Sources or drains of the plurality of transistors BT10 are connected alternately to the bus BT11 and the bus BT12. Sources or drains which are not connected to the bus BT11 or the bus BT12 of the plurality of transistors BT10 are each connected between two adjacent battery cells BT09.

The source or drain of the transistor BT10 which is not connected to the bus BT11 on the most upstream side of the plurality of transistors BT10 is connected to the positive electrode terminal of the battery cell BT09 on the most upstream side of the battery portion BT08. The source or drain of the transistor BT10 which is not connected to the bus BT11 of the transistor BT10 on the most downstream side of the plurality of transistors BT10 is connected to the negative electrode terminal of the battery cell BT09 on the most downstream side of the battery portion BT08.

The switching circuit BT04 connects the discharge battery cell group to the terminal pair BT01 by bringing one of the plurality of transistors BT10 connected to the bus BT11 and one of the plurality of transistors BT10 connected to the bus BT12 into an on state in response to the control signal S1 supplied to gates of the plurality of transistors BT10. Accordingly, the positive electrode terminal of the battery cell BT09 on the most upstream side of the discharge battery cell group is connected to one of the pair of terminals A1 and A2. In addition, the negative electrode terminal of the battery cell BT09 on the most downstream side of the discharge battery cell group is connected to the other of the pair of terminals A1 and A2 (i.e., a terminal which is not connected to the positive electrode terminal).

An OS transistor is preferably used as the transistor BT10. Since the off-state current of the OS transistor is low, the amount of charge that leaks from battery cells which do not belong to the discharge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT01, which are connected to the transistor BT10 in an off state, can be insulated from each other even when an output voltage of the discharge battery cell group is high.

In FIG. 20, the switching circuit BT05 includes a plurality of transistors BT13, a current control switch BT14, a bus BT15, and a bus BT16. The bus BT15 and the bus BT16 are provided between the plurality of transistor BT13 and the current control switch BT14. Sources or drains of the plurality of transistors BT13 are connected alternately to the bus BT15 and the bus BT16. Sources or drains which are not connected to the bus BT15 or the bus BT16 of the plurality of transistors BT13 are each connected between two adjacent battery cells BT09.

A source or drain of the transistor BT13 which is not connected to the bus BT16 on the most upstream side of the plurality of transistors BT13 is connected to the positive electrode terminal of the battery cell BT09 on the most upstream side of the battery portion BT08. A source or drain of the transistor BT13 which is not connected to the bus BT15 on the most downstream side of the plurality of transistors BT13 is connected to the negative electrode terminal of the battery cell BT09 on the most downstream side of the battery portion BT08.

An OS transistor is preferably used as the transistors BT13 like the transistors BT10. Since the off-state current of the OS transistor is low, the amount of charge that leaks from the battery cells which do not belong to the charge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT02, which are connected to the transistor BT13 in an off state, can be insulated from each other even when a voltage for charging the charge battery cell group is high.

The current control switch BT14 includes a switch pair BT17 and a switch pair BT18. Terminals on one end of the switch pair BTI7 are connected to the terminal B1. Terminals on the other end of the switch pair BT17 extend from two switches. One switch is connected to the bus BT15, and the other switch is connected to the bus BT16. Terminals on one end of the switch pair BT18 are connected to the terminal B2. Terminals on the other end of the switch pair BT18 extend from two switches. One switch is connected to the bus BT15, and the other switch is connected to the bus BT16.

OS transistors are preferably used for the switches included in the switch pair BT17 and the switch pair BT18 like the transistors BT10 and BT13.

The switching circuit BT05 connects the charge battery cell group and the terminal pair BT02 by controlling the combination of on and off states of the transistors BT13 and the current control switch BT14 in response to the control signal S2.

For example, the switching circuit BT05 connects the charge battery cell group and the terminal pair BT02 in the following manner.

The switching circuit BT05 brings a transistor BT13 connected to the positive electrode terminal of the battery cell BT09 on the most upstream side of the charge battery cell group into all on state in response to the control signal S2 supplied to gates of the plurality of transistors BT10. In addition, the switching circuit BT05 brings a transistor BT13 connected to the negative electrode terminal of the battery cell BT09 on the most downstream side of the charge battery cell group into an on state in response to the control signal S2 supplied to the gates of the plurality of transistors BT10.

The polarities of voltages applied to the terminal pair BT02 can vary in accordance with the structures of the voltage transformer circuit BT07 and the discharge battery cell group connected to the terminal pair BT01. In order to supply current in the direction for charging the charge battery cell group, terminals with the same polarity of the terminal pair BT02 and the charge battery cell group are required to be connected to each other. In view of this, the current control switch BT14 is controlled by the control signal S2 so that the connection destination of the switch pair BT17 and that of the switch pair B118 are changed in accordance with the polarities of the voltages applied to the terminal pair BT02.

The state where voltages are applied to the terminal pair BT02 so as to make the terminal B1 a positive electrode and the terminal B2 a negative electrode will be described as an example. Here, in the case where the battery cell BT09 positioned on the most downstream side of the battery portion BT08 is in the charge battery cell group, the switch pair BT17 is controlled to be connected to the positive electrode terminal of the battery cell BT09 in response to the control signal S2. That is, the switch of the switch pair BT17 connected to the bus BT16 is turned on, and the switch of the switch pair BT17 connected to the bus BT15 is turned off. In contrast, the switch pair BT18 is controlled to be connected to the negative electrode terminal of the battery cell BT09 positioned on the most downstream side of the battery portion BT08 in response to the control signal S2. That is, the switch of the switch pair BT18 connected to the bus BT15 is turned on, and the switch of the switch pair BT18 connected to the bus BT16 is turned off. In this manner, terminals with the same polarity of the terminal pair BT02 and the charge battery cell group are connected to each other. In addition, the current which flows from the terminal pair BT02 is controlled to be supplied in a direction so as to charge the charge battery cell group.

In addition, instead of the switching circuit BT05, the switching circuit BT04 may include the current control switch BT14. In that case, the polarities of the voltages applied to the terminal pair BT02 are controlled by controlling the polarities of the voltages applied to the terminal pair BT01 in response to the operation of the current control switch BT14 and the control signal S1. Thus, the current control switch BT14 controls the direction of current which flows to the charge battery cell group from the terminal pair BT02.

FIG. 21 is a circuit diagram illustrating structure examples of the switching circuit BT04 and the switching circuit BT05 which are different from those of FIG. 20.

In FIG. 21, the switching circuit BT04 includes a plurality of transistor pairs BT21, a bus BT24, and a bus BT25. The bus BT24 is connected to the terminal A1. The bus BT25 is connected to the terminal A2. Terminals on one end of each of the plurality of transistor pairs BT21 extend from a transistor BT22 and a transistor BT23. Sources or drains of the transistors BT22 are connected to the bus BT24. Sources or drains of the transistors BT23 are connected to the bus BT25. In addition, terminals on the other end of each of the plurality of transistor pairs BT21 are connected between two adjacent battery cells BT09. The terminal on the other end of the transistor pair BT21 on the most upstream side of the plurality of transistor pairs BT21 is connected to the positive electrode terminal of the battery cell BT09 on the most upstream side of the battery portion BT08. The terminal on the other end of the transistor pair BT21 on the most downstream side of the plurality of transistor pairs BT21 is connected to a negative electrode terminal of the battery cell BT09 on the most downstream side of the battery portion BT08.

The switching circuit BT04 switches the connection destination of the transistor pair BT21 to one of the terminal A1 and the terminal A2 by turning on or off the transistors BT22 and BT23 in response to the control signal S1. Specifically, when the transistor BT22 is turned on, the transistor BT23 is turned off, so that the connection destination of the transistor pair BT21 is the terminal A1. On the other hand, when the transistor BT23 is turned on, the transistor BT22 is turned off, so that the connection destination of the transistor pair BT21 is the terminal A2. Which of the transistors BT22 and BT23 is turned on is determined by the control signal S11.

Two transistor pairs BT21 are used to connect the terminal pair BT01 and the discharge battery cell group. Specifically, the connection destinations of the two transistor pairs BT21 are determined on the basis of the control signal S1, and the discharge battery cell group and the terminal pair BT01 are connected. The connection destinations of the two transistor pairs BT21 are controlled by the control signal S1 so that one of the connection destinations is the terminal A1 and the other is the terminal A2.

The switching circuit BT05 includes a plurality of transistor pairs BT31, a bus BT34 and a bus BT35. The bus BT34 is connected to the terminal B1. The bus BT35 is connected to the terminal B2. Terminals on one end of each of the plurality of transistor pairs BT31 extend from a transistor BT32 and a transistor BT33. The terminal on one end extending from the transistor BT32 is connected to the bus BT34. The terminal on one end extending from the transistor BT33 is connected to the bus BT35. Terminals on the other end of each of the plurality of transistor pairs BT31 are connected between two adjacent battery cells BT09. The terminal on the other end of the transistor pair BT31 on the most upstream side of the plurality of transistor pairs BT31 is connected to the positive electrode terminal of the battery cell BT09 on the most upstream side of the battery portion BT08. The terminal on the other end of the transistor pair BT31 on the most downstream side of the plurality of transistor pairs BT31 is connected to the negative electrode terminal of the battery cell BT09 on the most downstream side of the battery portion BT08.

The switching circuit BT05 switches the connection destination of the transistor pair BT31 to one of the terminal B1 and the terminal B2 by turning on or off the transistors BT32 and BT33 in response to the control signal S2. Specifically, when the transistor BT32 is turned on, the transistor BT33 is turned off, so that the connection destination of the transistor pair BT31 is the terminal B1. On the other hand, when the transistor BT33 is turned on, the transistor BT32 is turned off, so that the connection destination of the transistor pair BT31 is the terminal B2. Which of the transistors BT32 and BT33 is turned on is determined by the control signal S2.

Two transistor pairs BT31 are used to connect the terminal pair BT02 and the charge battery cell group. Specifically, the connection destinations of the two transistor pairs BT31 are determined on the basis of the control signal S2, and the charge battery cell group and the terminal pair BT02 are connected. The connection destinations of the two transistor pairs BT31 are controlled by the control signal S2 so that one of the connection destinations is the terminal B1 and the other is the terminal B2.

The connection destinations of the two transistor pairs BT31 are determined by the polarities of the voltages applied to the terminal pair BT02. Specifically, in the case where voltages which make the terminal B1 a positive electrode and the terminal B2 a negative electrode are applied to the terminal pair BT02, the transistor pair BT31 on the upstream side is controlled by the control signal S2 so that the transistor BT32 is turned on and the transistor BT33 is turned off. In contrast, the transistor pair BT31 on the downstream side is controlled by the control signal S2 so that the transistor BT33 is turned on and the transistor BT32 is turned off. In the case where voltages which make the terminal B1 a negative electrode and the terminal B2 a positive electrode are applied to the terminal pair BT02, the transistor pair BT31 on the upstream side is controlled by the control signal S2 so that the transistor BT33 is turned on and the transistor BT32 is turned off. In contrast, the transistor pair BT31 on the downstream side is controlled by the control signal S2 so that the transistor BT32 is turned on and the transistor BT33 is turned off. In this manner, terminals with the same polarity of the terminal pair BT02 and the charge battery cell group are connected to each other. In addition, the current which flows from the terminal pair BT02 is controlled to be supplied in the direction for charging the charge battery cell group.

The voltage transformation control circuit BT06 controls the operation of the voltage transformer circuit BT07. The voltage transformation control circuit BT06 generates a voltage transformation signal S3 for controlling the operation of the voltage transformer circuit BT07 on the basis of the number of the battery cells BT09 included in the discharge battery cell group and the number of the battery cells BT09 included in the charge battery cell group and outputs the voltage transformation signal S3 to the voltage transformer circuit BT07.

In the case where the number of the battery cells BT09 included in the discharge battery cell group is larger than that included in the charge battery cell group, it is necessary to prevent a charging voltage which is too high from being applied to the charge battery cell group. Thus, the voltage transformation control circuit BT06 outputs the voltage transformation signal S3 for controlling the voltage transformer circuit BT07 so that a discharging voltage (Vdis) is lowered within a range where the charge battery cell group can be charged.

In the case where the number of the battery cells BT09 included in the discharge battery cell group is less than or equal to that included in the charge battery cell group, a charging voltage necessary for charging the charge battery cell group needs to be ensured. Therefore, the voltage transformation control circuit BT06 outputs the voltage transformation signal S3 for controlling the voltage transformer circuit BT07 so that the discharging voltage (Vdis) is raised within a range where a charging voltage which is too high is not applied to the charge battery cell group.

The voltage value of the charging voltage which is too high is determined in the light of product specifications and the like of the battery cell BT09 used in the battery portion BT08. The voltage which is raised or lowered by the voltage transformer circuit BT07 is applied as a charging voltage (Vcha) to the terminal pair BT02.

Figure 22A:
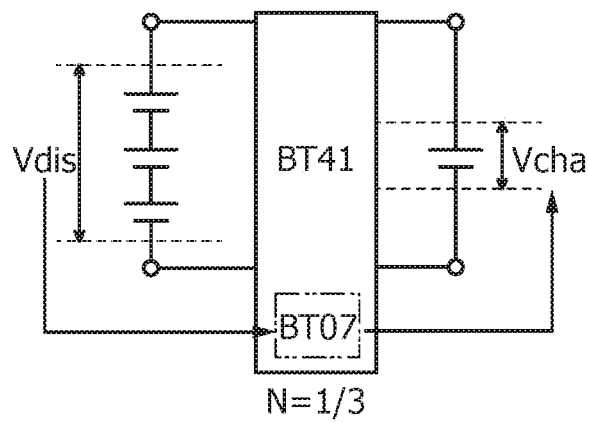
FIGS. 22A to 22C are conceptual diagrams each illustrating a battery control unit of a power storage device.
Figure 22B:
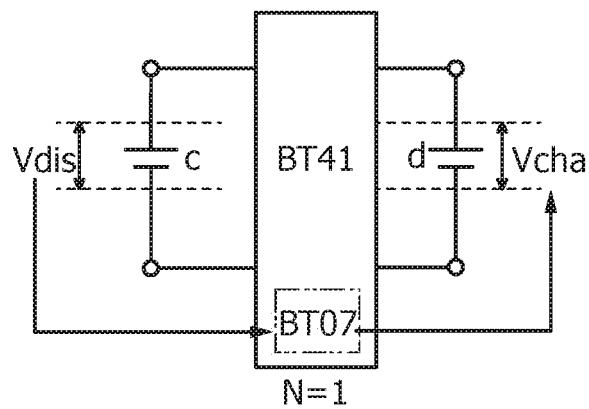
Figure 22C:
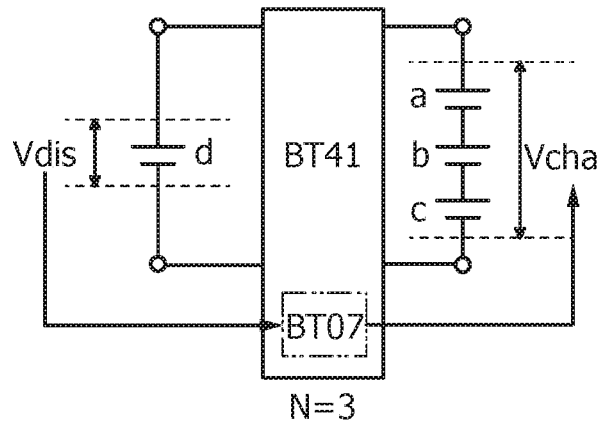

Here, operation examples of the voltage transformation control circuit BT06 in this embodiment will be described with reference to FIGS. 22A to 22C. FIGS. 22A to 22C are conceptual diagrams illustrating the operation examples of the voltage transformation control circuit BT06 for the discharge battery cell group and the charge battery cell group described in FIGS. 19A to 19C. FIGS. 22A to 22C each illustrate a battery management unit BT41. As described above, the battery management unit BT41 includes the terminal pair BT01, the terminal pair BT02, the switching control circuit BT03, the switching circuit BT04, the switching circuit BT05, the voltage transformation control circuit BT06, and the voltage transformer circuit BT07.

In the example illustrated in FIG. 22A, the series of three high-voltage cells a to c and one low-voltage cell d are connected in series as in FIG. 19A. In that case, as described using FIG. 19A, the switching control circuit BT03 selects the high-voltage cells a to c as the discharge battery cell group, and selects the low-voltage cell d as the charge battery cell group. The voltage transformation control circuit BT06 calculates a conversion ratio N for converting the discharging voltage (Vdis) to the charging voltage (Vcha) on the basis of the ratio of the number of the battery cells BT09 included in the charge battery cell group to the number of the battery cells BT09 included in the discharge battery cell group.

In the case where the number of the battery cells BT09 included in the discharge battery cell group is larger than that included in the charge battery cell group, when a discharging voltage is applied to the terminal pair BT02 without transforming the voltage, an overvoltage may be applied to the battery cells BT09 included in the charge battery cell group through the terminal pair BT02. Thus, in the case of FIG. 22A, it is necessary that a charging voltage (Vcha) applied to the terminal pair BT02 be lower than the discharging voltage. In addition, in order to charge the charge battery cell group, it is necessary that the charging voltage be higher than the total voltage of the battery cells BT09 included in the charge battery cell group. Thus, the transformation control circuit BT06 sets the conversion ratio N larger than the ratio of the number of the battery cells BT09 included in the charge battery cell group to the number of the battery cells BT09 included in the discharge battery cell group.

Thus, the voltage transformation control circuit BT06 preferably sets the conversion ratio N larger than the ratio of the number of the battery cells BT09 included in the charge battery cell group to the number of the battery cells BT09 included in the discharge battery cell group by about 1% to 10%. Here, the charging voltage is made higher than the voltage of the charge battery cell group, but the charging voltage is equal to the voltage of the charge battery cell group in reality. Note that the voltage transformation control circuit BT06 feeds a current for charging the charge battery cell group in accordance with the conversion ratio N in order to make the voltage of the charge battery cell group equal to the charging voltage. The value of the current is set by the voltage transformation control circuit BT06.

In the example illustrated in FIG. 22A, since the number of the battery cells BT09 included in the discharge battery cell group is three and the number of the battery cells BT09 included in the charge battery cell group is one, the voltage transformation control circuit BT06 calculates a value which is slightly larger than 1/3 as the conversion ratio N. Then, the voltage transformation control circuit BT06 outputs the voltage transformation signal S3, which lowers the discharging voltage in accordance with the conversion ratio N and converts the voltage into a charging voltage, to the voltage transformer circuit BT07. The transformer circuit BT07 applies the charging voltage which is transformed in response to the transformation signal S3 to the terminal pair BT02. Then, the battery cells BT09 included in the charge battery cell group are charged with the charging voltage applied to the terminal pair BT02.

In each of examples illustrated in FIGS. 22B and 22C, the conversion ratio N is calculated in a manner similar to that of FIG. 22A. In each of the examples illustrated in FIGS. 22B and 22C, since the number of the battery cells BT09 included in the discharge battery cell group is less than or equal to the number of the battery cells BT09 included in the charge battery cell group, the conversion ratio N is 1 or more. Therefore, in this case, the voltage transformation control circuit BT06 outputs the voltage transformation signal S3 for raising the discharging voltage and converting the voltage into the charging voltage.

The voltage transformer circuit BT07 converts the discharging voltage applied to the terminal pair BT01 into a charging voltage in response to the voltage transformation signal S3. The voltage transformer circuit BT07 applies the charging voltage to the terminal pair BT02. Here, the voltage transformer circuit BT07 electrically insulates the terminal pair BT01 from the terminal pair BT02. Accordingly, the voltage transformer circuit BT07 prevents a short circuit due to a difference between the absolute voltage of the negative electrode terminal of the battery cell BT09 on the most downstream side of the discharge battery cell group and the absolute voltage of the negative electrode terminal of the battery cell BT09 on the most downstream side of the charge battery cell group. Furthermore, the voltage transformer circuit BT07 converts the discharging voltage, which is the total voltage of the discharge battery cell group, into the charging voltage in response to the voltage transformation signal S3 as described above.

An insulated direct current (DC)-DC converter or the like can be used in the voltage transformer circuit BT07. In that case, the voltage transformation control circuit BT06 controls the charging voltage converted by the voltage transformer circuit BT07 by outputting a signal for controlling the on/off ratio (the duty ratio) of the insulated DC-DC converter as the voltage transformation signal S3.

Examples of the insulated DC-DC converter include a flyback converter, a forward converter, a ringing choke converter (RCC), a push-pull converter, a half-bridge converter, and a full-bridge converter, and a suitable converter is selected in accordance with the value of the intended output voltage.

Figure 23:
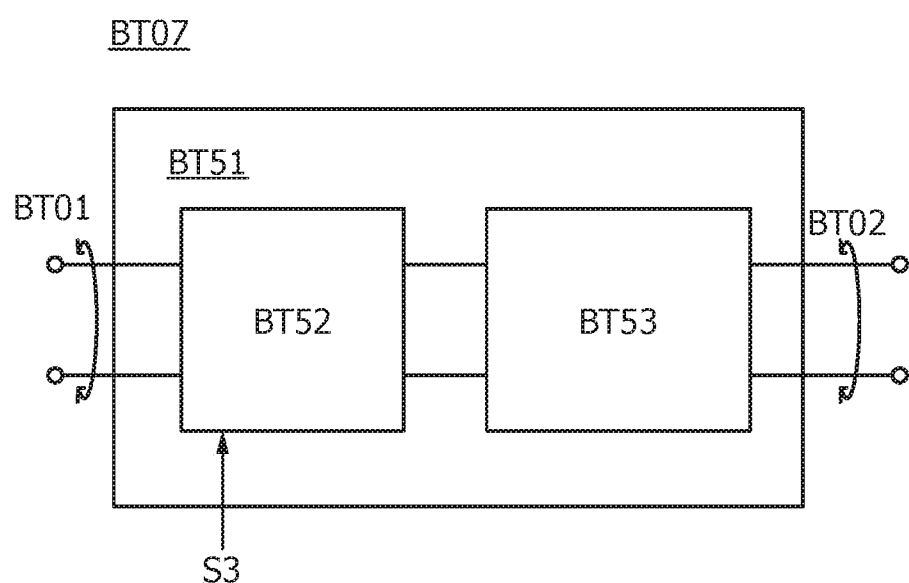
FIG. 23 is a block diagram illustrating a battery management unit of a power storage device.

The structure of the voltage transformer circuit BT07 including the insulated DC-DC converter is illustrated in FIG. 23. An insulated DC-DC converter BT51 includes a switch portion BT52 and a transformer BT53. The switch portion BT52 is a switch for switching on/off of the insulated DC-DC converter, and a metal oxide semiconductor field-effect transistor (MOSFET), a bipolar transistor, or the like is used as the switch portion BT52. The switch portion BT52 periodically turns on and off the insulated DC-DC converter BT51 in response to the voltage transformation signal S3 for controlling the on/off ratio which is output from the voltage transformation control circuit BT06. The switch portion BT52 can have any of various structures in accordance with the type of insulated DC-DC converter which is used. The transformer BT53 converts the discharging voltage applied from the terminal pair BT01 into the charging voltage. In detail, the transformer BT53 operates in conjunction with the on/off state of the switch portion BT52 and converts the discharging voltage into the charging voltage in accordance with the on/off ratio. As the time during which the switch portion BT52 is on becomes longer in its switching period, the charging voltage is increased. On the other hand, as the time during which the switch portion BT52 is on becomes shorter in its switching period, the charging voltage is decreased. In the case where the insulated DC-DC converter is used, the terminal pair BT01 and the terminal pair BT02 can be insulated from each other inside the transformer BT53.

Figure 24:
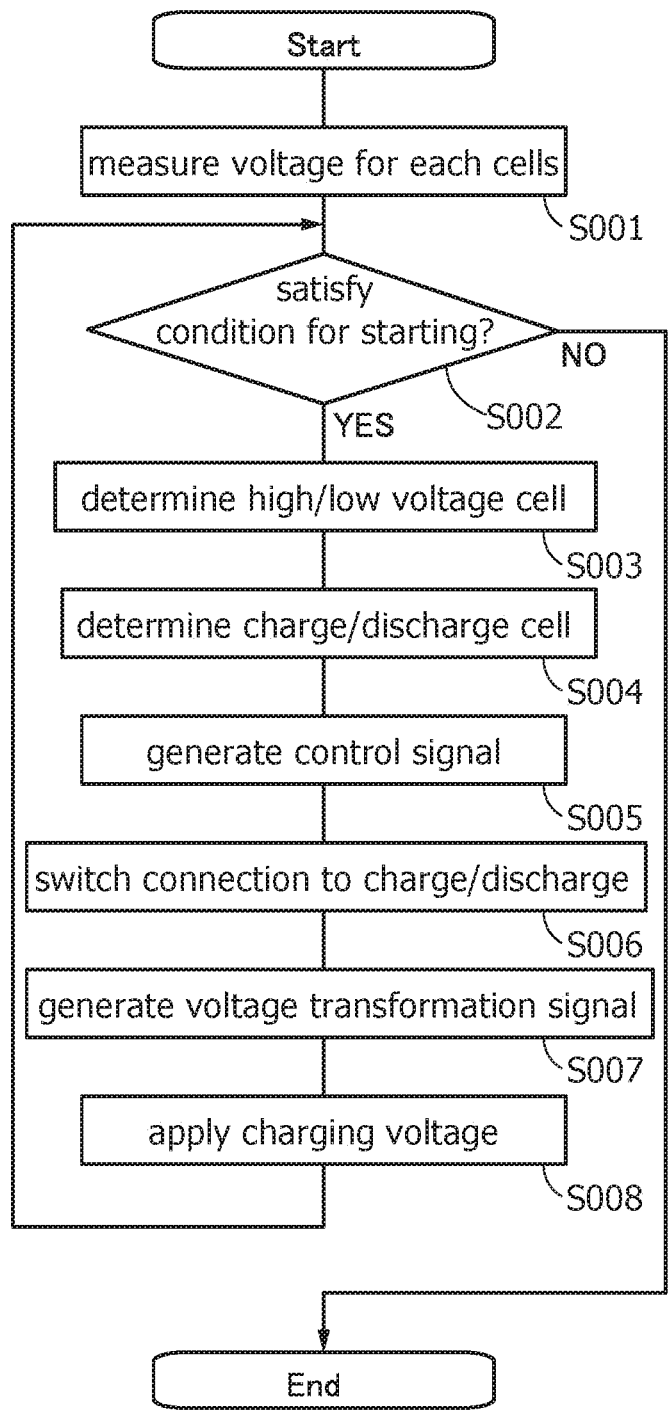
FIG. 24 is a flow chart illustrating a battery management unit of a power storage device.

A flow of operations of the power storage device BT00 in this embodiment will be described with reference to FIG. 24. FIG. 24 is a flow chart showing the flow of the operations of the power storage device BT00.

First, the power storage device BT00 obtains a voltage measured for each of the plurality of battery cells BT09 (step S001). Then, the power storage device BT00 determines whether or not the condition for starting the operation of reducing variations in voltage of the plurality of battery cells BT09 is satisfied (step S002). An example of the condition can be that the difference between the maximum value and the minimum value of the voltage measured for each of the plurality of battery cells BT09 is higher than or equal to the predetermined threshold value. In the case where the condition is not satisfied (step S002: NO), the power storage device BT00 does not perform the following operation because voltages of the battery cells BT09 are well balanced. In contrast, in the case where the condition is satisfied (step S002: YES), the power storage device BT00 performs the operation of reducing variations in the voltage of the battery cells BT09. In this operation, the power storage device BT00 determines whether each battery cell BT09 is a high voltage cell or a low voltage cell on the basis of the measured voltage of each cell (step S003). Then, the power storage device BT00 determines a discharge battery cell group and a charge battery cell group on the basis of the determination result (step S004). In addition, the power storage device BT00 generates the control signal S1 for setting the connection destination of the terminal pair BT01 to the determined discharge battery cell group, and the control signal S2 for setting the connection destination of the terminal pair BT02 to the determined charge battery cell group (step S005). The power storage device BT00 outputs the generated control signals S1 and S2 to the switching circuit BT04 and the switching circuit BT05, respectively. Then, the switching circuit BT04 connects the terminal pair BT01 and the discharge battery cell group, and the switching circuit BT05 connects the terminal pair BT02 and the discharge battery cell group (step S006). The power storage device BT00 generates the voltage transformation signal S3 based on the number of the battery cells BT09 included in the discharge battery cell group and the number of the battery cells BT09 included in the charge battery cell group (step S007). Then, the power storage device BT00 converts, in response to the voltage transformation signal S3, the discharging voltage applied to the terminal pair BT01 into a charging voltage and applies the charging voltage to the terminal pair BT02 (step S008). In this way, charge of the discharge battery cell group is transferred to the charge battery cell group.

Although the plurality of steps are shown in order in the flow chart of FIG. 24, the order of performing the steps is not limited to the order.

With this embodiment, unlike in a capacitive type circuit, a structure for temporarily storing charge from the discharge battery cell group and then sending the stored charge to the charge battery cell group is unnecessary to transfer charge from the discharge battery cell group to the charge battery cell group. Accordingly, the charge transfer efficiency per unit time can be increased. In addition, the switching circuit BT04 and the switching circuit BT05 determine which battery cell in the discharge battery cell group and the charge battery cell group to be connected to the voltage transformer circuit.

Furthermore, the voltage transformer circuit BT07 converts the discharging voltage applied to the terminal pair BT01 into the charging voltage based on the number of the battery cells BT09 included in the discharge battery cell group and the number of the battery cells BT09 included in the charge battery cell group, and applies the charging voltage to the terminal pair BT02. Thus, charge can be transferred without any problems regardless of how the battery cells BT09 are selected as the discharge battery cell group and the charge battery cell group.

Furthermore, the use of OS transistors as the transistor BT10 and the transistor BT13 can reduce the amount of charge that leaks from the battery cells BT09 not belonging to the charge battery cell group or the discharge battery cell group. Accordingly, a decrease in capacity of the battery cells BT09 which do not contribute to charging or discharging can be suppressed. In addition, the variations in characteristics of the OS transistor due to heat are smaller than those of an Si transistor. Accordingly, even when the temperature of the battery cells BT09 is increased, an operation such as turning on or off the transistors in response to the control signals S1 and S2 can be performed normally.

This embodiment can be implemented in appropriate combination with any of the structures described in the other embodiments.

Embodiment 4

In this embodiment, an example of an electronic device including the secondary battery described in Embodiment 1 will be described.

Figure 25:
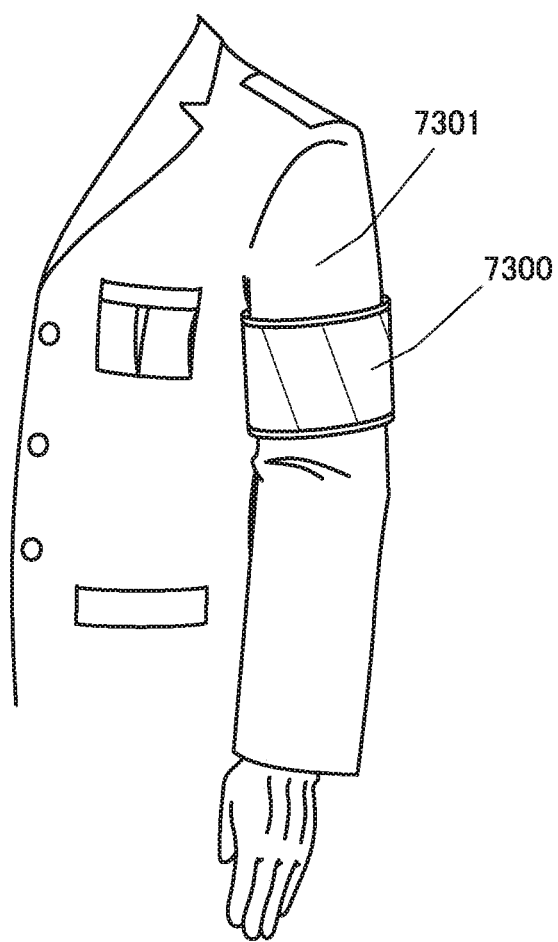
FIG. 25 illustrates an example of an electronic device.

FIG. 25 illustrates an example of an armband electronic device including a flexible secondary battery. An armband device 7300 illustrated in FIG. 25 can be worn on an arm 7301 and includes a display portion having a curved surface and a bendable secondary battery.

Note that in the display portion, a display element, a display device which is a device including a display element, a light-emitting element, and a light-emitting device which is a device including a light-emitting element can employ a variety of modes or can include a variety of elements. The display element, the display device, the light-emitting element, or the light-emitting device includes at least one of an electroluminescent (EL) element (e.g., an EL element including organic and inorganic materials, an organic EL element, or an inorganic EL element), an LED (e.g., a white LED, a red LED, a green LED, or a blue LED), a transistor (a transistor that emits light depending on current), an electron emitter, a liquid crystal element, electronic ink, an electrophoretic element, a grating light valve (GLV), a plasma display panel (PDP), a display element using micro electro mechanical systems (MEMS), a digital micromirror device (DMD), a digital micro shutter (DMS), an interferometric modulator display (IMOD) element, a MEMS shutter display element, an optical-interference-type MEMS display element, an electrowetting element, a piezoelectric ceramic display, a display element including a carbon nanotube, and the like. In addition to that, the display element, the display device, the light-emitting element, or the light-emitting device may include a display medium whose contrast, luminance, reflectivity, transmittance, or the like is changed by electrical or magnetic effect. Examples of a display device having an EL element include an EL display. Display devices having electron emitters include a field emission display (FED), an SED-type flat panel display (SED: surface-conduction electron-emitter display), and the like. Examples of a display device including a liquid crystal element include a liquid crystal display (e.g., a transmissive liquid crystal display, a transflective liquid crystal display, a reflective liquid crystal display, a direct-view liquid crystal display, or a projection liquid crystal display). Examples further include a display device including electronic ink or an electrophoretic element, such as electronic paper. In the case of a transflective liquid crystal display or a reflective liquid crystal display, some or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption. Note that in the case of using an LED, graphene or graphite may be provided under an electrode or a nitride semiconductor of the LED. Graphene or graphite may be a multilayer film in which a plurality of layers are stacked. When graphene or graphite is provided in this manner, a nitride semiconductor, for example, an n-type GaN semiconductor layer including crystals can be easily formed thereover. Furthermore, a p-type GaN semiconductor layer including crystals or the like can be provided thereover, and thus the LED can be formed. Note that an AlN layer may be provided between the n-type GaN semiconductor layer including crystals and graphene or graphite. The GaN semiconductor layers included in the LED may be formed by MOCVD. Note that when the graphene is provided, the GaN semiconductor layers included in the LED can also be formed by a sputtering method.

The armband device 7300 preferably further includes one or more functional elements. An example of a functional element is a sensor. As the sensor, a sensor having a function of measuring force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. The armband device 7300 may include a functional element such as a touch panel, an antenna, a power generation element, or a speaker.

For example, when a user wears the armband device 7300 on his or her arm and makes its display emit light at nighttime, traffic safety can be ensured. For another example, when a soldier, a security guard, or the like wears the armband device 7300 on an upper arm, he or she can check a chief's command, which is received in real time and displayed on its display portion, while creeping. It is difficult for a soldier or a security guard to use a wireless device, a mobile phone, or a head-mounted device because he or she wears a helmet and has weapons or tools with hands in executing his or her duties. Thus, it is useful that a soldier or a security guard can wear it on his or her upper arm and operate it by, for example, voice input to an audio input portion such as a microphone even when his or her hands are full.

The armband device 7300 can also be effectively used in the field of sports. For example, it is difficult for a marathoner to check the time on his or her watch without stopping swinging his or her arms. Stopping swinging his or her arms might disturb his or her rhythm, obstructing his or her run. However, wearing the armband device 7300 on his or her upper arm enables him or her to check the time without stopping swinging of his or her arm. Furthermore, it can display other information (e.g., his or her position in a course or his or her health condition) on its display screen. It is more useful that it further has a function that allows an athlete to operate it by voice input or the like without using his or her hands, seek instructions from his or her coach by a communication function, and listen the directions output by voice output from an audio output portion such as a speaker or view the instructions displayed on its display screen.

For another example, when a construction crew or the like who wears a helmet wears the armband device 7300 and operates it, he or she can exchange information by communication to easily obtain the positional information of other crews so that he or she can work safely.

This embodiment can be implemented in appropriate combination with any of the structures described in the other embodiments.

Embodiment 5

In this embodiment, other examples of electronic devices that can include the secondary battery described in Embodiment 1 will be described.

Figure 26A:
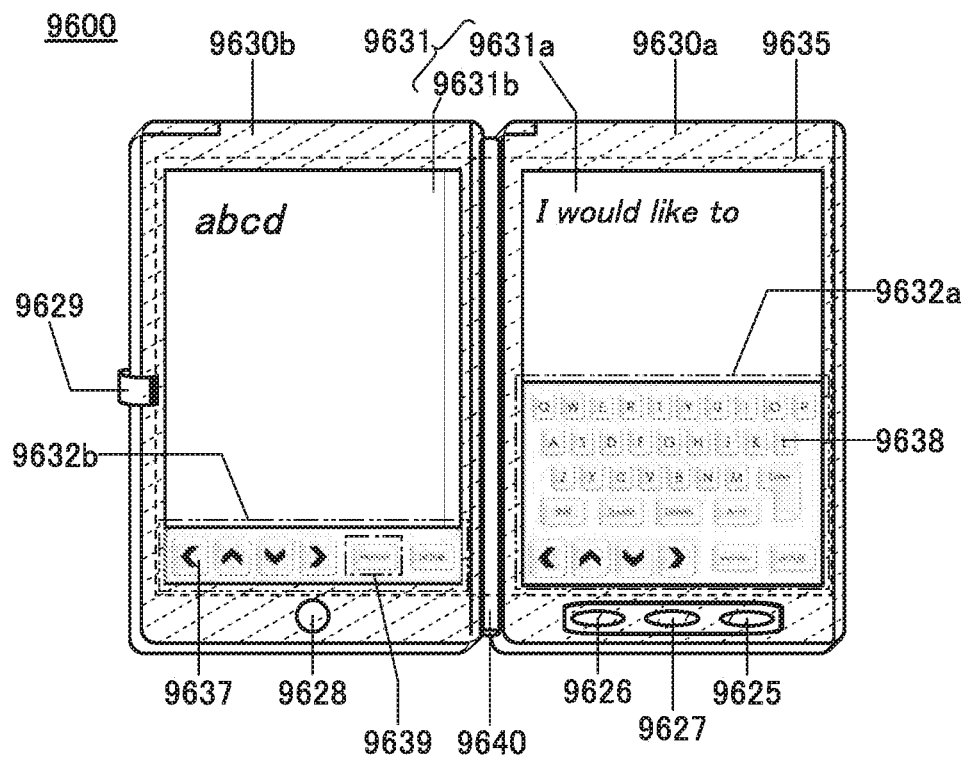
FIGS. 26A to 26C illustrate an example of an electronic device.
Figure 26B:
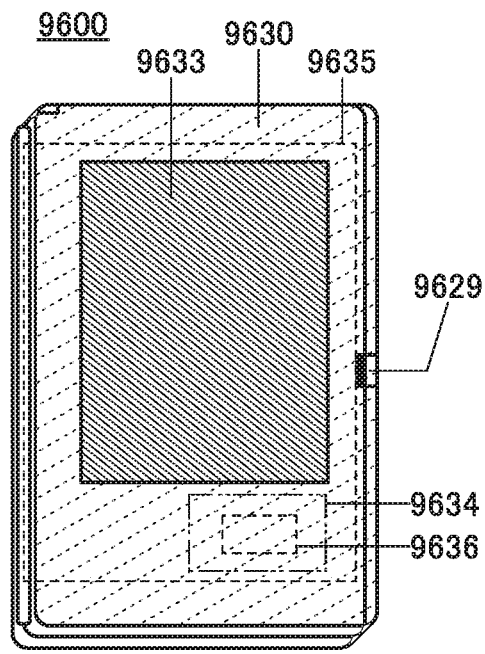

FIGS. 26A and 26B illustrate an example of a tablet terminal that can be folded in half. A tablet terminal 9600 illustrated in FIGS. 26A and 26B includes a housing 9630*a*, a housing 9630*b*, a movable portion 9640 connecting the housings 9630*a* and 9630*b*, a display portion 9631 including a display portion 9631*a* and a display portion 9631*b*, a display mode changing switch 9626, a power switch 9627, a power saving mode changing switch 9625, a fastener 9629, and an operation switch 9628. FIG. 26A illustrates the tablet terminal 9600 that is opened, and FIG. 26B illustrates the tablet terminal 9600 that is closed.

The tablet terminal 9600 includes a secondary battery 9635 inside the housings 9630*a* and 9630*b*. The secondary battery 9635 is provided across the housings 9630*a* and 9630*b*, passing through the movable portion 9640.

Part of the display portion 9631*a* can be a touch panel region 9632*a*, and data can be input by touching operation keys 9638 that are displayed. Note that FIG. 26A shows, as an example, that half of the area of the display portion 9631*a* has only a display function and the other half of the area has a touch panel function. However, the structure of the display portion 9631*a* is not limited to this, and all the area of the display portion 9631*a* may have a touch panel function. For example, all the area of the display portion 9631*a* can display keyboard buttons and serve as a touch panel while the display portion 9631*b* can be used as a display screen.

As in the display portion 9631*a*, part of the display portion 9631*b* can be a touch panel region 9632*b*. When a keyboard display switching button 9639 displayed on the touch panel is touched with a finger, a stylus, or the like, a keyboard can be displayed on the display portion 9631*b*.

Touch input can be performed in the touch panel region 9632*a* and the touch panel region 9632*b* at the same time.

The display mode changing switch 9626 allows switching between a landscape mode and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631*a* and the display portion 9631*b* have the same display area in FIG. 26A as an example, one embodiment of the present invention is not particularly limited to this example. The display portion 9631*a* and the display portion 9631*b* may have different areas or different display quality. For example, one of the display portions 9631a and 9631b may display higher definition images than the other.

The tablet terminal is closed in FIG. 26B. The tablet terminal includes the housing 9630, a solar cell 9633, and a charge and discharge control circuit 9634 including a DC-DC converter 9636. The secondary battery of one embodiment of the present invention is used as the secondary battery 9635.

The tablet terminal 9600 can be folded such that the housings 9630a and 9630b overlap with each other when not in use. Thus, the display portions 9631a and 9631b can be protected, which increases the durability of the tablet terminal 9600. In addition, the secondary battery 9635 of one embodiment of the present invention has flexibility and can be repeatedly bent without a large decrease in charge and discharge capacity. Thus, a highly reliable tablet terminal can be provided.

The tablet terminal illustrated in FIGS. 26A and 26B can also have a function of displaying various kinds of data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, and the like. Note that the solar cell 9633 can be provided on one or both surfaces of the housing 9630 and the secondary battery 9635 can be charged efficiently. The use of the secondary battery of one embodiment of the present invention as the secondary battery 9635 can inhibit a decrease in discharge capacity caused by repeated charge and discharge; thus, a tablet terminal that can be used over a long period of time can be provided.

Figure 26C:
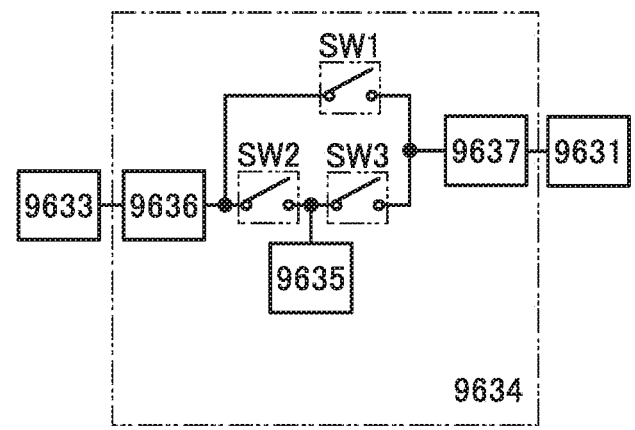

The structure and operation of the charge and discharge control circuit 9634 illustrated in FIG. 26B is described with reference to a block diagram of FIG. 26C. The solar cell 9633, the secondary battery 9635, the DC-DC converter 9636, a converter 9637, switches SW1 to SW3, and the display portion 9631 are illustrated in FIG. 26C, and the secondary battery 9635, the DC-DC converter 9636, the converter 9637, and the switches SW1 to SW3 correspond to the charge and discharge control circuit 9634 in FIG. 26B.

First, an example of operation in the case where electric power is generated by the solar cell 9633 using external light will be described. The voltage of electric power generated by the solar cell is raised or lowered by the DC-DC converter 9636 to a voltage for charging the secondary battery 9635. When the display portion 9631 operates with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the secondary battery 9635 can be charged.

Note that the solar cell 9633 is described as an example of a power generation means; however, one embodiment of the present invention is not limited to this example. The secondary battery 9635 may be charged using another power generation means such as a piezoelectric element or a thermoelectric conversion element (Peltier element). For example, the secondary battery 9635 may be charged with a non-contact power transmission module capable of performing charging by transmitting and receiving electric power wirelessly (without contact), or any of the other charge means used in combination.

Figure 27A:
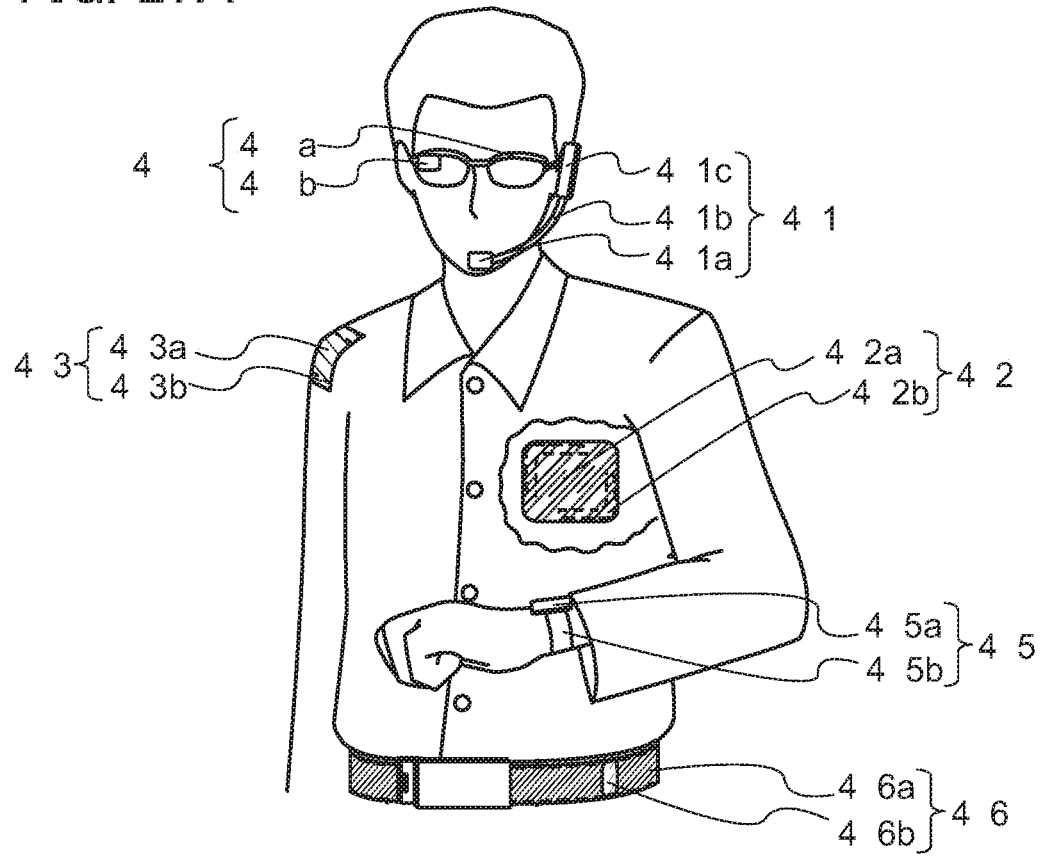
FIGS. 27A to 27C illustrate examples of electronic devices.
Figure 27B:
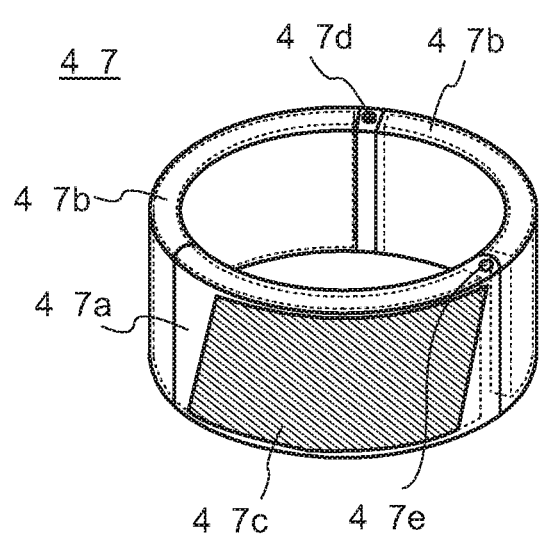
Figure 27C:
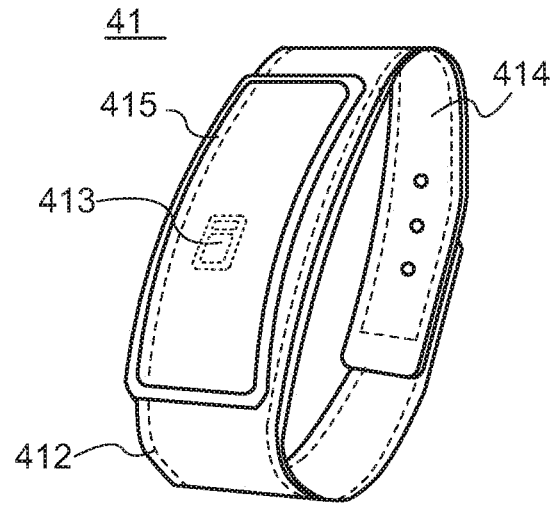

The secondary battery described in Embodiment 1 can be provided in wearable devices illustrated in FIGS. 27A to 27C.

For example, the secondary battery can be provided in a glasses-type device 400 illustrated in FIG. 27A. The glasses-type device 400 includes a frame 400a and a display portion 400b. The secondary battery is provided in a temple of the frame 400a having a curved shape, whereby the glasses-type device 400 can have a well-balanced weight and can be used continuously for a long time.

The secondary battery can be provided in a headset-type device 401. The headset-type device 401 includes at least a microphone portion 401a, a flexible pipe 401b, and an earphone portion 401c. The secondary battery can be provided in the flexible pipe 401b and the earphone portion 401c.

Furthermore, the secondary battery can be provided in a device 402 that can be attached directly to a body. A secondary battery 402b can be provided in a thin housing 402a of the device 402.

Furthermore, the secondary battery can be provided in a device 403 that can be attached to clothes. A secondary battery 403b can be provided in a thin housing 403a of the device 403.

Furthermore, the secondary battery can be provided in a watch-type device 405. The watch-type device 405 includes a display portion 405a and a belt portion 405b, and the secondary battery can be provided in the display portion 405a or the belt portion 405b.

Furthermore, the secondary battery can be provided in a belt-type device 406. The belt-type device 406 includes a display portion 406a and a wireless power feeding and receiving portion 406b, and the secondary battery can be provided inside the belt portion 406a.

The secondary battery described in Embodiment 1 can be provided in a wristband device 407 illustrated in FIG. 27B. The wristband device 407 includes two curved secondary batteries 407b in a case 407a. A curved display portion 407c is provided over a surface of the case 407a. For the display portion that can be used for the display portion 407c, the description of the display portion in FIG. 25 can be referred to. The wristband device 407 includes a connection portion 407d and a hinge portion 407e. A portion between the connection portion 407d and the hinge portion 407e can be flexibly moved using the hinge portion 407e as an axis. Charging or the like through an external terminal provided in the connection portion 407d is also possible.

The secondary battery described in the above embodiment can be provided in a wearable device 410 illustrated in FIG. 27C. The wearable device 410 includes a sensor portion 413, a display portion 415, and a band portion 414 and can be worn on a wrist or the like, for example. A curved secondary battery 412 is provided on the band portion 414. For the display portion that can be used for the display portion 415, the description of the display portion in FIG. 28 described later can be referred to.

The secondary battery described in the above embodiment is used as the secondary battery 412; thus, even in the case where the secondary battery 412 is changed in shape when the wearable device 410 is worn or removed, it is possible to reduce the possibility that, for example, a crack is generated in an exterior body. Accordingly, the wearable device 410 can be highly reliable.

Figure 28:
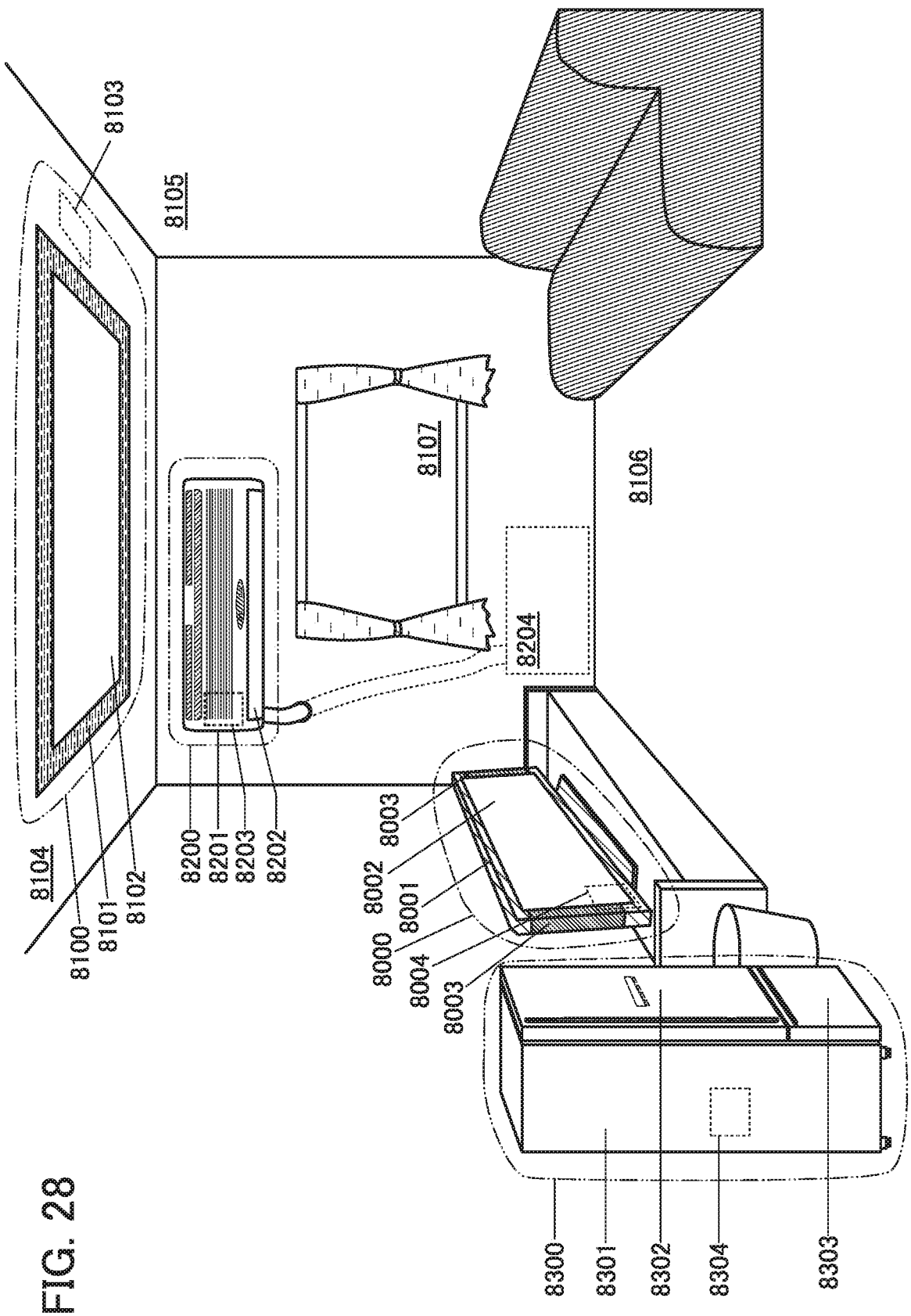
FIG. 28 illustrates examples of electronic devices.

FIG. 28 illustrates other examples of electronic devices. In FIG. 28, a display device 8000 is an example of an electronic device including a secondary battery 8004 of one embodiment of the present invention. Specifically, the display device 8000 corresponds to a display device for TV broadcast reception and includes a housing 8001, a display portion 8002, speaker portions 8003, the secondary battery 8004, and the like. The secondary battery 8004 of one embodiment of the present invention is provided in the housing 8001. The display device 8000 can receive electric power from a commercial power supply. Alternatively, the display device 8000 can use electric power stored in the secondary battery 8004. Thus, the display device 8000 can operate with the use of the secondary battery 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 28, an installation lighting device 8100 is an example of an electronic device including a secondary battery 8103 of one embodiment of the present invention. Specifically, the lighting device 8100 includes a housing 8101, a light source 8102, the secondary battery 8103, and the like. Although FIG. 28 illustrates the case where the secondary battery 8103 is provided in a ceiling 8104 on which the housing 8101 and the light source 8102 are installed, the secondary battery 8103 may be provided in the housing 8101. The lighting device 8100 can receive electric power from a commercial power supply. Alternatively, the lighting device 8100 can use electric power stored in the secondary battery 8103. Thus, the lighting device 8100 can operate with the use of the secondary battery 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 28 as an example, the secondary battery of one embodiment of the present invention can be used in an installation lighting device provided in, for example, a wall 8105, a floor 8106, or a window 8107 other than the ceiling 8104. Alternatively, the secondary battery of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 28, an air conditioner including an indoor unit 8200 and an outdoor unit 8204 is an example of an electronic device including a secondary battery 8203 of one embodiment of the present invention. Specifically, the indoor unit 8200 includes a housing 8201, an air outlet 8202, the secondary battery 8203, and the like. Although FIG. 28 illustrates the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The air conditioner can receive electric power from a commercial power supply. Alternatively, the air conditioner can use electric power stored in the secondary battery 8203. Particularly in the case where the secondary batteries 8203 are provided in both the indoor unit 8200 and the outdoor unit 8204, the air conditioner can operate with the use of the secondary battery 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 28 as an example, the secondary battery of one embodiment of the present invention can be used in an air conditioner in which the functions of an indoor unit and an outdoor unit are integrated in one housing.

In FIG. 28, an electric refrigerator-freezer 8300 is an example of an electronic device including a secondary battery 8304 of one embodiment of the present invention. Specifically, the electric refrigerator-freezer 8300 includes a housing 8301, a refrigerator door 8302, a freezer door 8303, the secondary battery 8304, and the like. The secondary battery 8304 is provided in the housing 8301 in FIG. 28. The electric refrigerator-freezer 8300 can receive electric power from a commercial power supply. Alternatively, the electric refrigerator-freezer 8300 can use electric power stored in the secondary battery 8304. Thus, the electric refrigerator-freezer 8300 can operate with the use of the secondary battery 8304 of one embodiment of the present invention as an uninterruptible power supply even when electric power cannot be supplied from a commercial power supply due to power failure or the like.

This embodiment can be implemented in appropriate combination with any of the structures described in the other embodiments.

Embodiment 6

In this embodiment, examples of vehicles including the secondary battery described in Embodiment 1 will be described.

The use of secondary batteries in vehicles can lead to next-generation clean energy vehicles such as hybrid electric vehicles (HEVs), electric vehicles (EVs), and plug-in hybrid electric vehicles (PHEVs).

Figure 29A:
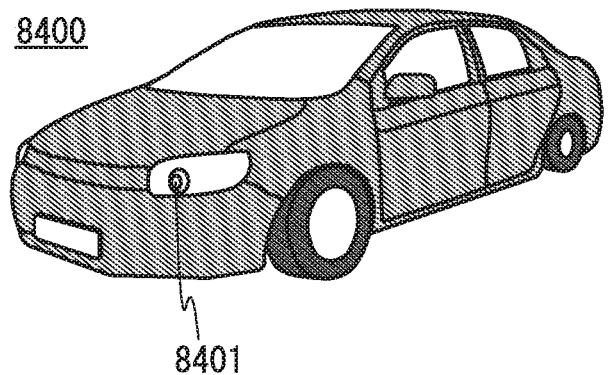
FIGS. 29A and 29B illustrate examples of electronic devices.
Figure 29B:
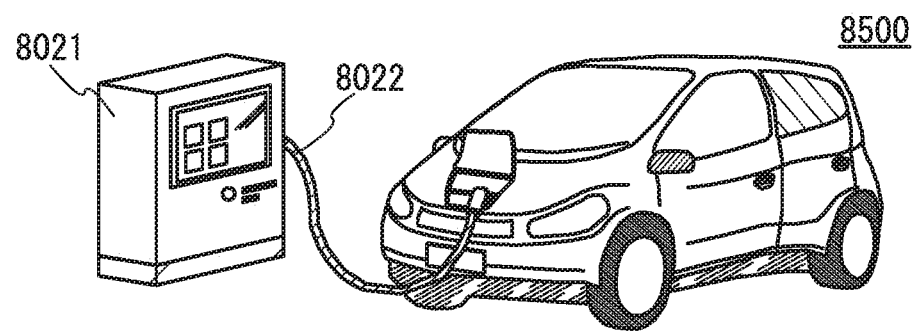

FIGS. 29A and 29B each illustrate an example of a vehicle using one embodiment of the present invention. An automobile 8400 illustrated in FIG. 29A is an electric vehicle which runs on the power of the electric motor. Alternatively, the automobile 8400 is a hybrid electric vehicle capable of driving using either the electric motor or the engine as appropriate. One embodiment of the present invention achieves a high-mileage vehicle. The automobile 8400 includes the secondary battery. The secondary battery is used not only for driving the electric motor, but also for supplying electric power to a light-emitting device such as a headlight 8401 or a room light (not illustrated).

The secondary battery can also supply electric power to a display device of a speedometer, a tachometer, or the like included in the automobile 8400. Furthermore, the secondary battery can supply electric power to a semiconductor device included in the automobile 8400, such as a navigation system.

FIG. 29B illustrates an automobile 8500 including the secondary battery. The automobile 8500 can be charged when the secondary battery is supplied with electric power through external charging equipment by a plug-in system, a contactless power feeding system, or the like. In FIG. 29B, the power storage device included in the automobile 8500 is charged with the use of a ground-based charging apparatus 8021 through a cable 8022. In charging, a given method may be employed as a charging method, the standard of a connector, or the like as appropriate. The charging apparatus 8021 may be a charging station provided in a commerce facility or a power source in a house. For example, with the use of a plug-in technique, the secondary battery included in the automobile 8500 can be charged by being supplied with electric power from outside, for example. The charging can be performed by converting AC electric power into DC electric power through a converter such as an AC-DC converter.

Further, although not illustrated, the vehicle may include a power receiving device so as to be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the secondary battery when the automobile stops or moves. To supply electric power in such a contactless manner, an electromagnetic induction method or a magnetic resonance method can be used.

Furthermore, the secondary battery included in the vehicle can be used as a power source for supplying electric power to products other than the vehicle. In such a case, the use of a commercial power source can be avoided at peak time of electric power demand.

This embodiment can be implemented in appropriate combination with any of the structures described in the other embodiments.

Example 1

In this example, a plurality of samples in each of which an organic solvent was sealed inside the exterior body described in Embodiment 1 was formed, and the amount of moisture permeated into the samples was measured. The results will be described.

<Formation of Sample>

Three kinds of exterior bodies, an exterior film A, an exterior film B, and an exterior film C, were prepared in this example. The exterior film A was a polyimide film. The exterior film B was an exterior film having a three-layer structure in which a layer containing thermally reduced graphene oxide was provided over a polyimide film, and a layer containing a silicone resin was provided over the layer containing the reduced graphene oxide. The exterior film C was an exterior film having a three-layer structure in which a layer containing graphene oxide that had been chemically reduced and then thermally reduced was provided over a polyimide film, and a layer containing a silicone resin was provided over the layer containing the reduced graphene oxide. Samples of two exterior films A, two exterior films B, and two exterior films C were formed.

Methods for forming the exterior films A, the exterior films B, and the exterior films C are described below.

First, a 12-μm-thick polyimide film was prepared for each of the exterior films A to C.

Next, as for the exterior films B and C, slurry containing graphene oxide was applied onto the polyimide film. The slurry containing graphene oxide formed in such a manner that 4 ml of graphene oxide dispersion solution produced by NiSiNa materials Co., Ltd. (model number: TQ11) and 2 ml of pure water were prepared and this mixture was kneaded with a kneading machine at 2000 rpm for 5 minutes, was used. After the application of the slurry, drying was performed at 80° C. for 30 minutes in a circulation drying furnace.

Next, as for the exterior film C, the graphene oxide was chemically reduced. Specifically, a solution in which 3.3 g of ascorbic acid, 0.78 g of lithium hydroxide, 200 ml of pure water, and 800 ml of ethanol were mixed was heated at 60° C., and the exterior film C was soaked in the solution for three hours.

Next, as for the exterior films B and C, the graphene oxide was thermally reduced. Specifically, heat treatment was performed at 250° C. for ten hours in vacuum.

Next, as for the exterior films B and C, silicone was applied over the layer containing reduced graphene oxide. As the silicone, silicone produced by The Yokohama Rubber Co., Ltd. (model number: YSH 7502) was used. After the application of the silicone, the exterior films were dried in a vacuum desiccator at 100° C. for one hour and 150° C. for two hours.

Through the above steps, the exterior films A to C were formed.

Then, the samples for measurement were formed using the exterior films A to C. Specifically, using two exterior films A, two exterior films B, and two exterior films C, bag-like samples were formed by sealing glass fiber filter paper (GF/C) and 600 μl of propylene carbonate in the exterior films. The glass fiber filter paper was put for holding the propylene carbonate. The size of a bag-like portion of each sample was 35 mm×45 mm, and a sealing width of each side was 5.5 mm on an outer circumference of the bag-like portion. Two samples for each of the exterior films A to C were formed. The formed samples were named A1, A2, B1, B2, C1 and C2.

<Measurement of Moisture Permeation Amount>

The measurement of the amount of moisture permeated through the samples was performed by the following method. First, the samples were held in a thermostat kept at a temperature of 60° C. and a humidity of 90% for 24 hours. Then, the samples were taken out, and the exterior films were each opened in a glove box and 600 μl of propylene carbonate was added to the opened samples. The added propylene carbonate and the propylene carbonate in each of the samples were well mixed to obtain about 0.3 g of the mixture. Then, the amount of moisture in the obtained mixture was measured by the Karl Fischer moisture meter (MKC 610 produced by KYOTO ELECTRONICS MANUFACTURING CO., LTD.).

Figure 30:
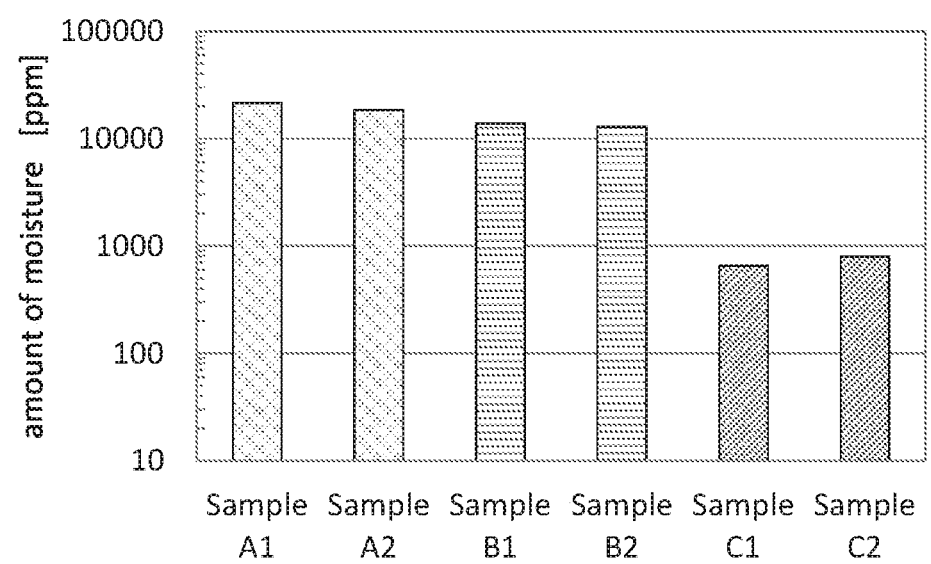
FIG. 30 shows measurement results of the amount of moisture according to an example.

FIG. 30 shows the measurement results of the amount of moisture. In FIG. 30, the vertical axis represents the amount of moisture in a logarithmic scale. FIG. 30 indicates that the smaller the amount of moisture is, the higher the performance of suppressing the moisture permeation is.

The graph in FIG. 30 confirms that the exterior films B have a performance similar to that of the exterior films A, while the exterior films C have higher performance of suppressing the moisture permeation than each of the exterior films A and B. Thus, in this example, it is confirmed that the graphene oxide that was chemically reduced and then thermally reduced has effects of suppressing the moisture permeation.

Example 2

In Example 2, measurement results of XRD spectra of reduced graphene oxide will be described.

Two kinds of samples were formed in which reduced graphene oxide was formed over a polyimide film in a manner similar to that of the reduced graphene oxide described in Example 1. The sample including reduced graphene oxide formed in a manner similar to that of the reduced graphene oxide in the exterior film B is referred to as a RGO-B, and the sample including reduced graphene oxide formed in a manner similar to that of the reduced graphene oxide in the exterior film C is referred to as a RGO-C.

Figure 31:
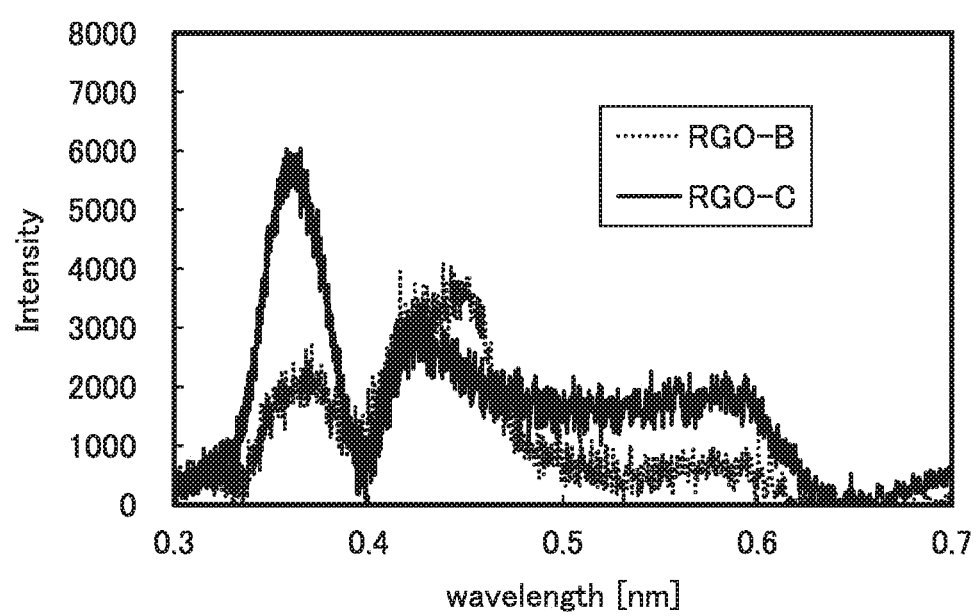
FIG. 31 shows measurement results of XRD spectra according to an example.
Figure 32:
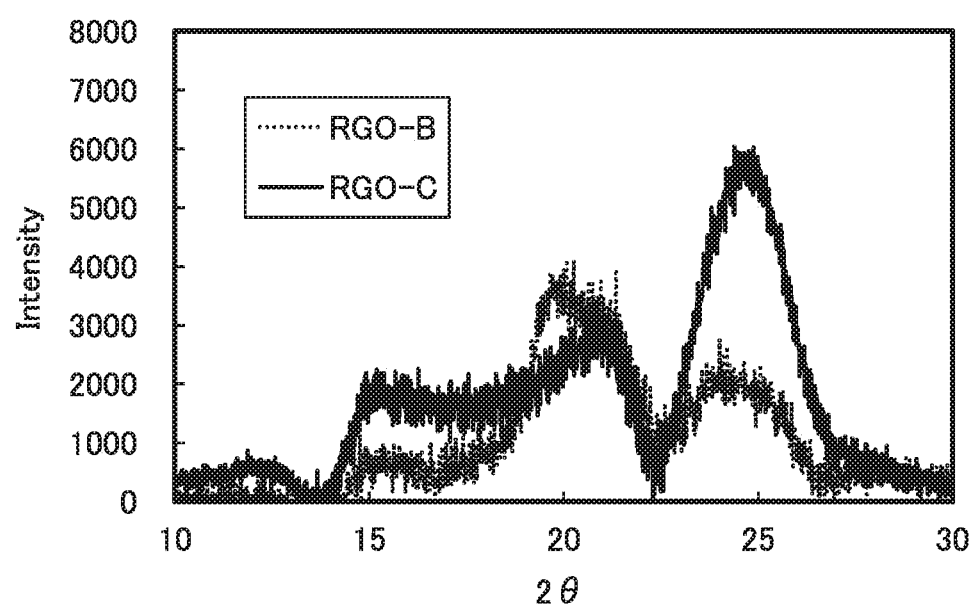
FIG. 32 shows measurement results of XRD spectra according to an example.

FIG. 31 shows measurement results of XRD spectra. In FIG. 31, the vertical axis represents X-ray diffraction intensity, which shows a difference from a measured profile of the polyimide film that is a base. The horizontal axis represents a value obtained by conversion of diffraction angle 2θ into an interlayer distance of the reduced graphene oxide. As the X-ray diffraction intensity in any interlayer distance is higher, a larger amount of reduced graphene oxide which keeps the corresponding interlayer distance is contained in the measured sample. Note that the conversion is performed using the Bragg equation. FIG. 32 shows the measurement results of XRD spectra before the conversion.

In FIG. 31, although the XRD spectra of the samples RGO-B and RGO-C each have a peak in the range of greater than 0.35 nm and less than 0.38 nm (hereinafter the range is referred to as a range a) and a peak in the range of greater than 0.41 nm and less than 0.46 nm (hereinafter the range is referred to as a range b), the samples have different peak intensity ratios between the two ranges. When the peak intensities in the ranges a and h are Ia and Ib, respectively, Ia/Ib in the sample RGO-B is less than 1 and Ia/Ib in the sample RGB-C is greater than 1. Specifically, Ia/Ib in the sample RGO-B is greater than 0.4 and less than 0.6, and Ia/Ib in the sample RGB-C is greater than 1.5 and less than 2.5.

FIG. 31 also shows that the sample RGO-C includes more regions than the sample RGO-B where the interlayer distance in the reduced graphene oxide is small. Furthermore, the results of Example 1 show that the exterior films C have higher performance of suppressing the moisture permeation than the exterior films B. The results indicate that since the graphene oxide that has been chemically reduced and then thermally reduced has a dense stack with a small interlayer distance, performance of suppressing the moisture permeation is obtained.

Note that the size of water molecule is 0.38 nm; thus, the exterior film C including the reduced graphene oxide having a peak of XRD spectrum in the range smaller than the water molecule is preferable as an exterior film which suppresses moisture permeation.

REFERENCE NUMERALS

100a: stack, 100b: stack, 100c: stack, 100d: stack, 101: negative electrode current collector, 102: negative electrode active material layer, 103: separator, 104: positive electrode active material layer, 105: positive electrode current collector, 107: electrolytic solution, 110: secondary battery, 111: region, 112: exterior film, 113: exterior film, 114: thin flake, 115: lead electrode, 116: exterior body, 117: inner structure, 200: thin metal film, 400: glasses-type device, 400a: frame, 400b: display portion, 401: headset-type device, 401a: microphone portion, 401b: flexible pipe, 401c: earphone portion, 402: device, 402a: housing, 402b: secondary battery, 403: device, 403a: housing, 403b: secondary battery, 405: watch-type device, 405a: display portion, 405b: belt portion, 406: belt-type device, 406a: display portion, 406b: wireless power feeding and receiving portion, 407: wristband device, 407a: case, 407b: secondary battery, 407c: display portion, 407d: connection portion, 407e: hinge portion, 410: wearable device, 412: secondary battery, 413: sensor portion, 414: band portion, 415: display portion, 500: storage battery, 501: positive electrode current collector, 502: positive electrode active material layer, 503: positive electrode, 504: negative electrode current collector, 505: negative electrode active material layer, 506: negative electrode, 507: separator, 508: electrolytic solution, 509: exterior body, 510: positive electrode tab electrode, 511: negative electrode tab electrode, 1700: curved surface, 1701: plane, 1702: curve, 1703: radius of curvature, 1704: center of curvature, 1800: center of curvature, 1801: exterior film, 1802: radius of curvature, 1803: exterior film, 1804: radius of curvature, 2100: storage battery, 2100d: storage battery, 2101: positive electrode current collector, 2102: positive electrode active material layer, 2103: separator, 2103a: region, 2103b: region, 2105: negative electrode current collector, 2106: negative electrode active material layer, 2107: exterior body, 2111: positive electrode, 2111a: positive electrode, 2113: negative electrode, 2115: negative electrode, 2115a: negative electrode, 2120: sealing layer, 2121: positive electrode lead, 2125: negative electrode lead, 2130: electrode assembly, 2131: electrode assembly, 2200: storage battery, 7100: portable display device, 7101: housing, 7102: display portion, 7103: operation button, 7104: storage battery, 7300: armband device, 7301: arm, 7400: mobile phone, 7401: housing, 7402: display portion, 7403: operation button, 7404: external connection port, 7405: speaker, 7406: microphone, 7407: storage battery, 8000: display device, 8001: housing, 8002: display portion, 8003: speaker portion, 8004: secondary battery, 8021: charging apparatus, 8022: cable, 8100: lighting device, 8101: housing, 8102: light source, 8103: secondary battery, 8104: ceiling, 8105: wall, 8106: floor, 8107: window, 8200: indoor unit, 8201: housing, 8202: air outlet, 8203: secondary battery, 8204: outdoor unit, 8300: electric refrigerator-freezer, 8301: housing, 8302: refrigerator door, 8303: freezer door, 8304: secondary battery, 8400: automobile, 8401: headlight, 8500: automobile, 9600: tablet terminal, 9625: switch, 9626: switch, 9627: power switch, 9628: operation switch, 9629: fastener, 9630: housing, 9630a: housing, 9630b: housing, 9631: display portion, 9631a: display portion, 9631b: display portion, 9632a: region, 9632b: region, 9633: solar cell, 9634: charge and discharge control circuit, 9635: secondary battery, 9636: DCDC converter, 9637: converter, 9638: operation key, 9639: button, 9640: movable portion This application is based on Japanese Patent Application serial no. 2015-094530 filed with Japan Patent Office on May 6, 2015, the entire contents of which are hereby incorporated by reference.

What is claimed is:

1. A laminate film comprising:
   a first layer comprising polyamide;
   a second layer over the first layer, the second layer comprising a plurality of graphene flakes, and
   a third layer over the second layer, the third layer comprising an insulating synthetic resin.

2. The laminate film according to claim 1, wherein the insulating synthetic resin is any one of a silicone resin, a polyamide-based resin and a polyester-based resin.

3. The laminate film according to claim 1, wherein the plurality of graphene flakes is reduced graphene oxide.

4. The laminate film according to claim 3, wherein the wherein the reduced graphene oxide has a concentration of oxygen higher than or equal to 2 atomic % and lower than or equal to 20 atomic %.

5. The laminate film according to claim 1, wherein the laminate film is insulating.

6. A exterior body comprising the laminate film according to claim 1.

7. A secondary battery comprising the exterior body according to claim 6.

8. A laminate film comprising:
   a first layer comprising any one selected from the polymers of polyethylene, polypropylene, polycarbonate, ionomer and polyamide;
   a second layer over the first layer, the second layer comprising a plurality of graphene flakes, and
   a third layer over the second layer, the third layer comprising an insulating synthetic resin,
   wherein the plurality of graphene flakes are configured to shift each position in the laminate film when the laminate film is bent.

9. The laminate film according to claim 8, wherein the insulating synthetic resin is any one of a silicone resin, a polyamide-based resin and a polyester-based resin.

10. The laminate film according to claim 8, wherein the plurality of graphene flakes is reduced graphene oxide.

11. The laminate film according to claim 10, wherein the wherein the reduced graphene oxide has a concentration of oxygen higher than or equal to 2 atomic % and lower than or equal to 20 atomic %.

12. The laminate film according to claim 8, wherein the laminate film is insulating.

13. A exterior body comprising the laminate film according to claim 8.

14. A secondary battery comprising the exterior body according to claim 13.

15. The laminate film according to claim 8, wherein the first layer comprises polyethylene or polypropylene.

* * * * *